United States Patent
Kondo et al.

(10) Patent No.: US 12,346,049 B2
(45) Date of Patent: Jul. 1, 2025

(54) DRIVING DEVICE AND IMAGE FORMING APPARATUS

(71) Applicant: FUJIFILM Business Innovation Corp., Tokyo (JP)

(72) Inventors: Shinnosuke Kondo, Kanagawa (JP); Naoyuki Kato, Kanagawa (JP); Kenji Yamada, Kanagawa (JP); Satoshi Noda, Kanagawa (JP); Kenichi Ishikura, Kanagawa (JP); Takahiro Iizuka, Kanagawa (JP); Hiroyuki Tanaka, Kanagawa (JP); Shinya Hasegawa, Kanagawa (JP); Kota Tomioka, Kanagawa (JP); Yoichi Yamakawa, Kanagawa (JP); Tomonori Sato, Kanagawa (JP); Ryusuke Nakata, Kanagawa (JP); Kazuyuki Koda, Kanagawa (JP); Isamu Adachi, Kanagawa (JP); Miho Morita, Kanagawa (JP); Tomomi Ishida, Kanagawa (JP); Shinichi Ohba, Kanagawa (JP); Taisuke Endo, Kanagawa (JP); Yuya Shiokawa, Kanagawa (JP); Daisuke Ishihara, Kanagawa (JP); Kohei Tachibana, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 365 days.

(21) Appl. No.: 17/715,021

(22) Filed: Apr. 6, 2022

(65) Prior Publication Data
US 2023/0054566 A1 Feb. 23, 2023

(30) Foreign Application Priority Data

Aug. 23, 2021 (JP) .................................. 2021-135289
Aug. 23, 2021 (JP) .................................. 2021-135290
(Continued)

(51) Int. Cl.
G03G 15/00 (2006.01)
G03G 21/16 (2006.01)

(52) U.S. Cl.
CPC ..... *G03G 15/5008* (2013.01); *G03G 15/6552* (2013.01); *G03G 21/1619* (2013.01)

(58) Field of Classification Search
CPC .......... G03G 15/5008; G03G 15/6552; G03G 21/1619; G03G 15/757
See application file for complete search history.

(56) References Cited

U.S. PATENT DOCUMENTS 5,614,991 A 3/1997 Moro et al.
5,764,385 A 6/1998 Ohyama
(Continued)

FOREIGN PATENT DOCUMENTS

EP 0452931 10/1991
EP 1553462 7/2005
(Continued)

OTHER PUBLICATIONS

"Search Report of Europe Related Application, application No. 22169617.2", issued on Oct. 5, 2022, p. 1-p. 9.
(Continued)

*Primary Examiner* — Sandra Brase
(74) *Attorney, Agent, or Firm* — JCIPRNET

(57) ABSTRACT

A driving device includes: a frame disposed in the driving device to support a driven unit driven by the driving device, the frame including a first portion, a distance from which to
(Continued)

an outer wall of an accommodation device that accommodates the driving device is shorter, and a second portion, a distance from which to the outer wall is longer than the distance from the first portion to the outer wall; and a driving unit disposed between the second portion and the outer wall, at least a part of the driving unit being away from the outer wall by the distance between the first portion and the outer wall or more.

19 Claims, 47 Drawing Sheets

(30) Foreign Application Priority Data

| | | |
|---|---|---|
| Aug. 23, 2021 | (JP) | 2021-135424 |
| Aug. 23, 2021 | (JP) | 2021-135483 |
| Aug. 23, 2021 | (JP) | 2021-135487 |
| Aug. 23, 2021 | (JP) | 2021-135489 |
| Aug. 23, 2021 | (JP) | 2021-135490 |
| Aug. 23, 2021 | (JP) | 2021-135491 |
| Jan. 12, 2022 | (JP) | 2022-003404 |

(56) References Cited

U.S. PATENT DOCUMENTS

| | | | |
|---|---|---|---|
| 5,805,272 | A | 9/1998 | Nozawa et al. |
| 5,940,128 | A | 8/1999 | Morimura |
| 6,011,635 | A | 1/2000 | Bungo et al. |
| 6,371,476 | B2 | 4/2002 | Isogai et al. |
| 2002/0000689 | A1 | 1/2002 | Isogai et al. |
| 2003/0230841 | A1 | 12/2003 | Hiramoto et al. |
| 2005/0074266 | A1 | 4/2005 | Hiramoto et al. |
| 2007/0071492 | A1 | 3/2007 | Ito |
| 2007/0076268 | A1 | 4/2007 | Shojo et al. |
| 2007/0183810 | A1* | 8/2007 | Kamiya ............. G03G 15/5008 399/167 |
| 2013/0342878 | A1 | 12/2013 | Larson et al. |
| 2015/0139685 | A1* | 5/2015 | Hoshino ............. G03G 21/1619 399/107 |
| 2016/0156247 | A1* | 6/2016 | Ishida ...................... H02K 7/14 310/58 |
| 2019/0185279 | A1 | 6/2019 | Ando |
| 2020/0019354 | A1 | 1/2020 | Tsuchiya |
| 2021/0120137 | A1 | 4/2021 | Okamoto et al. |
| 2021/0218850 | A1 | 7/2021 | Ogawa |
| 2023/0053735 | A1 | 2/2023 | Shinoto et al. |
| 2023/0230841 | A1 | 7/2023 | Lin |

FOREIGN PATENT DOCUMENTS

| | | |
|---|---|---|
| EP | 1562081 | 8/2005 |
| EP | 1793579 | 6/2007 |
| EP | 2911010 | 8/2015 |
| EP | 2962450 | 1/2016 |
| JP | H09222762 | 8/1997 |
| JP | H11278742 | 10/1999 |
| JP | 2003312870 | 11/2003 |
| JP | 2007214836 | 8/2007 |
| JP | 1358358 | 5/2009 |
| JP | 2010176104 | 8/2010 |
| JP | 2017175594 | 9/2017 |
| JP | 2020137163 | 8/2020 |
| JP | 2021068980 | 4/2021 |

OTHER PUBLICATIONS

"Search Report of Europe Related Application, application No. 22169619.8", issued on Oct. 27, 2022, p. 1-p. 9.
"Search Report of Europe Related Application, application No. 22169618.0", issued on Oct. 21, 2022, p. 1-p. 11.
"Search Report of Europe Related Application, application No. 22169627.1", issued on Oct. 6, 2022, p. 1-p. 9.
"Search Report of Europe Related Application, application No. 22169652.9", issued on Oct. 5, 2022, p. 1-p. 10.
"Search Report of Europe Related Application, application No. 22169633.9", issued on Oct. 13, 2022, p. 1-p. 10.
"Search Report of Europe Counterpart Application", issued on Oct. 6, 2022, p. 1-p. 9.
"Search Report of Europe Related Application, application No. 22169641.2", issued on Oct. 13, 2022, p. 1-p. 13.
"Summaries with Thumbnails", InnovationQ+, Jul. 16, 1996-Mar. 26, 2024, pp. 1-127.
"Office Action of Related U.S. Appl. No. 17/714,110", issued on Sep. 13, 2024, p. 1-p. 25.
"Office Action of Europe Related Application No. 22169627.1", issued on Apr. 2, 2024, pp. 1-4.
"Office Action of Europe Related Application No. 22169652.9", issued on Apr. 2, 2024, pp. 1-6.
"Office Action of Europe Related Application No. 22169624.8", issued on Apr. 2, 2024, pp. 1-6.
"Office Action of Europe Related Application No. 22169641.2", issued on Apr. 2, 2024, pp. 1-7.
"Office Action of U.S. Counterpart Application", issued on Sep. 5, 2024, p. 1-p. 25.
Merriam-Webster Dictionary, "container", retrieved on Dec. 5, 2024, Available at: https://www.merriam-webster.com/dictionary/container.
"Summaries with Thumbnails", InnovationQ Plus, retrieved on Dec. 11, 2024, pp. 1-127.
Proquest, "Search Strategy from Dialog", retrieved on Dec. 10, 2024, pp. 1-4.
"Notice of allowance of Related U.S. Appl. No. 17/714,152", issued on Dec. 12, 2024, p. 1-p. 17.
"Notice of allowance of Related U.S. Appl. No. 17/714,110", issued on Dec. 16, 2024, p. 1-p. 14.
"Office Action of Related U.S. Appl. No. 17/715,062", issued on Nov. 27, 2024, p. 1-p. 36.
"Office Action of U.S. Related Application, U.S. Appl. No. 17/715,025", issued on Mar. 11, 2025, p. 1-p. 41.
"Office Action of U.S. Related Application, U.S. Appl. No. 17/711,040", issued on Mar. 14, 2025, p. 1-p. 52.
"Office Action of U.S. Related Application, U.S. Appl. No. 17/714,123", issued on Apr. 22, 2025, p. 1-p. 44.

\* cited by examiner

FIG. 25
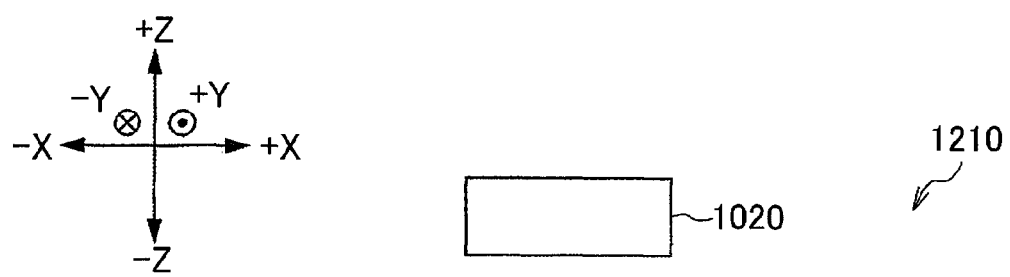
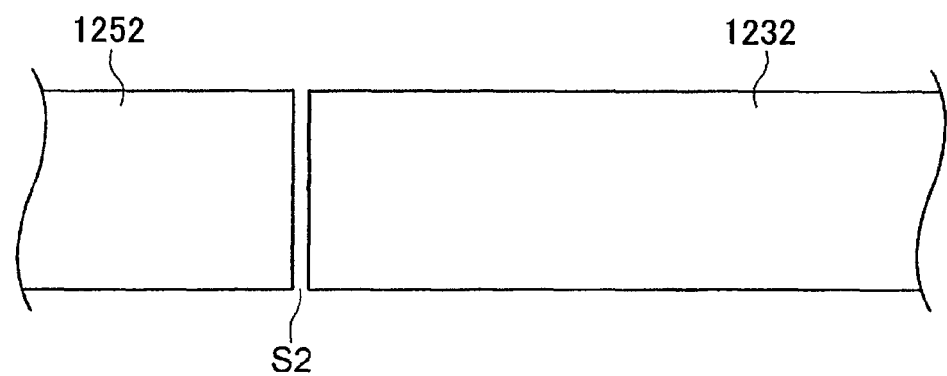

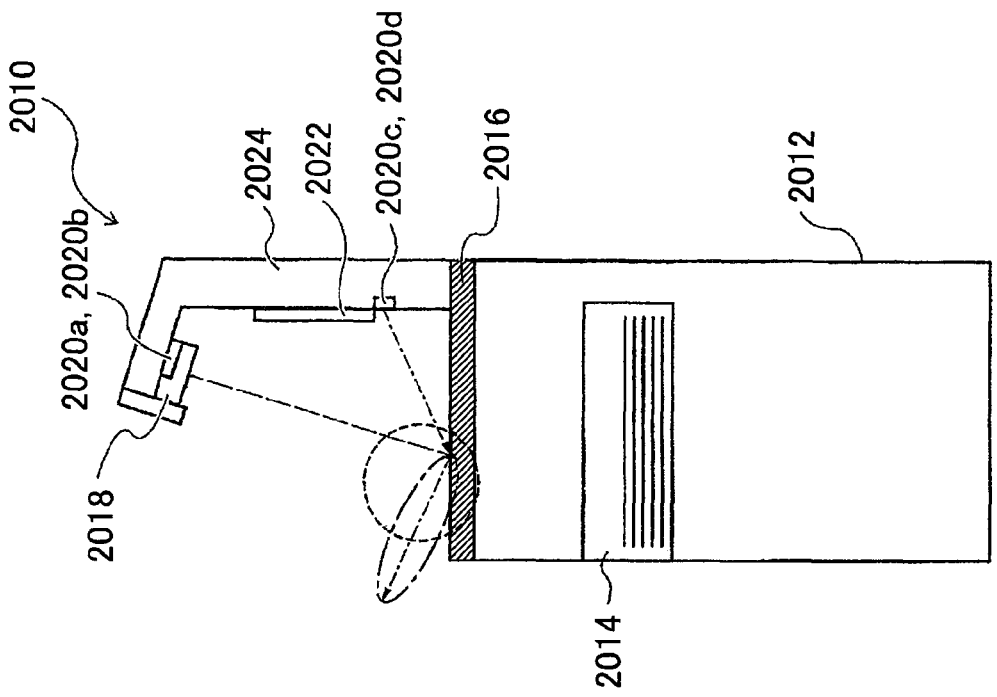
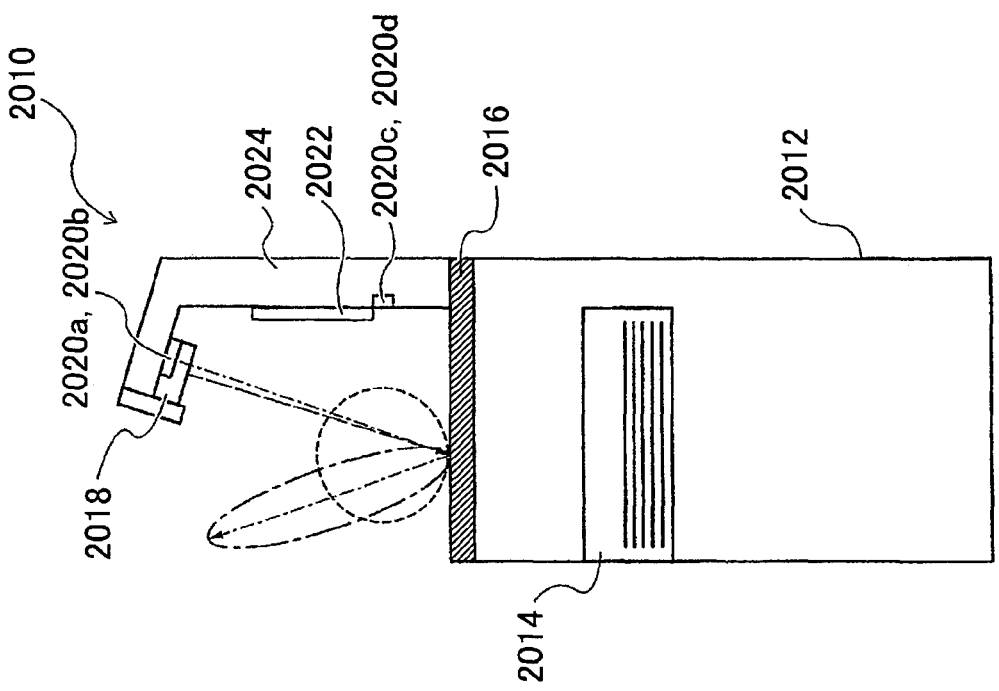

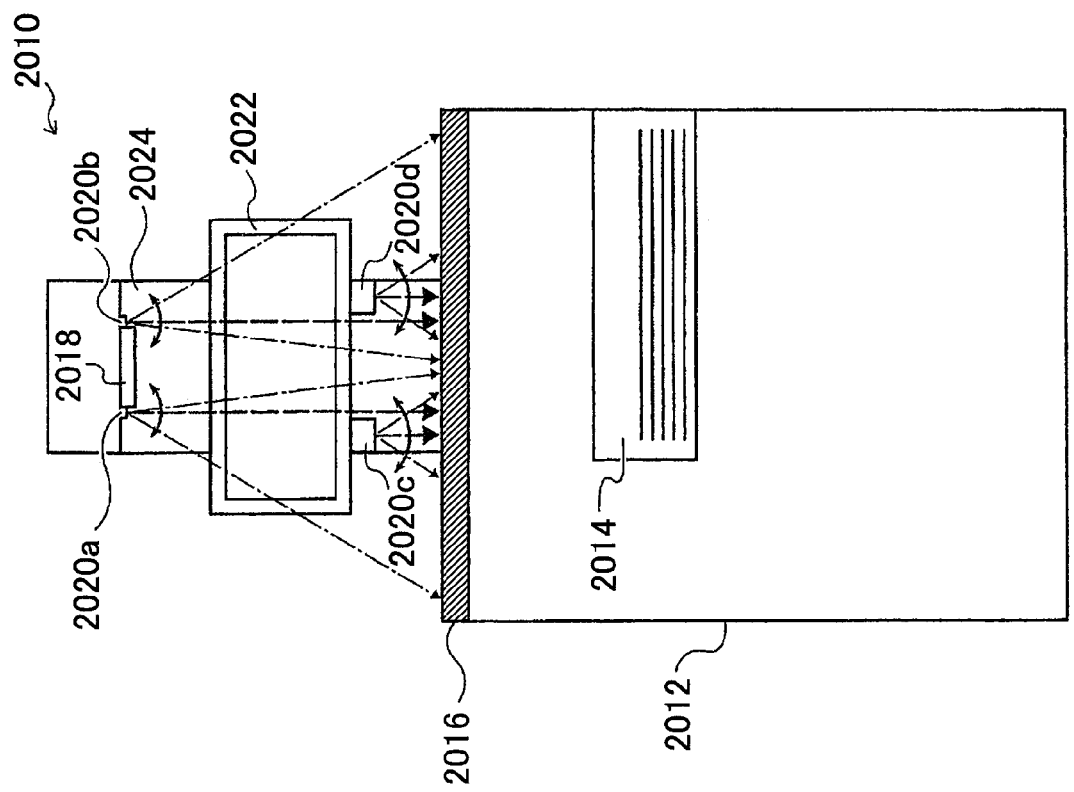
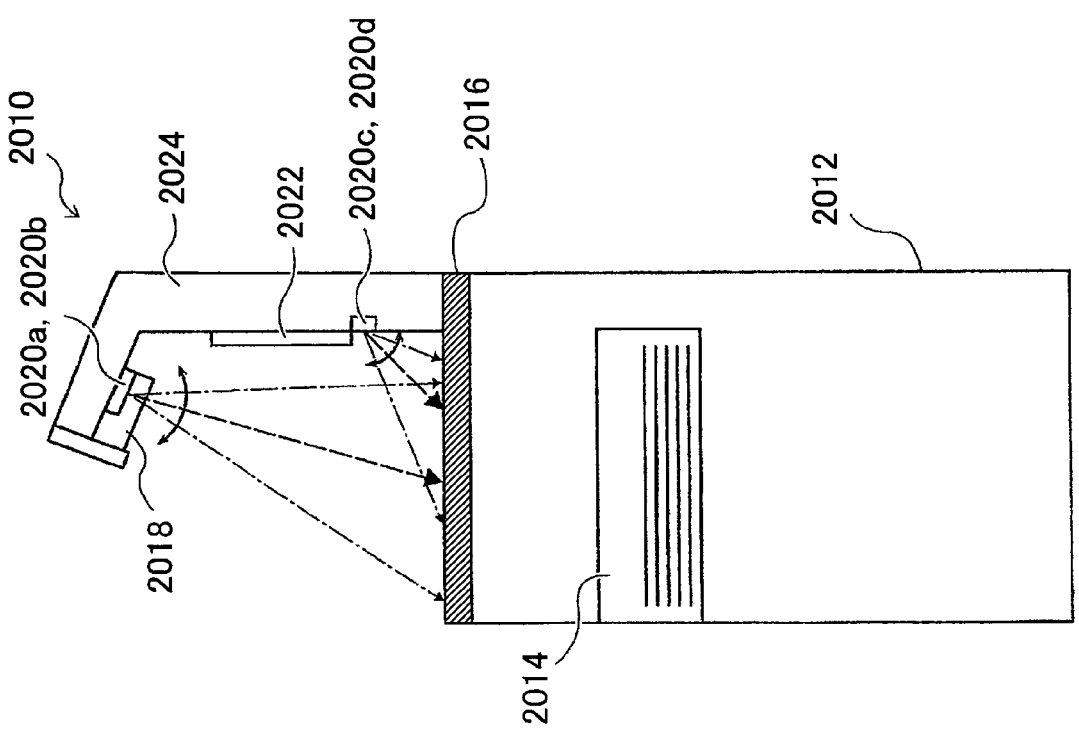

USER SIDE

DRIVING DEVICE AND IMAGE FORMING APPARATUS

CROSS-REFERENCE TO RELATED APPLICATIONS

This application is based on and claims priority under 35 USC 119 from Japanese Patent Application No. 2021-135289 filed Aug. 23, 2021, Japanese Patent Application No. 2021-135290 filed Aug. 23, 2021, Japanese Patent Application No. 2021-135489 filed Aug. 23, 2021, Japanese Patent Application No. 2021-135490 filed Aug. 23, 2021, Japanese Patent Application No. 2021-135491 filed Aug. 23, 2021, Japanese Patent Application No. 2021-135483 filed Aug. 23, 2021, Japanese Patent Application No. 2021-135487 filed Aug. 23, 2021, Japanese Patent Application No. 2021-135424 filed Aug. 23, 2021, and Japanese Patent Application No. 2022-003404 filed Jan. 12, 2022.

BACKGROUND

(i) Technical Field

The present disclosure relates to a driving device and an image forming apparatus.

(ii) Related Art

Technologies related to an image forming apparatus that includes a driving device have been proposed and disclosed in Japanese Unexamined Patent Application Publication No. 2020-137163 etc., for example.

In Japanese Unexamined Patent Application Publication No. 2020-137163, a driving motor that drives an image forming unit is disposed such that a driving shaft of the driving motor is directed inward from an outer wall of an apparatus body.

SUMMARY

Aspects of non-limiting embodiments of the present disclosure relate to providing a driving device in which a driving unit is disposed between an inner frame, which supports a driven unit, and an outer wall, the distance between the inner frame and the outer wall being reduced compared to the case where the driving unit is disposed between a portion of the inner frame that is the closest to the outer wall and the outer wall.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a driving device including: a frame disposed in the driving device to support a driven unit driven by the driving device, the frame including a first portion, a distance from which to an outer wall of an accommodation device that accommodates the driving device is shorter, and a second portion, a distance from which to the outer wall is longer than the distance from the first portion to the outer wall; and a driving unit disposed between the second portion and the outer wall, at least a part of the driving unit being away from the outer wall by the distance between the first portion and the outer wall or more.

BRIEF DESCRIPTION OF THE DRAWINGS

Exemplary embodiments of the present disclosure will be described in detail based on the following figures, wherein:

FIG. 25 is an enlarged sectional view illustrating a portion of a document reading device according to a first comparative example;

FIGS. 32A and 32B illustrate the overall configuration of the image processing apparatus, illustrating the function thereof;

FIGS. 34A and 34B illustrate the overall configuration of the image processing apparatus, illustrating the function thereof;

DETAILED DESCRIPTION

Exemplary embodiments of the present disclosure will be described below with reference to the drawings.

First Exemplary Embodiment

Figure 18:
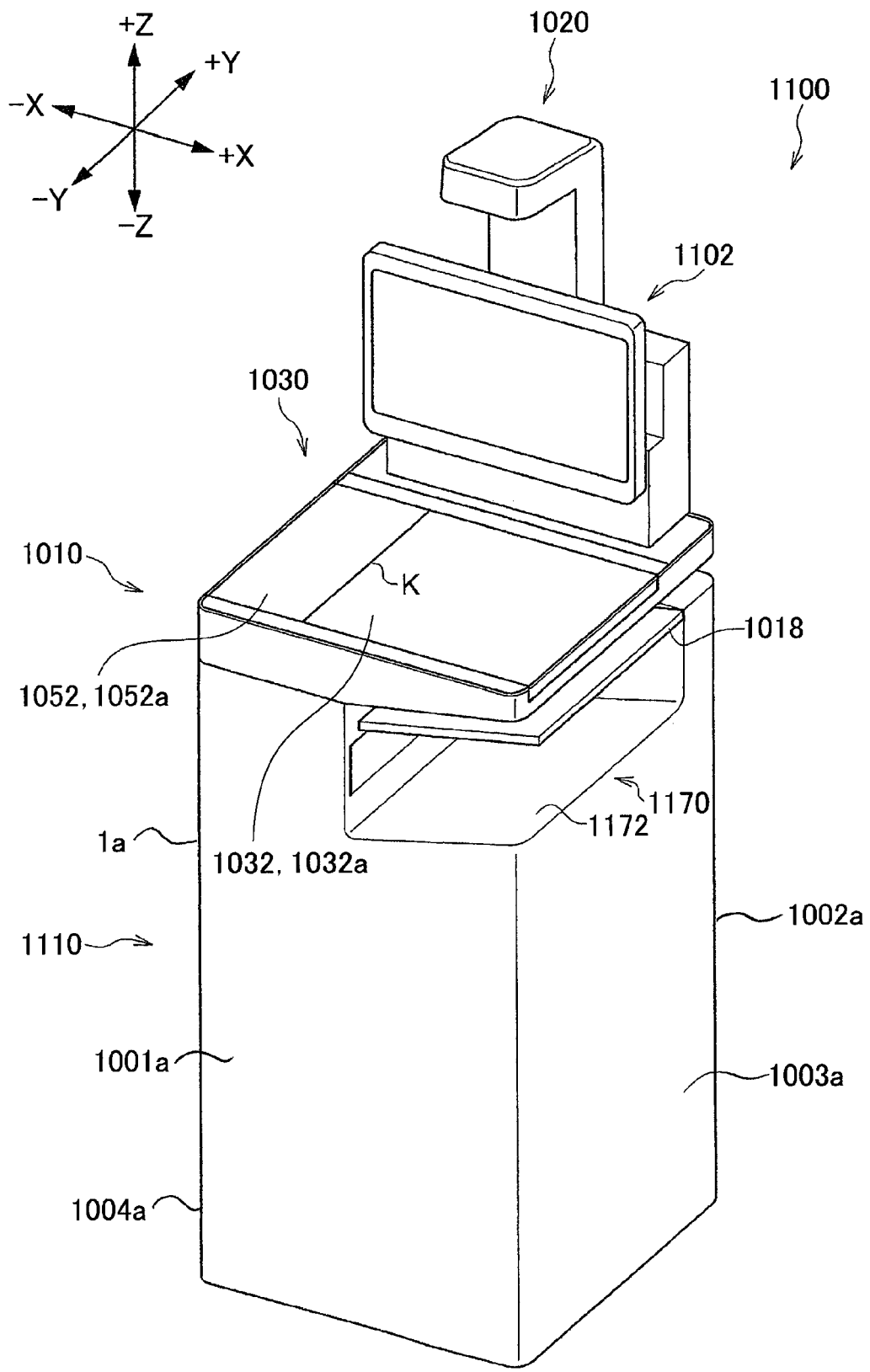
FIG. 18 is an external perspective view illustrating a state in which a document reading device is applied to the image forming apparatus according to the first exemplary embodiment of the present disclosure.

FIG. 18 illustrates an image forming apparatus including a driving device according to a first exemplary embodiment. In FIG. 18, the arrow X indicates the horizontal direction (width direction) of an image forming apparatus 1, the arrow Y indicates the depth direction of the image forming apparatus 1, and the arrow Z indicates the vertical direction (up-down direction) of the image forming apparatus 1. The arrow −X indicates the left side in the horizontal direction of the image forming apparatus 1, the arrow +X indicates the right side in the horizontal direction of the image forming apparatus 1, the arrow −Y indicates the front side in the depth direction of the image forming apparatus 1, the arrow +Y indicates the back side in the depth direction of the image forming apparatus 1, the arrow −Z indicates the lower side in the vertical direction of the image forming apparatus 1, and the arrow +Z indicates the upper side in the vertical direction of the image forming apparatus 1.

<Overall Configuration of Image Forming Apparatus>

The image forming apparatus 1 according to the first exemplary embodiment is configured as a color printer, for example. The image forming apparatus 1 roughly includes a document reading device (image reading device), an image processing apparatus, a sheet accommodation device, an image forming section of the image forming apparatus, and a driving device.

The image forming apparatus 1 includes an apparatus body 1a formed from a plurality of frames, exterior covers, etc. The exterior portion of the apparatus body 1a of the image forming apparatus 1 is constituted from exterior covers such as a front surface open/close cover 1001a, a back surface cover 1002a, a right side surface cover 1003a, and a left side surface cover 1004a. As illustrated in FIG. 18, the apparatus body 1a of the image forming apparatus 1 is formed to have a have a simple rectangular parallelepiped external shape that is square with generally equal sizes in a horizontal direction X and a depth direction Y as viewed in plan and that is vertically long along a vertical direction Z.

The apparatus body 1a of the image forming apparatus 1 is configured such that the sizes thereof along the horizontal direction X and the depth direction Y, that is, the installation area thereof, are set to be much smaller than those of an image forming apparatus of a floor surface installation type according to the related art.

The apparatus body 1a of the image forming apparatus 1 includes a document reading device 1030 provided at the upper end portion thereof to read an image of a document. The document reading device 1030 is formed such that the planar shape thereof is the same as that of the apparatus body 1a of the image forming apparatus 1. The apparatus body 1a includes a recording medium ejection portion 1170 that is provided below the document reading device 1030 and that is open on the front side along the depth direction Y and on the right side along the horizontal direction X. That is, the ejection portion 1170 of the apparatus body 1a of the image forming apparatus 1 constitutes an ejection portion 1170 of a so-called in-body ejection type in which the ejection portion 1170 is positioned at the upper part of the apparatus body 1a and the upper part of the ejection portion 1170 is covered by the document reading device 1030.

The components of the image forming apparatus 1 according to the first exemplary embodiment will be described below in the order of the document reading device, the image processing apparatus, the sheet accommodation device, the overall configuration of the image forming apparatus, and the driving device.

<Document Reading Device>

First, the configuration of the document reading device 1010 will be described.

As illustrated in FIG. 18, the image reading device 1010 is disposed at the upper end portion of the apparatus body 1a of the image forming apparatus 1. The document reading device 1010 is a device that reads an image of a document (not illustrated). Unlike the image forming apparatus according to the related art, the document reading device 1010 has a first reading mode to read an image of a document (not illustrated) disposed (placed) on the flat upper end surface (top surface) of the document reading device 1010, and a second reading mode to read an image of a document (not illustrated) while transporting the document. FIG. 18 illustrates the document reading device 1010 in the first reading mode. In the first reading mode, the document reading device 1010 which constitutes the upper end surface of the image forming apparatus 1 has a simple appearance with the upper end surface formed to be flat.

Figure 19:
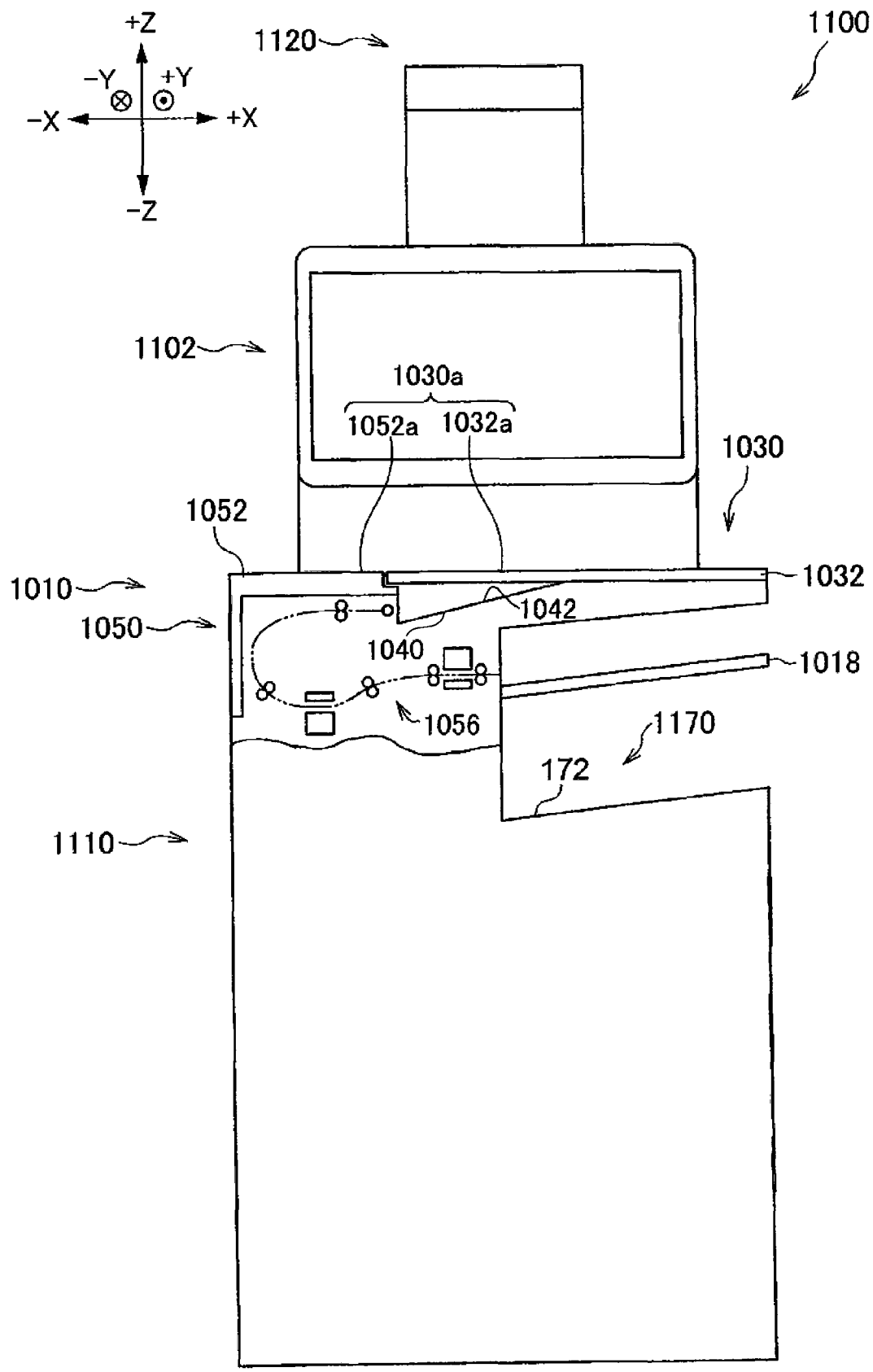
FIG. 19 illustrates the overall configuration of the document reading device of the image forming apparatus according to the first exemplary embodiment of the present disclosure.

As illustrated in FIGS. 18 and 19, the document reading device 1010 includes a camera portion (imaging section) 1020 that reads (captures) an image of a document G in the first reading mode, and a document table 1030 formed from the upper end surface of the document reading device 1010 disposed below the camera portion 1020. The document reading device 1010 further includes a loaded portion 1040 disposed below the document table 1030 to be used in the second reading mode, a reading portion 1050 disposed inside the document reading device 1010 to read an image of the document G in the second reading mode, and an ejection portion 1018 that ejects the document G, an image of which has been read. The ejection portion 1018 is disposed at the upper part of the ejection portion 1170 which ejects a recording medium on which an image has been formed. In the exemplary embodiment, as discussed above, the document reading device 1010 is integrally constituted as a part of the image forming apparatus 1. However, it is not necessary that the image forming apparatus 1 should include the document reading device 1010, and the image forming apparatus 1 may not include the document reading device 1010 as a matter of course.

In the first reading mode, the document reading device 1010 reads an image formed on the upper surface (surface) of the document G by imaging the document G placed on the document table 1030 using the camera portion 1020. In the second reading mode, meanwhile, the document reading device 1010 reads the document G disposed on the loaded portion 1040 using the reading portion 1050 while transporting the document G, and thereafter ejects the document G to the ejection portion 1018. The document G has a ground color with high lightness, for example. In the first exemplary embodiment, the ground color of the document G is white.

Figure 24:
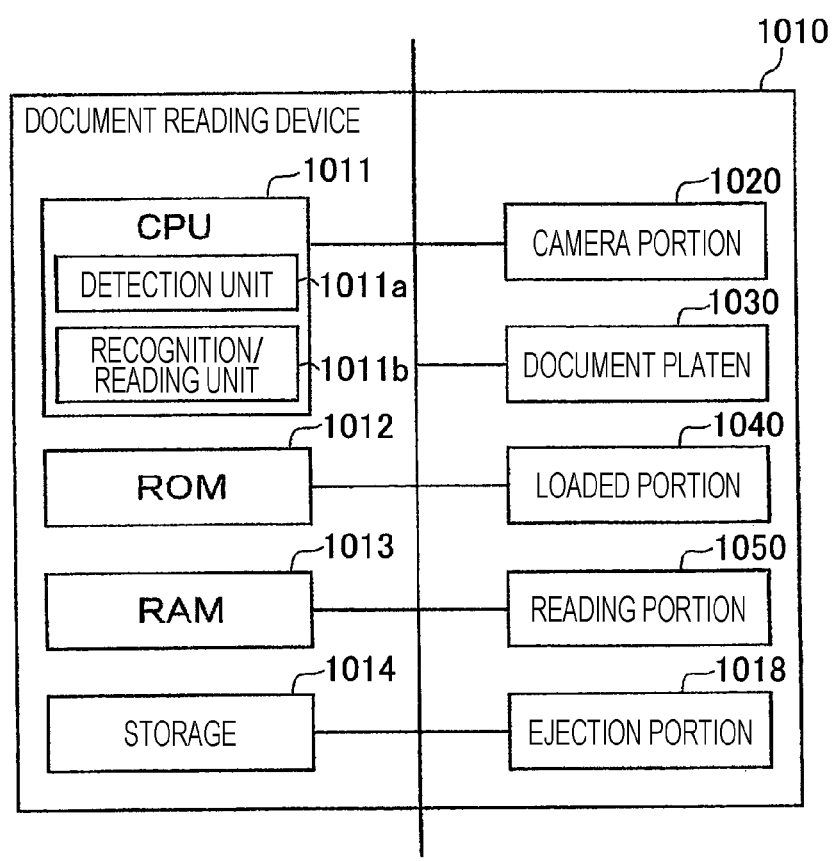
FIG. 24 is a block diagram illustrating the functions of the document reading device.

FIG. 24 is a block diagram illustrating the hardware configuration of the document reading device 1010. As illustrated in FIG. 24, the document reading device 1010 includes a central processing unit (CPU) 1011, a read only memory (ROM) 1012, a random access memory (RAM) 1013, and a storage 1014.

(Camera Portion)

The camera portion 1020 is a so-called document camera, and has a function of capturing an image of the document (an example of a subject) G placed on the document table 1030. While the document G to be placed on the document table 1030 may be a document of any size, the document G is preferably a document of a prescribed size (e.g. a document of A3 size or A4 size) that is available in the market or a document sized to be accommodated in an accommodation portion to be discussed later. The camera portion 1020 is an example of an imaging unit. The camera portion 1020 is installed above the document table 1030 and directed forward along the depth direction Y from the back surface side of the apparatus body 1a. In addition, the camera portion 1020 is directed downward along the vertical direction Z, and disposed to be able to read an image of the document G of a maximum readable size placed on the upper end surface of the document table 1030.

A so-called digital camera which has an optical system such as a lens and an imaging element that converts image light of the document G formed via the optical system into an electrical signal, for example, is used as the camera portion 1020. The functions of digital cameras and the image processing technologies have been drastically improved in recent years, and it has been possible to capture an image of the document G placed on the document table 1030 using the camera portion 1020 disposed above the document table 1030, and to read precisely developed image data on the document G. Examples of the imaging element include a charge-coupled device (CCD) and a metal-oxide-semiconductor (MOS). The optical axis of the camera portion 1020 extends along the vertical direction, for example, as seen from the front side of the apparatus body 1a. It is not necessary that the document table 1030 should be disposed along the horizontal, and the document table 1030 may be disposed as inclined with respect to the horizontal. In this case, the optical axis of the camera portion 1020 is disposed along the direction of the perpendicular to the document table 1030 disposed as inclined.

Figure 23:
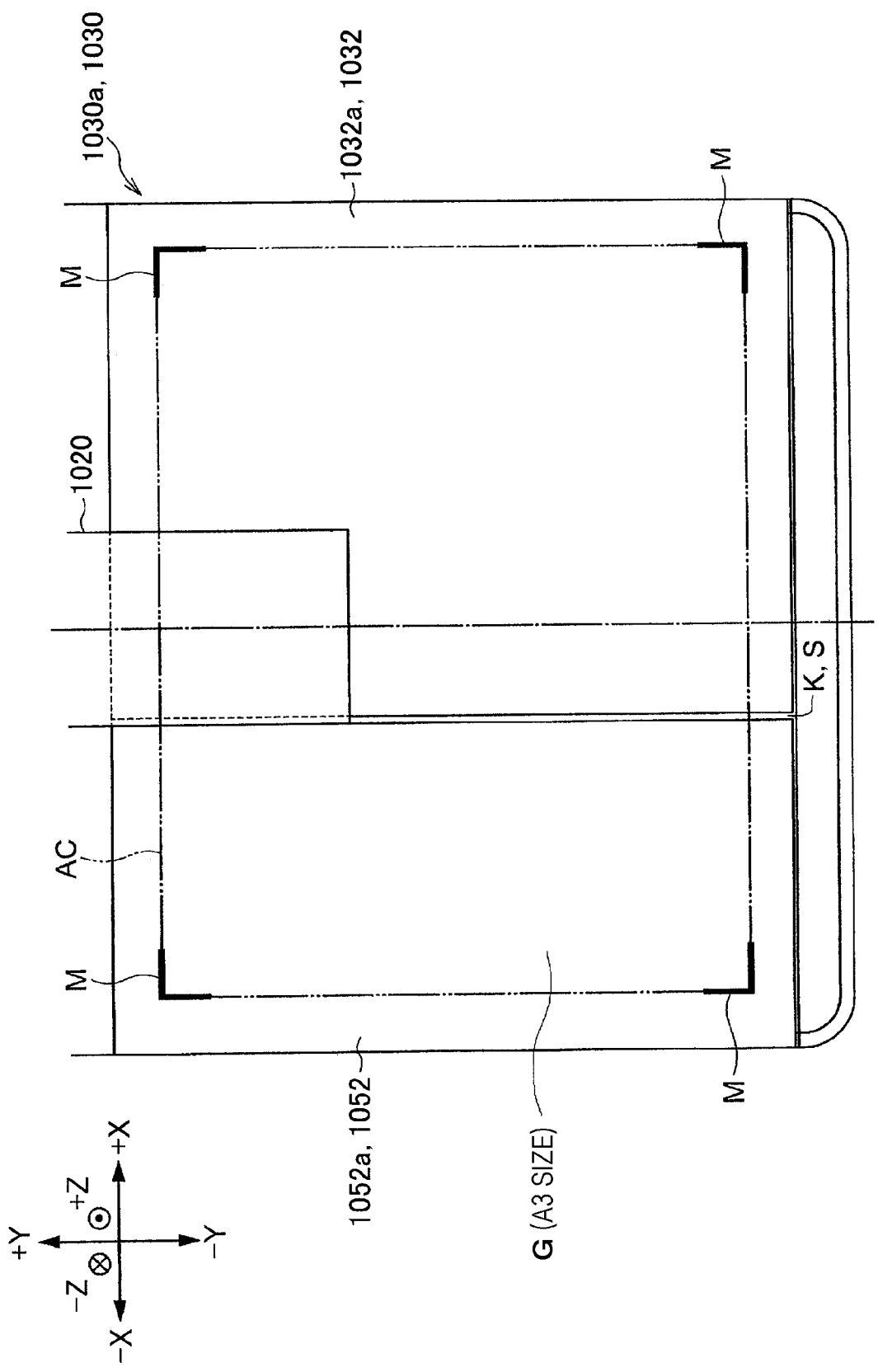
FIG. 23 is a plan view illustrating the configuration of the document reading device.

As illustrated in FIG. 23, an imaging range (angle of view) AC of the camera portion 1020 overlaps four markings M (to be discussed in detail later) formed on the document table 1030 in correspondence with the document G of A3 size placed with the longitudinal direction thereof corresponding to the horizontal direction X of the apparatus body 1a. In the first exemplary embodiment, the document G of A3 size is an example of a document of a maximum size that may be imaged using the camera portion 1020.

(Document Table)

As illustrated in FIG. 19, the document table 1030 is disposed below the camera portion 1020. The document table 1030 is an example of a disposed portion on which the document G to be imaged by the camera portion 1020 is to be disposed. The document table 1030 is constituted from an upper cover 1052 for the reading portion 1050, to be discussed later, disposed on the left side along the horizontal direction X, and a flat plate 1032 disposed side by side on the right side of the upper cover 1052 along the horizontal direction X to form the same flat surface together with an upper surface 1052*a* of the upper cover 1052. A minute gap S (see FIG. 22) is inevitably formed (present) between the upper cover 1052 and the flat plate 1032. The upper cover 1052 and the flat plate 1032 are examples of a first disposed portion which is a member that constitutes the document table 1030 in the first reading mode. The flat plate 1032, when used singly, is an example of a second disposed portion, on which the document G is to be disposed in the second reading mode. That is the document table 1030 is constituted to be divided into two members, namely the upper cover 1052 and the flat plate 1032. As illustrated in FIG. 23, both the upper cover 1052 and the flat plate 1032 are formed in a rectangular shape as viewed in plan in the vertical direction of the apparatus body 1*a*. The document table 1030 is spread along the horizontal direction X and the depth direction Y, and constitutes an arrangement surface 1030*a* on which the document G is to be disposed. The arrangement surface 1030*a* is formed when the flat plate 1032 is arranged such that an end surface of the flat plate 1032 on the left side along the horizontal direction X is joined to an end surface of the upper cover 1052 on the right side along the horizontal direction X via the minute gap S (to be discussed in detail later), and surrounded by the four markings M. That is, the arrangement surface 1030*a* is a portion of the upper surface 1052*a* of the upper cover 1052 and an upper surface 1032*a* of the flat plate 1032 arranged so as to be joined to the upper cover 1052 via the gap S, the portion being surrounded by the four markings M. The arrangement surface 1030*a* is formed so as to coincide with, or so as to be larger than, the imaging range (angle of view) AC of the camera portion 1020.

The document G is preferably placed on the document table 1030 such that the position of the center of the document G coincides with the center of the imaging range (angle of view) AC of the camera portion 1020. In particular, the document G of A4 size is preferably placed on the document table 1030 such that the position of the center of the document G coincides with the center of the imaging range (angle of view) AC of the camera portion 1020.

The document table 1030 includes four markings (so-called "registers") M that are used to align the document G to be placed on the arrangement surface 1030*a*. The four markings M correspond to the four corner portions of the document G of A3 size disposed with the longitudinal direction thereof corresponding to the horizontal direction X of the apparatus body 1*a*. The markings M are formed by applying a paint to the upper surface 1052*a* of the upper cover 1052 and the upper surface 1032*a* of the flat plate 1032, for example.

The markings M are formed in an L-shape (angled shape) as seen in the vertical direction Z of the apparatus body 1*a*, and disposed in correspondence with the four corners of the document G of A3 size with the longitudinal direction thereof corresponding to the horizontal direction X of the apparatus body 1*a*. Of the four markings M, the markings M on the left side along the horizontal direction X are formed on the upper surface 1052*a* of the upper cover 1052 of the reading portion 1050, and the markings M on the right side along the horizontal direction X are formed on the upper surface 1032*a* of the flat plate 1032. The four markings M define the arrangement surface 1030*a* when the upper cover 1052 and the flat plate 1032 are arranged so as to be aligned with each other with the gap S interposed therebetween. The center of the document G of A3 size corresponding to the four markings M coincides with the center of the imaging range (angle of view) AC of the camera portion 1020 in the position in the horizontal direction X of the apparatus body 1*a*.

Figure 20:
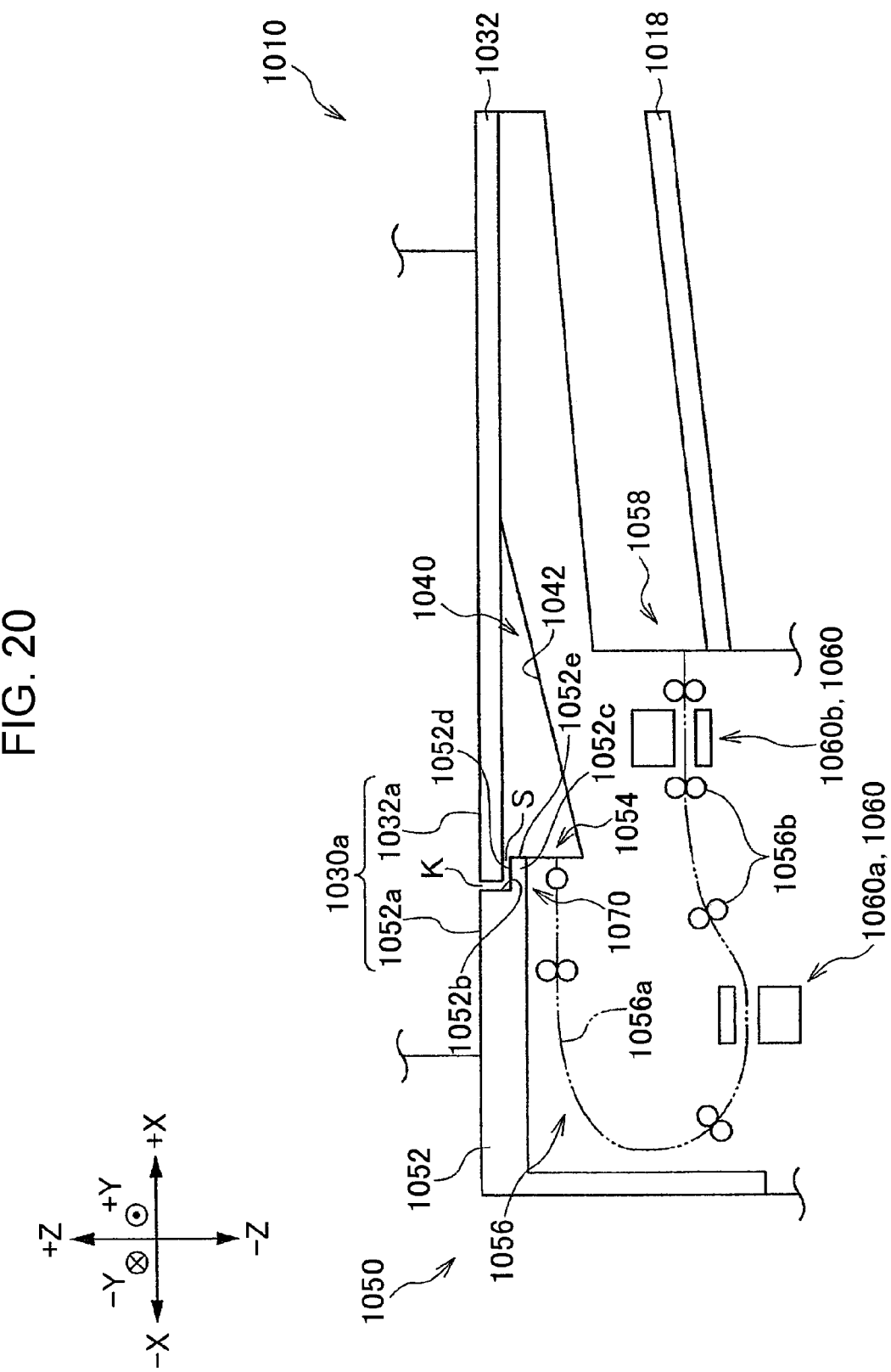
FIG. 20 is a sectional view illustrating the configuration of the document reading device in a first reading mode.
Figure 21:
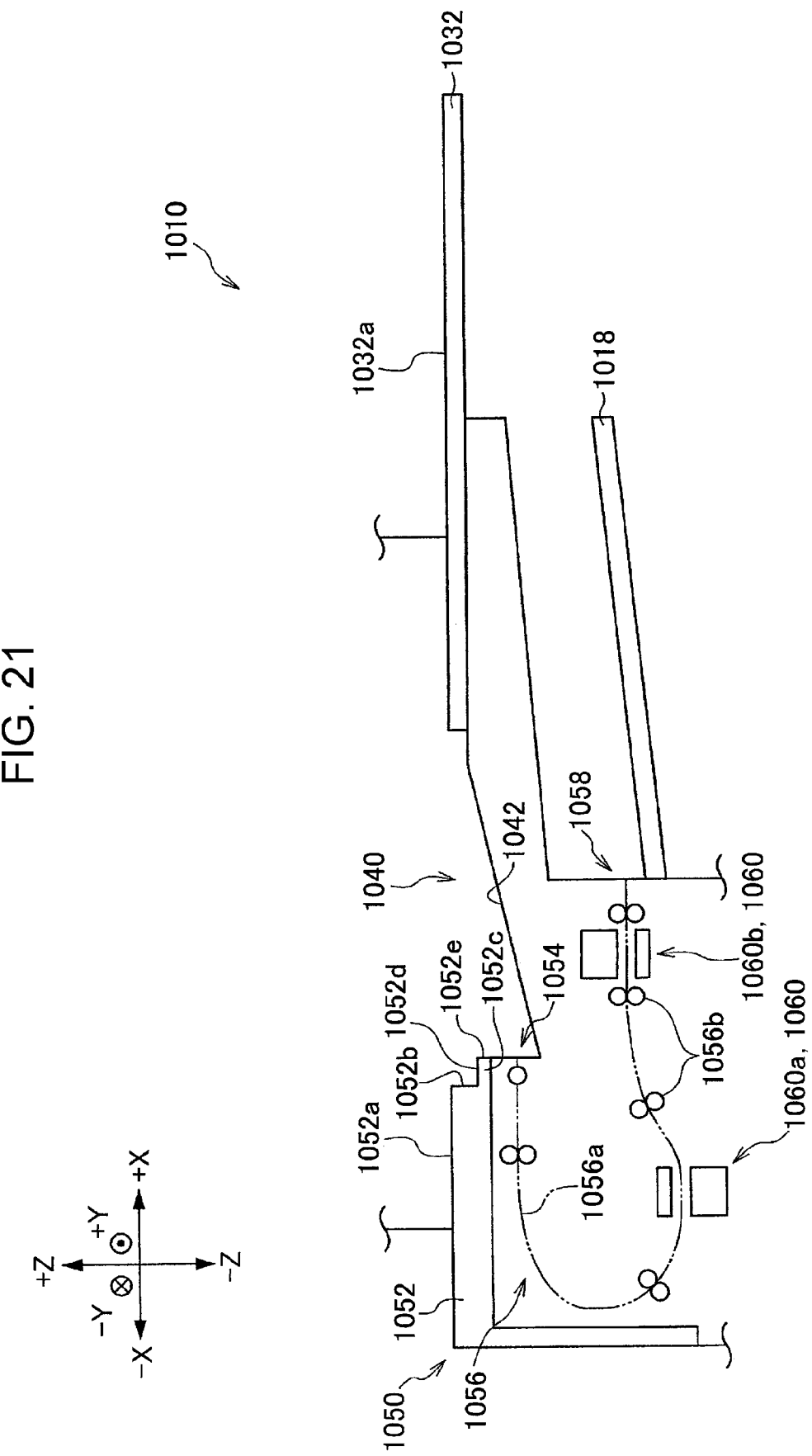
FIG. 21 is a sectional view illustrating the configuration of the document reading device in a second reading mode.

As illustrated in FIGS. 20 and 21, the flat plate 32 is a flat plate member provided to be slidable rightward along the horizontal direction X of the apparatus body 1*a* with respect to the upper cover 1052 of the reading portion 1050 by a guide mechanism (not illustrated). The flat plate 1032 constitutes the arrangement surface 1030*a*, and includes the upper surface 1032*a* that faces upward. The upper surface 1032*a* of the flat plate 1032 is an example of a second surface. The flat plate 1032 opens the upper side of the loaded portion 1040, to be discussed later, (see FIG. 21) by sliding rightward along the horizontal direction X of the apparatus body 1*a* from the state in which the flat plate 1032 is arranged side by side with the upper cover 1052 so as to form the arrangement surface 1030*a* (see FIG. 20). The flat plate 1032 blocks the upper side of the loaded portion 1040 when the flat plate 1032 is arranged side by side with the upper cover 1052 so as to form the arrangement surface 1030*a*. The length of the flat plate 1032 along the horizontal direction X of the apparatus body 1*a* is longer than half the length of the arrangement surface 1030*a* along the horizontal direction X of the apparatus body 1*a*.

The document table 1030 is considered to have a boundary line K formed by the upper cover 1052 and the flat plate 1032 (examples of a plurality of parts) on the arrangement surface 1030*a* (an example of a surface). The boundary line K is present at the middle portion obtained by dividing the arrangement surface 1030*a* into three equal portions along the horizontal direction X.

(Reading Portion)

As illustrated in FIG. 24, the CPU 1011 is a central processing unit, and executes various programs and controls various sections. That is, the CPU 1011 reads programs stored in the ROM 1012 or the storage 1014, and executes the programs using the RAM 1013 as a work area. The CPU 1011 controls the various components described above and performs various computation processes in accordance with the programs stored in the ROM 1012 or the storage 1013. In the first exemplary embodiment, the ROM 1012 or the storage 1013 stores a document detection program that detects edges (end edges) of the document G by executing a process of detecting a color difference or a brightness difference in an image captured by the camera portion 1020. The ROM 1012 or the storage 1013 also stores an image recognition program that reads an image formed on the upper surface (surface) of the document G by recognizing the document G on the basis of edge information on the document G detected by the document detection program. The CPU 1011 functions, on the basis of the document detection program, as a detection unit that detects edges of the document G disposed on the document table 1030 from an image captured by the camera portion 1020 on the basis of a color difference or a brightness difference between the arrangement surface 1030*a* and the document G. The CPU 1011 functions, on the basis of the image reading program, as a recognition/reading unit that recognizes a region of the document G on the basis of the edges of the document G detected by the document detection program and that reads an image formed on the document G.

In order to detect edges of the document G disposed on the document table 1030 from an image captured by the camera portion 1020, the color of the arrangement surface 1030a is determined such that a brightness difference determined in advance or more and a color difference determined in advance or more are present between the color of the arrangement surface 1030a and the color of the document G. However, this is not limiting as long as edges of the document G are detectable. For example, it is only necessary that a brightness difference that enables detection of edges of the document G or more should be present between the color of the arrangement surface 30a and the color of the document G, even if a color difference determined in advance or less is present. Specifically, while it is desirable that there should be a brightness difference of 50 LSB or more in an 8-bit environment, for example, it is only necessary that there should be at least a brightness difference of 20 LSB or more. Conversely, it is only necessary that a color difference that enables detection of edges of the document G or more should be present between the color of the arrangement surface 30a and the color of the document G, even if a brightness difference determined in advance or less is present.

The ROM 1012 stores various programs and various data. The RAM 1013 serves as a work area to temporarily store the programs and the data. The storage 1014 is constituted by a hard disk drive (HDD) or a solid state drive (SSD), and stores various programs including an operating system and various data.

(Loaded Portion)

As illustrated in FIG. 20, the loaded portion 1040 is a part of a housing of the document reading device 1010 disposed below the document table 1030 and having a bottom surface 1042 in a generally triangular sectional shape formed in a recessed shape with respect to the arrangement surface. An end portion of the bottom surface 1042 on the left side along the horizontal direction overlaps an end surface of the upper cover 1052 in the position in the horizontal direction X of the apparatus body 1a. The bottom surface 1042 of the loaded portion 1040 is inclined with respect to the horizontal direction such that an end portion thereof on the left side along the horizontal direction X is located below an end portion thereof on the right side.

As illustrated in FIG. 21, the loaded portion 1040 enables a plurality of documents G to be mounted on the bottom surface 1042 with the documents G abutting against an end portion on the left side along the horizontal direction X when an end portion of the flat plate 1032 on the left side along the horizontal direction X is slid rightward along the horizontal direction X with respect to the loaded portion 1040 to open the upper side of the loaded portion 1040. In this state, the loaded portion 1040 enables the document G, the length of which along the horizontal direction X of the apparatus body 1a is longer than the shorter dimension of A4 size, to be disposed on the loaded portion 1040 while overlapping the upper surface of the flat plate 1032 which has been slid and the bottom surface 1042 of the loaded portion 1040.

(Reading Portion)

The reading portion 1050 is a so-called auto document feeder (ADF), and has a function of transporting the document G disposed on the loaded portion 1040, separately one sheet at a time, to read an image of the document G. The reading portion 1050 includes the upper cover 1052, a reading port 1054, a transport portion 1056, a reading unit 1060, and an ejection port 1058.

The reading port 1054 is disposed adjacent to an end portion of the loaded portion 1040 on the left side along the horizontal direction X. The take-in port 1054 is an example of the opening. The ejection port 1058 is positioned below the take-in port 1054 and above the ejection portion 1170 of the image forming apparatus 1 in the position in the vertical direction Z of the apparatus body 1a. The ejection port 1058 is disposed adjacent to the ejection portion 1018 on the left side along the horizontal direction X.

The transport portion 1056 includes a transport path 1056a in a generally U-shape that extends from the take-in port 1054 to the ejection port 1058, and a plurality of transport rollers 1056b disposed along the transport path 1056a. The transport portion 1056 takes in the document G disposed on the loaded portion 1040, separately one sheet at a time, and transports the document G along the transport path 1056a toward the ejection port 1058 using the transport rollers 1056b.

The reading unit 1060 is a contact image sensor (CIS) disposed along the transport path 1056a, and reads an image formed on the front surface and the back surface of the document G transported by the transport portion 1056. The reading unit 1060 is constituted from a front surface reading portion 1060a that reads an image formed on the front surface of the document G, and a back surface reading portion 1060b that reads an image formed on the back surface of the document G.

The upper cover 1052 is formed to have a generally L-shaped vertical section. The upper cover 1052 is a flat plate member provided to open and close the housing of the document reading device 1010 so as to cover the upper part of the reading portion 1050. The upper cover 1052 constitutes the arrangement surface 1030a. The upper cover 1052 includes the upper end surface 1052a which extends along the horizontal direction X of the apparatus body 1a, and a left side surface formed as folded to extend downward along the vertical direction Z from an end portion of the upper end surface 1052a on the left side along the horizontal direction X. The upper end surface 1052a of the upper cover 52 is an example of a first surface. The upper cover 1052 also includes an end surface 1052b disposed so as to face an end surface of the flat plate 1032 on the left side along the horizontal direction, and a projecting portion 1052c that projects in a rectangular shape from the end surface at a position below the flat plate 1032. That is, the projecting portion 1052c is formed integrally with the upper cover 1052. The projecting portion 1052c includes an upwardly facing surface 1052d that faces upward and a distal end surface 1052e that extends along the horizontal direction to face rightward.

As illustrated in FIG. 20, when the upper cover 1052 and the flat plate 1032 form the arrangement surface 1030a, the projecting portion 1052c is disposed below an end portion of the flat plate 1032 on the left side along the horizontal direction X. That is, when the arrangement surface 1030a is formed, the projecting portion 1052c of the upper cover 1052 and an end portion of the flat plate 1032 on the left side along the horizontal direction X overlap each other in the vertical direction Z of the apparatus body 1a. In other words, when the arrangement surface 1030a is formed, the upper cover 1052 and the flat plate 1032 form an overlapping portion 1070 with the projecting portion 1052c of the upper cover 1052 and a part of an end portion of the flat plate 1032 on the left side along the horizontal direction X. At this time, the upwardly facing surface 1052d of the projecting portion 1052c faces the lower surface of the flat plate 1032. At this time, the projecting portion 1052c supports the flat plate 1032 from below with a support unit (not illustrated) such as a rib provided on the upwardly facing surface 1052d. That is, the projecting portion 1052c is able to support the flat plate 1032 from below.

In the present exemplary embodiment, the distal end surface 1052e of the upper cover 1052 is located on the side of the flat plate 1032 (i.e. the right side along the horizontal direction X) with respect to an end surface 1032e of the flat plate 1032 on the left side along the horizontal direction X. The distal end surface 1052e of the upper cover 1052 is an example of an "end portion of a first arrangement portion on the side of a second arrangement portion". The end surface 1032e of the flat plate 1032 on the left side along the horizontal direction X is an example of an "end portion of the second arrangement portion on the side of the first arrangement portion".

Figure 22:
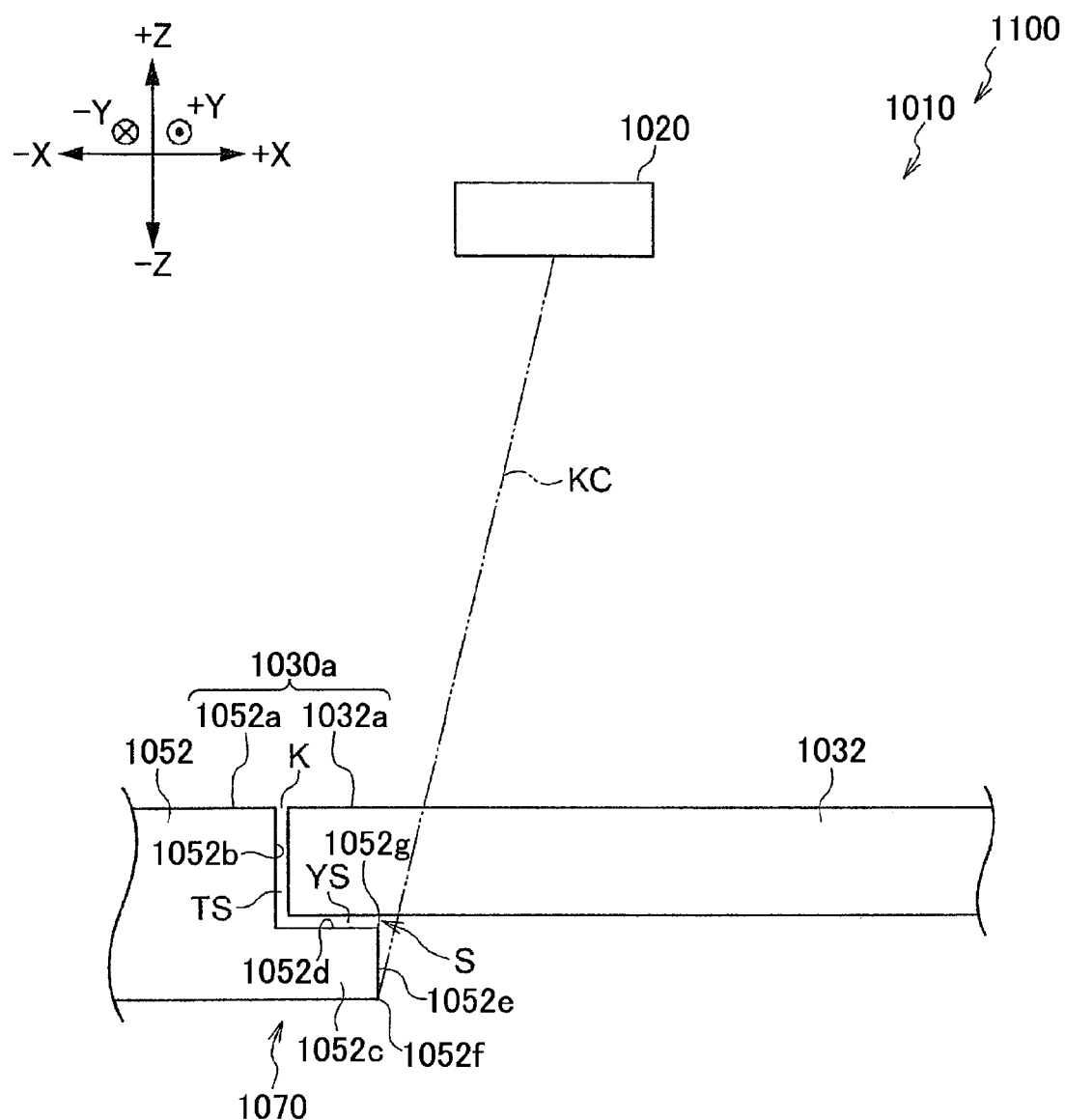
FIG. 22 is a sectional view illustrating the configuration of a portion of the document reading device.

As illustrated in FIG. 22, when the upper cover 1052 and the flat plate 1032 form the arrangement surface 1030a, the flat plate 1032 is disposed on a virtual line KC that connects between a lower edge 1052f of the distal end surface 1052e of the upper cover 1052 and the camera portion 1020. At this time, the flat plate 1032 is disposed on a virtual line KC that connects between an upper edge 1052g, which is positioned above the lower edge 1052f, of the distal end surface 1052e of the upper cover 1052 and the camera portion 1020. In other words, when the overlapping portion 1070 is formed, the distal end surface 1052e of the upper cover 1052 is blocked from the camera portion 1020 by the flat plate 1032. When the overlapping portion 1070 is formed, further, the lower edge 1052f of the distal end surface 1052e of the upper cover 1052 is blocked from the camera portion 1020 by the flat plate 1032. The lower edge 1052f of the distal end surface 1052e of the upper cover 1052 is an example of the lower end of the overlapping portion 1070.

(Clearance)

When the upper cover 1052 and the flat plate 1032 form the arrangement surface, the gap S is inevitably present between the upper cover 1052 and the flat plate 1032. The gap S is formed in an L-shape as seen in the depth direction Y of the apparatus body 1a by an end surface of the upper cover 1052 and the upwardly facing surface 1052d thereof and an end surface of the flat plate 1032 that faces the left side along the horizontal direction X and the lower surface thereof. In other words, when the overlapping portion 1070 is formed between the upper cover 1052 and the flat plate 1032 with the flat plate 1032 moved to an end portion on the left side along the horizontal direction X, the overlapping portion 1070 has the gap S which extends non-linearly as seen in the depth direction Y of the apparatus body 1a from the arrangement surface 1030a to the upper edge 1052g of the upper cover 1052 which is disposed below the flat plate 1032. The gap S includes, as seen in the depth direction Y of the apparatus body 1a, a vertical gap TS that extends in the vertical direction Z of the apparatus body 1a from the arrangement surface 1030a to the lower edge of an end surface of the flat plate 1032 on the left side along the horizontal direction X, and a horizontal gap YS that extends in the horizontal direction X of the apparatus body 1a below the lower edge of an end surface of the flat plate 1032 on the left side along the horizontal direction X of the apparatus body 1a. The lower edge of an end surface of the flat plate 1032 on the left side along the horizontal direction X corresponds to the lower end of the vertical gap TS. The vertical gap TS is covered by the projecting portion 1052c from below. In other words, the lower edge of an end surface of the flat plate 1032 on the left side along the horizontal direction X is covered by the projecting portion 1052c from below. The gap S is illustrated in an exaggerated manner as being formed between the upper cover 1052 and the flat plate 1032 in FIGS. 19, 20, 22, and 23.

In the first reading mode, when the upper cover 1052 and the flat plate 1032 form the arrangement surface 1030a, the flat plate 1032 is disposed on the virtual line KC that connects between the lower edge of an end surface of the flat plate 1032 on the left side along the horizontal direction X and the camera portion 1020. In other words, when the overlapping portion 1070 is formed, the lower edge positioned at an end portion of the flat plate 1032 on the left side along the horizontal direction X is covered by the flat plate 1032 from the camera portion 1020.

The gap S forms the boundary line K on the arrangement surface 1030a. In other words, the boundary line K is formed by the gap S, as illustrated in FIG. 22, between the upper end surface 1052a of the upper cover 1052 and the upper end surface 1032a of the top plate 1032. As illustrated in FIG. 23, the boundary line K extends linearly along the depth direction Y of the apparatus body 1a as viewed in plan along the vertical direction Z of the apparatus body 1a.

The surfaces of the upper cover 1052 and the top plate 1032 are painted in a color with low lightness, for example. In the first exemplary embodiment, the surfaces of the upper cover 1052 and the flat plate 1032 are painted in black. That is, the surface of the projecting portion 1052c of the upper cover 1052 is black in color. Therefore, in the first exemplary embodiment, the color difference between the overlapping portion 1070 and the upper cover 1052 and the flat plate 1032, the surfaces of both of which are black in color, is much smaller than the color difference between the upper cover 1052 and the flat plate 1032, the surfaces of which are black in color, and the document G, the ground color of which is normally white.

The surfaces of the upper cover 1052 and the flat plate 1032 may be painted in a light color with high brightness (e.g. white etc., to be specific), for example. In this case, the document G may have a ground color with low brightness (such as black, to be specific), for example. A variety of colors may be adopted as the colors of the document G, the upper cover 1052, and the flat plate 1032 as long as there is a brightness difference or a color difference between the arrangement surface 1030a and the document G.

The color of the arrangement surface 1030a is a color detected by the camera portion 1020 (an example of an imaging unit) as the color of the arrangement surface 1030a, and may not necessarily be the color of the arrangement surface 1030a itself. Likewise, the color of the document G is a color detected by the camera portion 1020 as the color of the document G, and may not necessarily be the color of the document G itself.

The upper cover 1052 is a panel-like member that has an L-shaped section as seen in the depth direction Y of the apparatus body 1a and that covers the upper side of the reading portion 1050. The upper cover 1052 has the upper surface 1052a that faces upward. As discussed above, the upper surface 1052a of the upper cover 1052 is an example of a surface that constitutes the placement surface for the document G. The flat plate 1032 is generally flush with the upper surface 1052a of the upper cover 1052 (so as to form the same plane) such that an edge of the flat plate 1032 on the left side along the horizontal direction X is aligned with an edge of the upper cover 1052 on the right side along the horizontal direction X with the gap S interposed therebetween.

The upper cover 1052 is configured to be able to expose the transport path 1056a by opening the upper side of the reading portion 1050 through an open/close mechanism (not illustrated) in the second reading mode. The reading portion 1050 has a function of enabling the document G that has jammed in the transport path 1056a to be taken out manually by opening the upper side of the reading portion 1050 through the open/close mechanism for the upper cover 1052 when the document G has jammed in the transport path 1056a because of a transport failure of the transport portion 1056.

As illustrated in FIG. 20, the ejection portion 1018 is a tray-like member disposed below the ejection port 1058 for the document G and above the ejection portion 1170 of the image forming apparatus 1 for the recording medium. The ejection portion 1018 has a function of receiving the document G transported through the transport path 1056 and ejected from the ejection port 1058.

<Function and Effect of Document Reading Device>

Next, the function and the effect of the document reading device according to the first exemplary embodiment will be described. In the case where parts etc. that are similar to those of the image forming apparatus 1 according to the first exemplary embodiment are used in describing aspects to be compared with the first exemplary embodiment, the reference numerals and the names of the parts etc. will be used as they are in the description.

The document table 1030 of the document reading device 1010 according to the first exemplary embodiment includes the overlapping portion 1070 which is provided below the placement surface 1030a and in which the upper cover 1052 and the flat plate 1032 overlap each other along the vertical direction Z of the apparatus body 1a. A comparison is made between the document reading device 1010 according to the first exemplary embodiment and a document reading device 1210 according to a first comparative aspect to be described below.

As illustrated in FIG. 25, the document reading device 1210 according to the first comparative aspect includes an upper cover 1252 in place of the upper cover 1052 according to the first exemplary embodiment. The upper cover 1252 does not include a component corresponding to the projecting portion 1052c of the upper cover 1052 according to the first exemplary embodiment. Specifically, an end surface of the upper cover 1252 according to the first comparative aspect on the right side along the horizontal direction X of the apparatus body 1a and an end surface of the flat plate 1032 on the left side along the horizontal direction X face each other in the horizontal direction X of the apparatus body 1a, and do not overlap each other in the vertical direction Z of the apparatus body 1a. That is, the document reading device 1210 according to the first comparative aspect does not include a component corresponding to the overlapping portion 1070 according to the first exemplary embodiment. When the arrangement surface 1030a is formed, a gap S2 is formed, in place of the gap S according to the first exemplary embodiment, between an end surface of the upper cover 1252 on the right side along the horizontal direction X and an end surface of the flat plate 1032 on the left side along the horizontal direction X. The gap S2 extends linearly along the vertical direction Z of the apparatus body 1a from the arrangement surface 1030a to the back surfaces (surfaces directed opposite to the arrangement surface 1030a) of the upper cover 1252 and the flat plate 1032 as seen in the depth direction Y of the apparatus body 1a. The document reading device 1210 according to the first comparative aspect is otherwise configured similarly to the document reading device 1010 according to the first exemplary embodiment.

The document reading device 1210 according to the first comparative aspect does not include a component corresponding to the overlapping portion 1070 according to the first exemplary embodiment. Hence, in the document reading device 1210 according to the first comparative aspect, light that has passed through the gap S2 and that has been reflected by a member disposed below the flat plate 1032 reaches the camera portion 1020. In this case, the gap S2 may be imaged by the camera portion 1020, as the gap S2 has a large brightness difference or color difference from the document table 1030, depending on the color of the member disposed below the flat plate 1032. Therefore, a detection unit 1011a may erroneously detect the gap S2 as an edge of the document G in a configuration in which only edges of the document G are detected from an image that illustrates the document G on the document table 1030 on the basis of the brightness difference or the color difference between the document G and the document table 1030.

In the document reading device 1010 according to the first exemplary embodiment, on the other hand, the overlapping portion 1070 is provided, and visible light L that is incident on the gap S from the side of the arrangement surface 1030a reaches the upwardly facing surface 1052d of the projecting portion 1052c disposed above the lower edge 1052f of the upper cover 1052. Therefore, in the document reading device 1010 according to the first exemplary embodiment, there is a low possibility that the detection unit 1011a erroneously detects the gap S as an edge of the document G, compared to the document reading device 1210 according to the comparative aspect, as the gap S is imaged by the camera portion 1020 with a small color difference from the document table 1030.

The document reading device 1010 according to the first exemplary embodiment is configured such that the flat plate 1032 is disposed on the virtual line KC that connects between the lower edge 1052f of the projecting portion 1052c of the upper cover 1052 and the camera portion 1020. A comparison is made between the document reading device 1010 according to the first exemplary embodiment and a document reading device 1310 according to a second comparative aspect to be described below.

Figure 26:
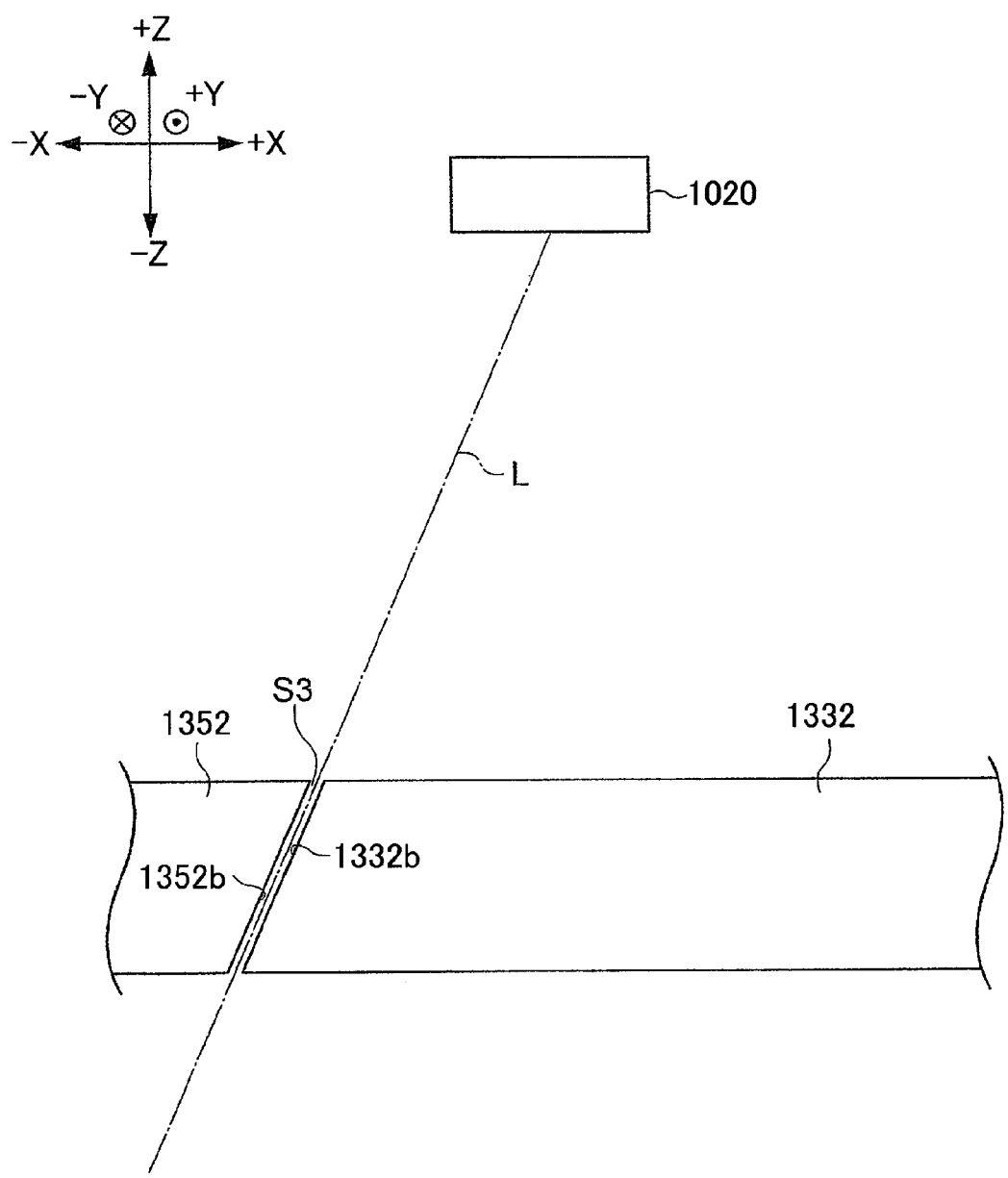
FIG. 26 is an enlarged sectional view illustrating a portion of a document reading device according to a second comparative example.

As illustrated in FIG. 26, the document reading device 1310 according to the second comparative aspect includes an upper cover 1352 and a flat plate 1332 in place of the upper cover 1052 and the flat plate 1032 according to the first exemplary embodiment. An end surface of the upper cover 1352 on the right side along the horizontal direction X and an end surface of the flat plate 1332 on the left side along the horizontal direction X face each other on the left side along the horizontal direction X with respect to the camera portion 1020. An end surface of the upper cover 1352 on the right side along the horizontal direction X and an end surface of the flat plate 1332 on the left side along the horizontal direction X are inclined leftward along the horizontal direction X from the upper side toward the lower side as seen in the depth direction Y of the apparatus body 1a. When the upper cover 1352 and the flat plate 1332 form the arrangement surface 1030a, the upper cover 1352 and the flat plate 1332 overlap each other in the vertical direction Z of the apparatus body 1a, with an end portion of the upper cover 1352 on the right side along the horizontal direction X disposed above an end portion of the flat plate 1332 on the left side along the horizontal direction X. That is, the document reading device 1320 according to the second comparative aspect includes an overlapping portion. A gap S3 formed between an end surface of the upper cover 1352 on the right side along the horizontal direction X and an end surface of the flat plate 1332 on the left side along the horizontal direction X extends linearly as inclined leftward along the horizontal direction X from the upper side toward the lower side as seen in the depth direction Y of the apparatus body 1*a*. In the document reading device 1320 according to the second comparative aspect, in the case where visible light L is incident from the camera portion 1020 toward the gap S3, the visible light L linearly reaches the lower edge of an end surface 1352*b* of the upper cover 1352 and the lower edge of an end surface of the flat plate 1332. That is, the document reading device 1320 according to the second comparative aspect is configured to enable the visible light L to linearly reach the lower end of the overlapping portion from the camera portion 1020. The document reading device 1310 according to the second comparative aspect is otherwise configured similarly to the document reading device 1010 according to the first exemplary embodiment.

The document reading device 1310 according to the second comparative aspect is configured to enable the visible light L to linearly reach the lower end of the overlapping portion from the camera portion 1020. Therefore, the visible light L which is incident on the gap S3 from the camera portion 1020 reaches the lower side of the upper cover 1352 and the flat plate 1332 without being blocked. In this case, the gap S3 may be imaged by the camera portion 1020, as the gap S3 has a large color difference from the document table 1030. Therefore, the detection unit may erroneously detect the gap S3 as an edge of the document G in a configuration in which only edges of the document G are detected from an image that illustrates the document G disposed on the document table 1030 on the basis of the color difference between the document G and the document table 1030.

On the other hand, the document reading device 1010 according to the first exemplary embodiment is configured such that the flat plate 1030 is disposed on the virtual line KC that connects between the lower edge of the projecting portion of the upper cover 1052 and the camera portion 1020. Therefore, the visible light directed from the camera portion 1020 toward the lower edge of the projecting portion of the upper cover 1052 along the virtual line KC that connects between the camera portion 1020 and the lower edge is blocked by the flat plate 1032. As discussed above, the visible light L which is incident on the gap S from the camera portion 1020 reaches the upwardly facing surface of the projecting portion.

Image Processing Apparatus (2010)

Figure 28:
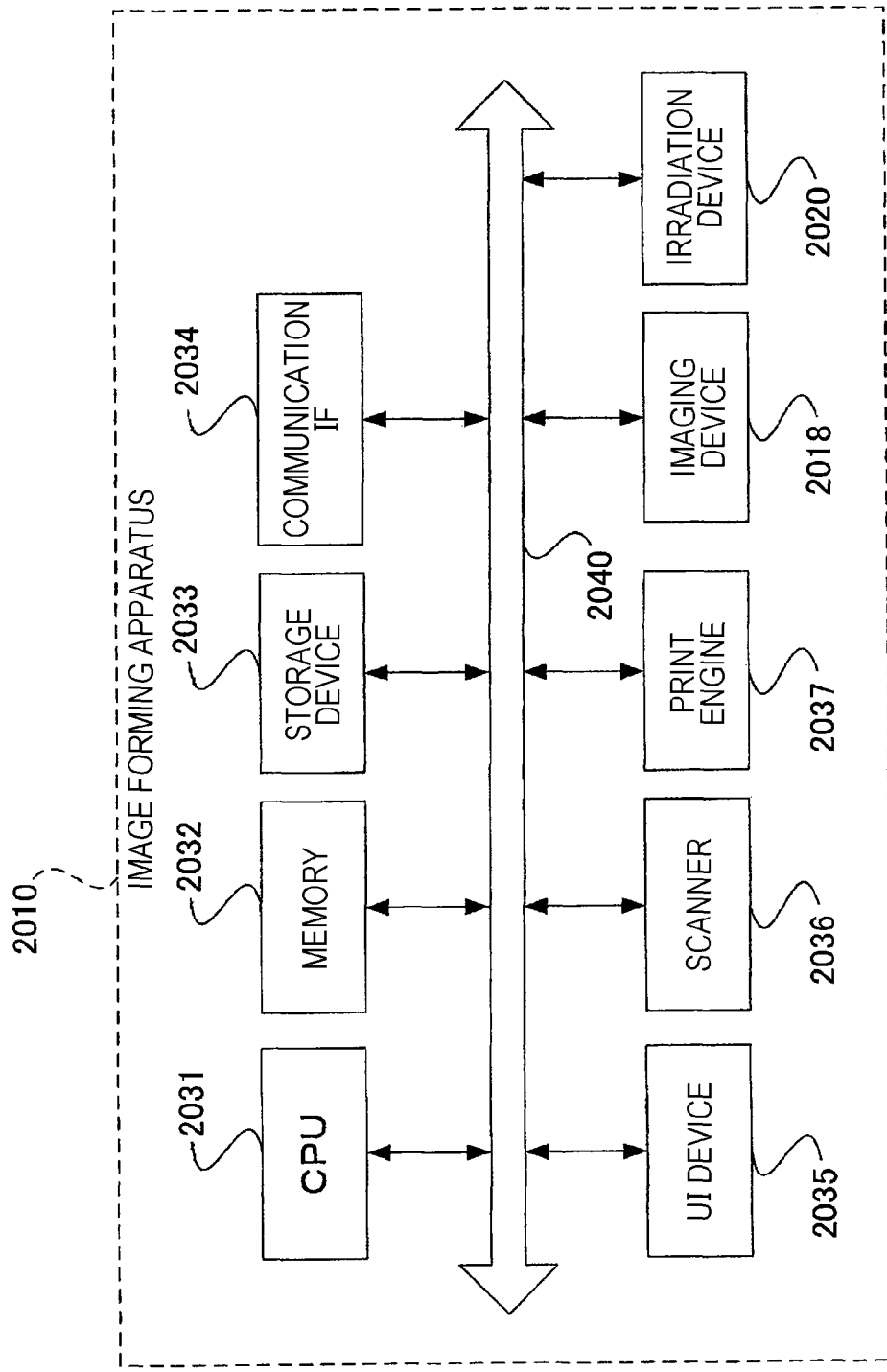
FIG. 28 is a block diagram illustrating the functions of the image processing apparatus.

FIG. 28 is a block diagram illustrating the hardware configuration of an image processing apparatus 2010 of the image forming apparatus according to the first exemplary embodiment.

As illustrated in FIG. 28, the image processing apparatus 2010 includes a CPU 2031, a memory 2032, a storage device 2033 such as a hard disk drive, a communication interface (IF) 2034 that transmits and receives data to and from an external device etc. via a network, a user interface (UI) device 2035 that includes a touch screen or a liquid crystal display and a keyboard, a scanner (document reading device) 2036, a print engine 2037, an imaging device 2018, and an irradiation device 2020. Such components are connected to each other via a control bus 2040.

The print engine 2037 forms (prints) an image on a recording medium through processes such as charging, exposure, development, transfer, and fixation.

The CPU 2031 is a processor that controls operation of the image forming apparatus 1 by executing a predetermined process on the basis of a control program stored in the memory 2032 or the storage device 2033. In the exemplary embodiment, the CPU 2031 reads and executes the control program stored in the memory 2032 or the storage device 2033. However, such a program may be stored in a storage medium such as a CD-ROM to be provided to the CPU 2031.

Figure 29:
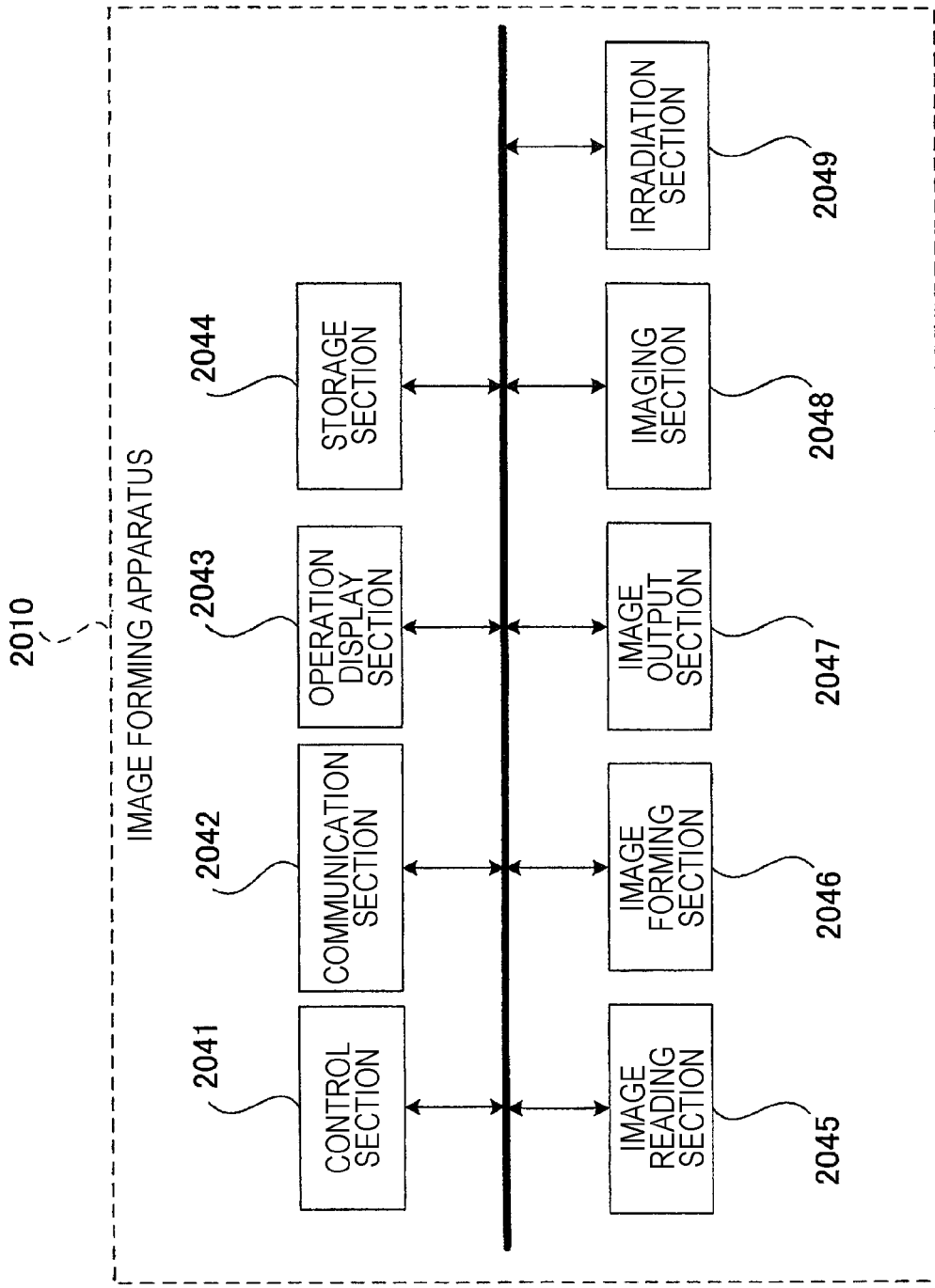
FIG. 29 is a block diagram illustrating the functions of the image forming apparatus.

FIG. 29 is a block diagram illustrating the functional configuration of the image forming apparatus which is implemented by executing the control program described above.

As illustrated in FIG. 29, the image forming apparatus 1 according to the first exemplary embodiment includes a control section 2041, a communication section 2042, an operation display section 2043, a storage section 2044, an image reading section 2045, an image forming section 2046, an image output section 2047, an imaging section 2048, and an irradiation section 2049.

The communication section 2042 receives a print job (an example of a print instruction) transmitted from a terminal device (not illustrated). The print job may be a print job based on image information on a document read by the document reading device 1010, for example.

The control section 2041 performs control so as to generate image data to be used as print data on the basis of the print job received by the communication section 2042 and output the generated image data to the image output section 2047.

The storage section 2044 stores various data such as the image data generated by the control section 2041.

The image output section 2047 outputs an image onto a recording medium on the basis of the control performed by the control section 2041.

The operation display section 2043 is controlled by the control section 2041, and displays various information on an operation panel or a display screen of a terminal device etc. The operation display section 2043 receives input of information on various operations performed by a user.

The image reading section 2045 performs scan operation to read an image of a subject such as various documents on the basis of the control performed by the control section 2041. The image reading section 2045 is constituted from the document reading device 1010 etc., for example.

The image forming section 2046 forms an image of the subject placed on the placement portion on the basis of the control performed by the control section 2041.

The imaging section 2048 is controlled by the control section 2041, and images the subject. The control section 2041 functions as an image acquisition section that acquires image data on the subject imaged by the imaging section.

Figure 27A:
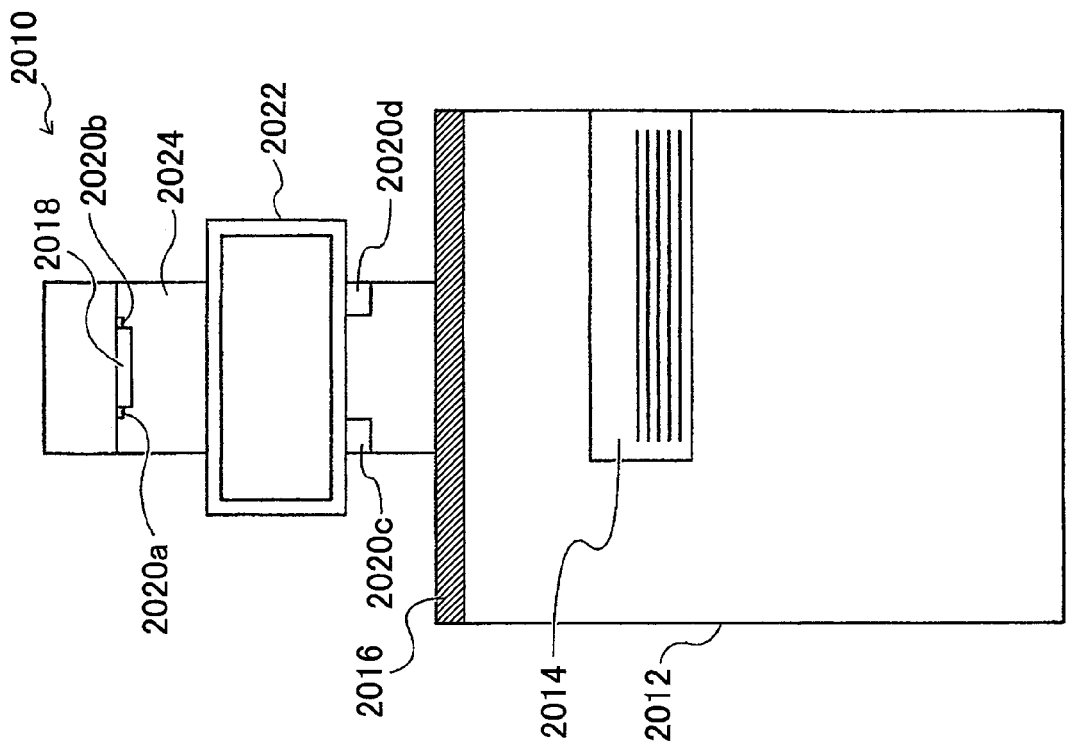
FIGS. 27A and 27B illustrate the overall configuration of an image processing apparatus applied to the image forming apparatus according to the first exemplary embodiment of the present disclosure.
Figure 27B:
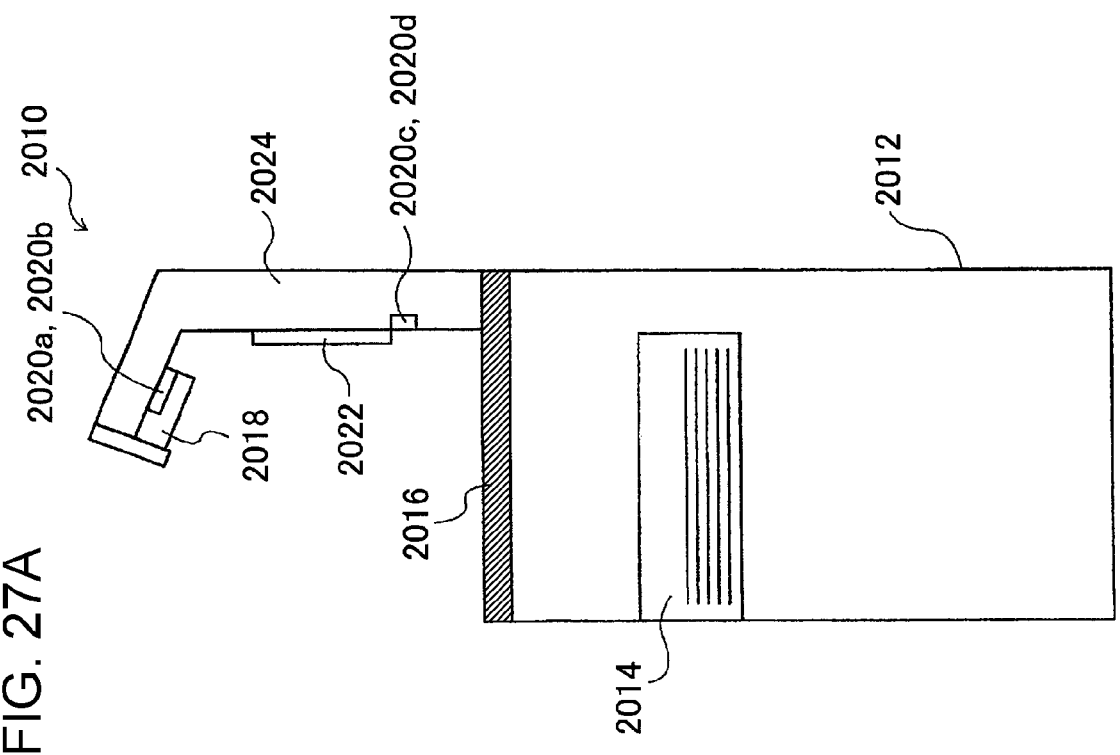

The irradiation section 2049 is controlled by the control section 2041, and radiates light to the subject placed on a placement portion 2016 (see FIGS. 27A and 27B).

The control section 2041 performs control so as to turn on and off each of a plurality of light sources 2020*a*, 2020*b*, 2020*c*, and 2020*d* and adjust the intensity or the optical axis of radiated light by controlling the irradiation section 2049.

The control section 2041 performs control so as to turn off an operation panel 2022 (see FIGS. 27A and 27B) when the imaging section 2048 images the subject.

Figure 30:
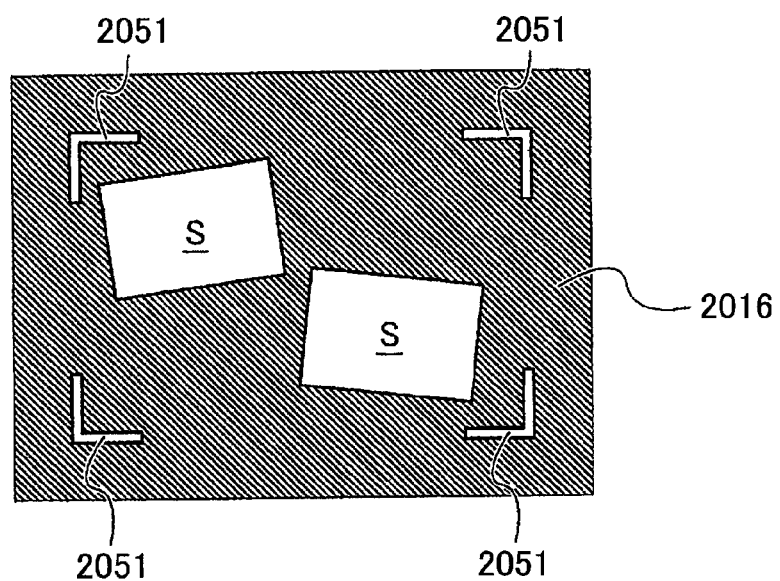
FIG. 30 is a plan view illustrating the configuration of the document reading device.

FIG. 30 illustrates the placement portion 2016 as seen from above, illustrating how subjects (documents) S are placed on the placement portion 2016.

The placement portion 2016 according to the first exemplary embodiment is configured such that there is a brightness difference determined in advance or more between a painted portion or a material portion of all or a part of the upper part of the placement portion 2016 and the subjects S placed thereon and there is a color difference determined in advance or more between the paint color or the material color of all or a part of the upper part of the placement portion 2016 and the color of the subjects S placed thereon, so that the subjects S and the placement portion 2016 are distinguishable from each other. However, this aspect is not limiting as long as the subjects S and the placement portion 2016 are distinguishable from each other. For example, there may be a color difference determined in advance or less between the paint color or the material color of all or a part of the upper part of the placement portion 2016 and the color of the subjects S placed thereon as long as there is such a brightness difference or more that renders the subjects S and the placement portion 2016 distinguishable from each other. Specifically, while it is desirable that there should be a brightness difference of 50 LSB or more in an 8-bit environment, for example, it is only necessary that there should be at least a brightness difference of 20 LSB or more. Conversely, there may be a brightness difference determined in advance or less between the painted portion or the material portion of all or a part of the upper part of the placement portion 2016 and the color of the subjects S placed thereon as long as there is such a color difference or more that renders the subjects S and the placement portion 2016 distinguishable from each other.

In the case where colors are expressed by a Y value that represents brightness in the YCbCr color system, for example, subjects S in a color expressed by a Y value that is closer to a value that expresses white than to a value that expresses black are placed on the placement portion 2016. In an 8-bit environment, for example, subjects S, the Y value of which is expressed by a value that is closer to 255 than to 0, are placed on the placement portion 2016. In the case where colors are expressed by a Y value that represents brightness in the YCbCr color system, the color of the upper part of the placement portion 2016 is a color expressed by a value that is closer to a value that expresses black than to a value that expresses white, so that the subjects S and the placement portion 2016 are distinguishable from each other in an image captured by the imaging section 2048. In an 8-bit environment, for example, the color of the upper part of the placement portion 2016 is a color expressed by a Y value that is closer to 0 than to 255. In the case where colors are expressed by a Y value that represents brightness in the YCbCr color system, it is only necessary that the color of all or a part of the upper part of the placement portion 2016 should be a color expressed by a Y value that is closer to a value that expresses black than to a value that expressed white.

The paint color or the material color of all or a part of the upper part of the placement portion 2016 is black or a color with optical density set in advance or more. The optical reflectance of the paint color or the material color of all or a part of the upper surface of the placement portion 2016 is equal to or less than 10%. In the first exemplary embodiment, the term "black" refers to a color, the chromaticity of which deviates from an achromatic color (x=0.333, y=−0.333, Y=0) by a color difference ΔE of 3 or less, the optical density (OD) value of which is 1.0 or more, or the Y value of which is 50 or more, the Y value representing brightness in the YCbCr color system. However, the above definition of black is determined for the placement portion 2016 according to the exemplary embodiment, and may be changed in accordance with the actual environment around the apparatus and the performance of the imaging section.

The color of the upper part of the placement portion 2016 is not limited to the paint color or the material color of the placement portion 2016, and may be a color projected to the placement portion 2016 by the irradiation section 2049 or a color synthesized from a color projected to the placement portion 2016 and a shadow.

Marks 2051 are provided at the four corners of the upper surface of the placement portion 2016. The marks 2051 are the same as the markings M.

The marks 2051 represent the position for placement of subjects, or a range in which the subjects on the placement portion 2016 may be captured by the imaging device or a range for placement of the subjects on the placement portion 2016 from which image data may be acquired by the control section 2041. As illustrated in FIG. 30, the marks 2051 are in an angled hook shape, for example. In the case where colors are expressed by a Y value that represents brightness in the YCbCr color system, the color of the marks 2051 may be a color expressed by a Y value that is closer to a value that expresses white than to a color that expresses black, and may be white, for example. In other words, the optical reflectance of the color of the marks 2051 is a value set in advance or more, and 80% or more, for example.

The marks 2051 are not limited to being in an angled hook shape, and may be guide lines etc. In the first exemplary embodiment, the marks 2051 are provided to distinguish a region in which subjects may be placed and a region in which subjects may not be placed. Specifically, the marks 2051 may be implemented by angled hooks etc. that indicate the range for placement of the subjects as discussed above, the color of the placement portion 2016 in the range for placement of the subjects being changed from the color in the other range, the material of the placement portion 2016 in the range for placement of the subjects being changed from the material in the other range, the irradiation device irradiating the range for placement of the subjects, etc.

Figure 31:
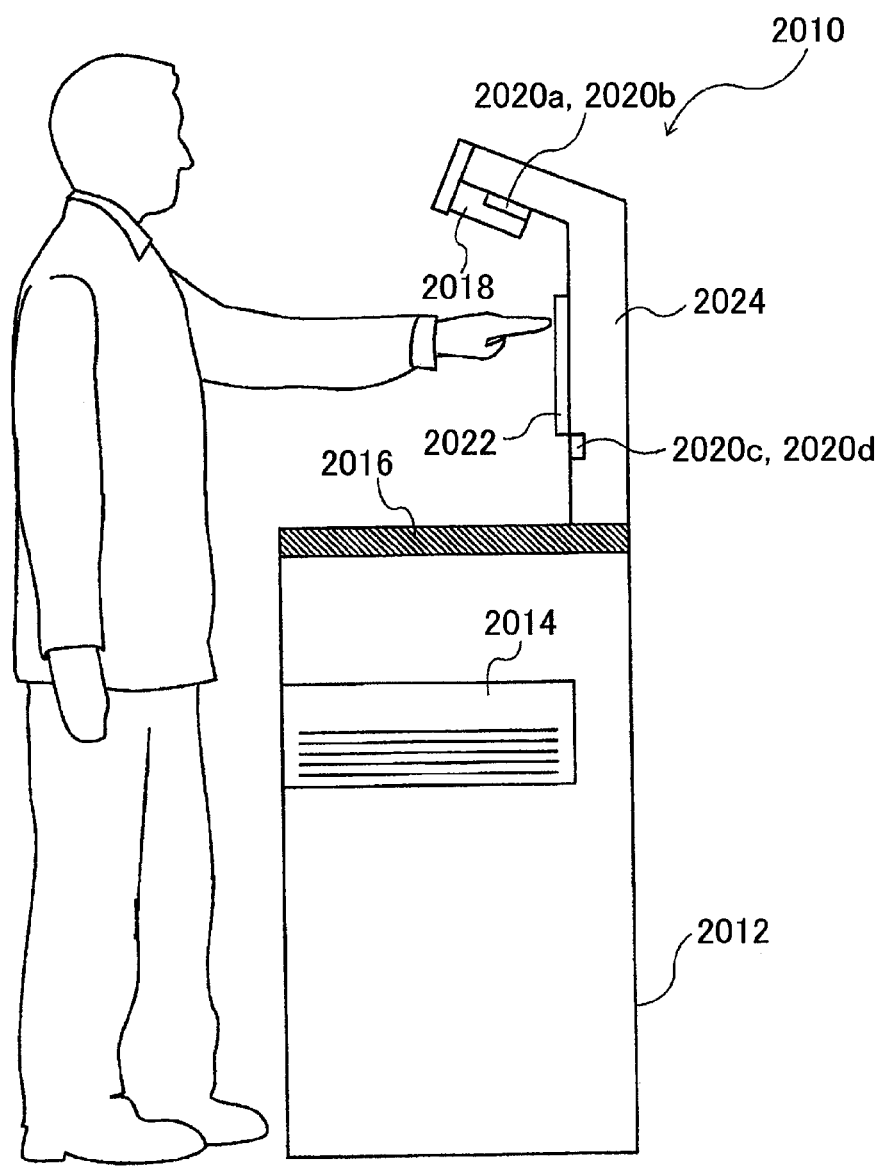
FIG. 31 illustrates a state in which the image forming apparatus is operated.

FIG. 31 illustrates how a user operates the image forming apparatus 1.

The image forming apparatus 1 includes the placement portion 2016, the operation panel 2022, an ejection tray 2014, etc. disposed at positions at which such components are operable by a person in the standing state and configured to be easily operable by the user in the standing state.

As illustrated in FIGS. 27A and 27B and 31, the paint color and the material color of the placement portion 2016 are also used on a portion of the surface to be accessed by the user, and are formed on a part of the surface to be accessed by the user between the top surface of the apparatus body 2012 and the ejection tray 2014.

The paint color or the material color of the placement portion 2016 and a different color are used between the top surface of the apparatus body 2012 and the ejection tray 2014. Specifically, the paint color or the material color of the placement portion 2016 is used on the upper side, and the different color is used on the lower side, between the top surface of the apparatus body 2012 and the ejection tray 2014.

Figure 33:
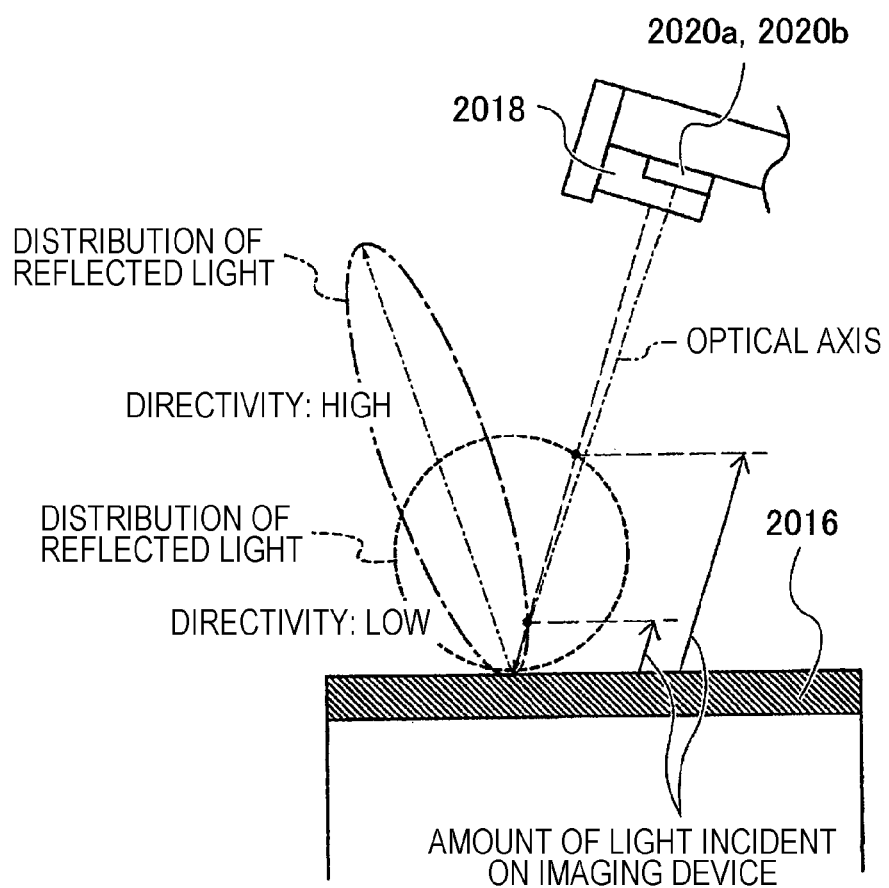
FIG. 33 illustrates the configuration of the image processing apparatus, illustrating the function thereof.

Next, the relationship between the distribution of reflected light from the light sources 2020a, 2020b, 2020c, and 2020d and the amount of light that is incident on the imaging device 2018 will be described with reference to FIGS. 32A and 32B and 33.

FIG. 32A illustrates the distribution of reflected light for a case where the directivity of the light sources is high and the directivity of the light sources is low in the case where light is radiated downward from above the subjects using the light sources 2020a and 2020b provided in the vicinity of the imaging device 2018. FIG. 32B illustrates the distribution of reflected light for a case where the directivity of the light sources is high and the directivity of the light sources is low in the case where imaging is performed with light radiated obliquely downward from above the subjects using the light sources 2020c and 2020d provided in the vicinity of the operation panel 2022.

When the directivity of the light sources is high, light that is incident on the subjects is reflected with directivity, and therefore the light is not diffused and the distribution of reflected light is not widened. That is, when the directivity of the light sources is high, the amount of light that is incident on the imaging device 2018 is small, which results in a dark image. When the directivity of the light sources is low, on the other hand, light that is incident on the subjects is reflected with no directivity, and therefore the light is diffused and the distribution of reflected light is widened, compared to the case where the directivity of the light sources is high.

That is, the amount of light that is incident on the imaging device 2018 is increased by rendering the directivity of the light sources equal to or less than a value set in advance. For example, the light sources preferably have such directivity that renders the proportion of reflected light to the amount of radiated light equal to or less than 50% in the case where light is radiated from the light sources to the subjects in the direction at 45 degrees.

In other words, the light sources 2020a, 2020b, 2020c, and 2020d are preferably configured such that the directivity of radiated light is wider than the range set in advance.

The light sources 2020a, 2020b, 2020c, and 2020d radiate light with a color temperature set in advance or more, e.g. with a color temperature of 5000 degrees kelvin (K) or more. The light sources 2020a, 2020b, 2020c, and 2020d may be light emitting diodes (LEDs) which are white light sources, for example.

The light sources 2020a, 2020b, 2020c, and 2020d include a light control unit that that controls the intensity of radiated light, and are configured to be able to radiate light controlled in consideration of the subjects and external light.

The light sources 2020a, 2020b, 2020c, and 2020d also include a motor as an example of a varying unit that varies the optical axis of radiated light.

Next, varying operation of the light sources 2020a, 2020b, 2020c, and 2020d will be described with reference to FIGS. 34A and 34B.

The control section 2041 varies the optical axis of each of the light sources 2020a, 2020b, 2020c, and 2020d using the motor to change the radiation angle for the subjects.

The control section 2041 performs control so as to turn on and off each of the light sources 2020a, 2020b, 2020c, and 2020d.

The control section 2041 controls the amount of light, or the intensity of light, from each of the light sources 2020a, 2020b, 2020c, and 2020d using the motor. That is, the light sources 2020a, 2020b, 2020c, and 2020d each have a light control function, and the intensity of light radiated to the subjects may be controlled under control by the control section 2041.

The ratio of turning on of each of the light sources 2020a, 2020b, 2020c, and 2020d may be varied.

Specifically, the intensity of light radiated to the subjects may be controlled by turning on the light sources 2020a and 2020b at 100% with high intensity and turning off the light sources 2020c and 2020d, turning on all the light sources 2020a, 2020b, 2020c, and 2020d at 60% with middle intensity, or turning on the light sources 2020a and 2020b at 100% with high intensity and turning on the light sources 2020c and 2020d at 30% with low intensity, for example.

Figure 35:
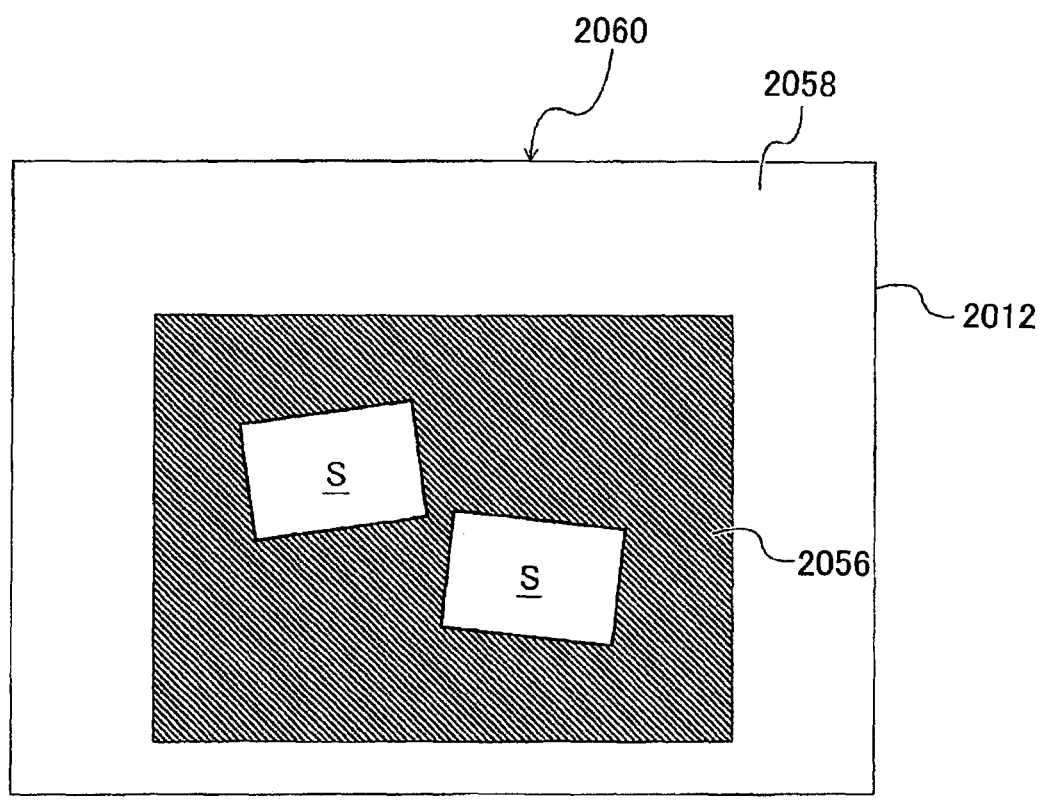
FIG. 35 is a plan view illustrating the configuration of the document reading device.

Next, a modification of the placement portion 2016 will be described. FIG. 35 illustrates a placement portion 2060 of the image forming apparatus 1 according to a different exemplary embodiment of the present disclosure as seen from the upper direction.

In the placement portion 2060 according to the present modification, the range for placement of the subjects is colored in black or a color with optical density set in advance or more, and a guide line 2058 is indicated around the range for placement.

The center of the range to be imaged by the imaging device 2018 is disposed closer to the side to be accessed by the user with respect to the center of the top surface of the apparatus body 2012. In other words, the center of the range to be imaged by the imaging device 2018 is disposed on the front side of the apparatus body 2012 with respect to the center of the top surface of the apparatus body 2012.

The center of the range for placement, or the center of the area in the guide line 2058, is disposed on the front side of the apparatus body 2012 with respect to the center of the top surface of the apparatus body 2012.

Next, an image forming apparatus according to a different exemplary embodiment will be described with reference to FIG. 36.

Figure 36:
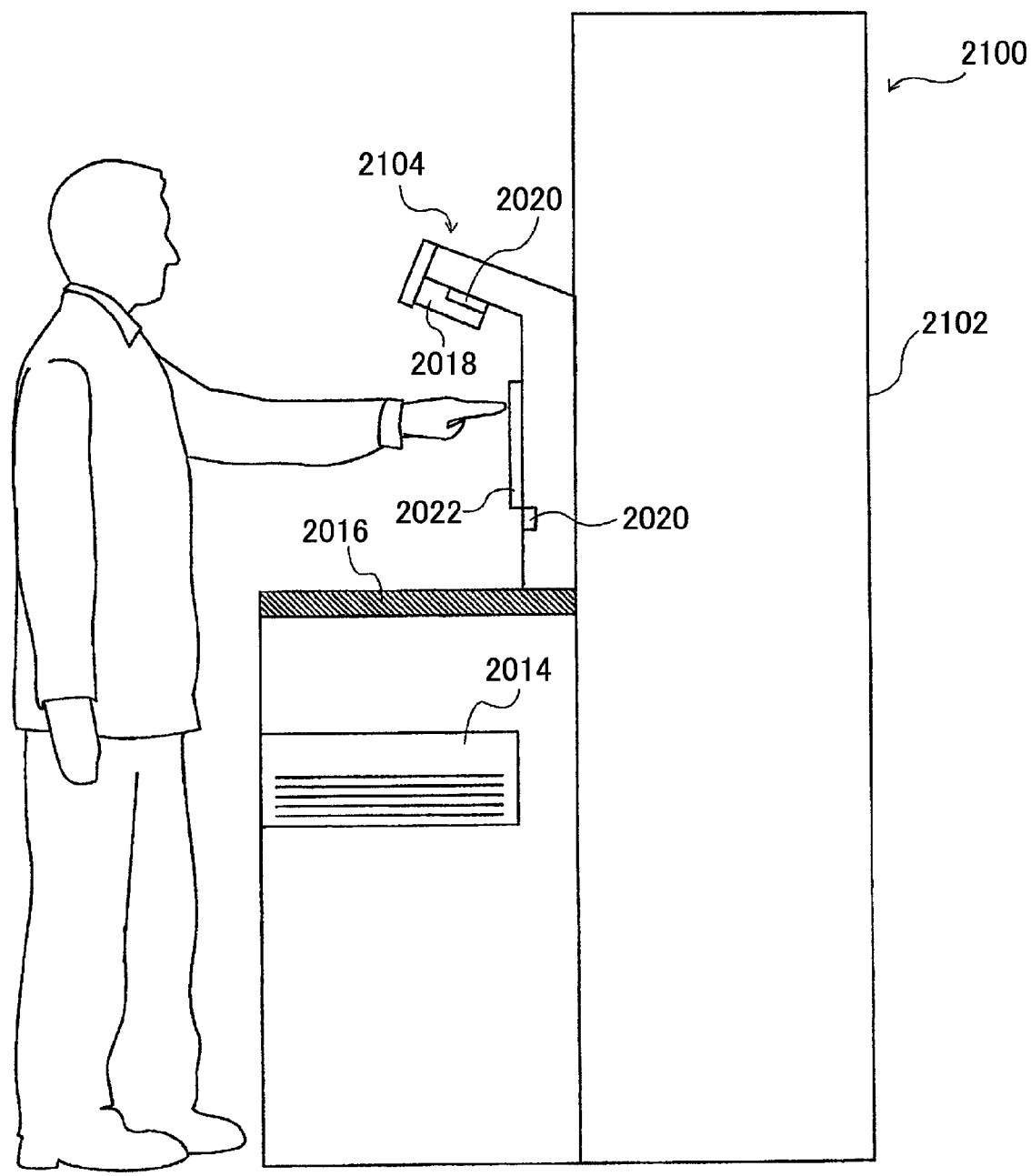
FIG. 36 illustrates the overall configuration of an image processing apparatus according to a modification.

In an image forming apparatus 2100, as illustrated in FIG. 36, the placement portion 2016 and the imaging device 2018 are disposed at the middle part of the image forming apparatus 2100, rather than at the upper part of the image forming apparatus 2100. The image forming apparatus 2100 is constituted from an apparatus body 2102 that includes an image forming section etc., and an image processing section 2104 that includes the placement portion 2016 and the ejection tray 2014 discussed above etc.

The placement portion 2016 and the ejection tray 2014 are provided at a height that allows the user to perform an operation and take out recording media in the standing state. The placement portion 2016 is configured to be disposed on the user side.

The imaging device 2018 is installed above the placement portion 2016, and configured to image the subjects placed on the placement portion 2016 from above. The imaging device 2018 is provided to be directed downward so as to face the placement portion 2016.

The center of the placement portion 2016 is disposed on the side to be accessed by the user with respect to the center of the top surface of the apparatus body 2102. In other words, the center of the placement portion 2016 is disposed on the front side of the apparatus body 2102 with respect to the center of the top surface of the apparatus body 2102.

The center of the range to be imaged by the imaging device 2018 is disposed on the side to be accessed by the user with respect to the center of the top surface of the apparatus body 2102. In other words, the center of the range to be imaged by the imaging device 2018 is disposed on the front side of the apparatus body 2102 with respect to the center of the top surface of the apparatus body 2102.

While the present disclosure is applied to the imaging device 2018 and the placement portion 2016 of the image forming apparatus 1 in the first exemplary embodiment described above, the present disclosure is not limited thereto. The present disclosure may also be applied to an image forming apparatus 1 that includes the imaging device 2018 and the placement portion 2016 that are used by being connected to the image forming apparatus 1 that includes an image forming section and an image output section.

While the present disclosure is applied to the imaging device 2018 and the placement portion 2016 of the image forming apparatus 1 in the exemplary embodiment described above, the present disclosure is not limited thereto. The present disclosure may also be applied to a variety of image processing apparatuses with the imaging device 2018 and the placement portion 2016 provided as discrete devices etc.

While the paint color or the material color of all or a part of the upper part of the placement portion 2016 is black or a color with optical density set in advance or more in the exemplary embodiment described above, the present disclosure is not limited thereto. It is only necessary that the paint color or the material color of a part of the upper part of the placement portion 2016 and around a portion on which the subjects are not placed and at least in contact with an end of the subjects should be black or a color with optical density set in advance or more.

While the color of the marks 2051 is white in the exemplary embodiment described above, the present disclosure is not limited thereto. The color of the marks 2051 may be other colors including black. That is, it is only necessary that the color of the marks 2051 should be distinguishable from the color of the placement portion.

In the image reading device 1010 according to the exemplary embodiment described above, it is only necessary that the upper surface 1032a of the flat plate 1032 and the upper surface 1030a of the document table 1030 in the reading portion 1050 should be formed in a planar shape at least in the reading range of the camera 1020. The upper surface 1032a of the flat plate 1032 and the upper surface 1030a of the document table 1030 may include irregularities that are formed outside the reading range of the camera 1020 and that make it difficult to support the document in a posture suitable for reading.

Sheet Accommodation Device

Figure 37:
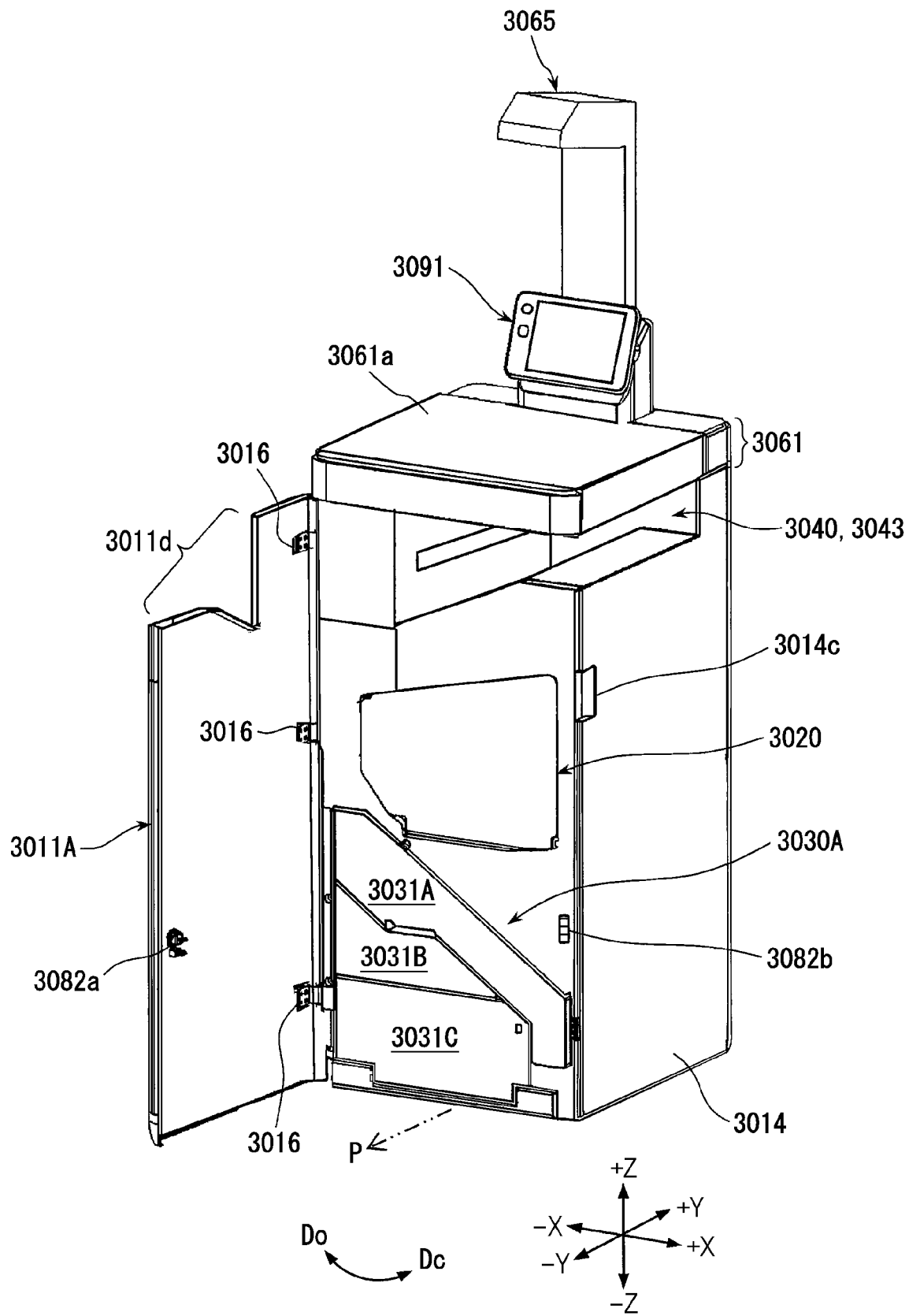
FIG. 37 is a perspective view illustrating the overall configuration of an image forming apparatus including a sheet accommodation device.

FIG. 37 is a perspective view illustrating the configuration of an image forming apparatus including a sheet accommodation device according to the first exemplary embodiment.

As illustrated in FIG. 37, a medium accommodation portion 3030A that constitutes the sheet accommodation device includes a device that accommodates recording media to be supplied to an image forming section. The medium accommodation portion 3030A is disposed below an image forming section 3020. The medium accommodation portion 3030A includes three accommodation portions 3031A, 3031B, and 3031C. The recording media may be media of a predetermined size such as sheet-like regular paper, coated paper, and cardboard, for example.

The accommodation portion 3031A is configured as an oblique accommodation portion disposed so as to extend obliquely downward from the upper left toward the lower right along the horizontal direction X as seen from the front surface of an apparatus body 3010A. The accommodation portion 3031A is the uppermost accommodation portion. The uppermost oblique accommodation portion 3031A is an accommodation portion that allows accommodation and supply of recording media, the length of which along the transport direction thereof is longer than the length (width) thereof along the horizontal direction X of the apparatus body 3010A. The uppermost oblique accommodation portion 3031A is also disposed at a position closest to the image forming section 3020.

The accommodation portion 3031C is configured similarly to a normal accommodation portion disposed so as to extend substantially horizontally along the horizontal direction X as seen from the front surface of the apparatus body 3010A. The accommodation portion 3031C is the lowermost accommodation portion. The lowermost accommodation portion 3031C allows accommodation and supply of recording media, the length of which in the transport direction is shorter than the width of the apparatus body 3010A. The accommodation portion 3031B which is positioned at the middle is constituted as a small accommodation portion disposed in a gap formed between the uppermost oblique accommodation portion 3031A and the lowermost accommodation portion 3031C. The accommodation portion 3031B is the middle accommodation portion.

The accommodation portions 3031A, 3031B, and 3031C are each constituted from an accommodation body such as a tray that accommodates recording media, a feed device that feeds the recording media from the accommodation body, etc. (not illustrated). The accommodation body in each of the accommodation portions 3031A, 3031B, and 3031C includes an internal cover provided on the front surface side and having a contour that matches the shape of the accommodation portion on the front surface side. The accommodation body of the oblique accommodation portion 3031A is disposed to extend obliquely downward from the upper right toward the lower left. The other accommodation portions 3031B and 3031C are disposed substantially horizontally.

The accommodation body in each of the accommodation portions 3031A, 3031B, and 3031C is attached such that, when a front surface open/close cover 3011A is opened (see FIGS. 37 and 38), the accommodation body is drawable from the inner side toward the outer side (outside on the front side of the apparatus body) of the apparatus body 3010A as indicated by the arrow P in FIG. 37 to enable work such as accommodating recording media etc.

In the medium accommodation portion 3030A, prescribed recording media are fed from any of the accommodation portions toward the image forming section 3020 in conjunction with transfer operation of the image forming section 3020. Reference numeral 3037 indicated by the dot-and-dash line in FIG. 38 denotes a principal medium transport path along which recording media are transported from the medium accommodation portion 3030A (each of the accommodation portions 3031A, 3031B, and 3031C thereof) to an ejection port 3041 of a medium ejection portion 3040 through a part of the image forming section 3020. An image is transferred to the recording media in a part of the image forming section 3020. The medium transport path 3037 is constituted from a plurality of transport drive roller pairs, a transport guide member, etc. (not illustrated).

Figure 38:
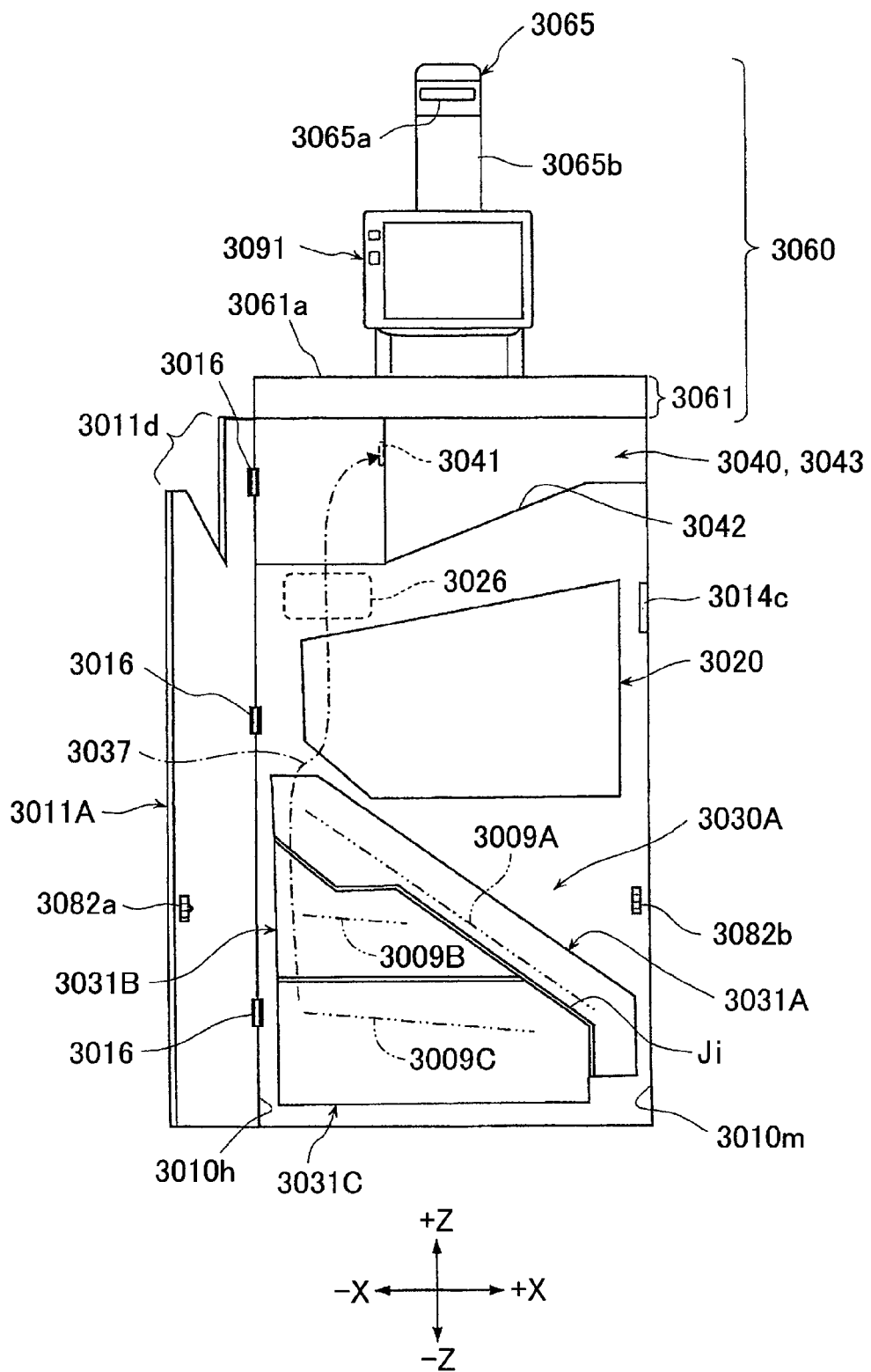
FIG. 38 is a front view illustrating the configuration of the image forming apparatus including the sheet accommodation device.

An external reading portion 3060 is a reading portion that reads an object to be read outside (above) the apparatus body 3010A. As illustrated in FIG. 38 etc., the external reading portion 3060 is constituted from a table portion 3061 for placement of the object to be read, a reading device portion 3065 that reads the object to be read placed on the table portion 3061, etc.

The table portion 3061 is constituted from a plate-like member that includes a flat upper surface portion 3061a that enables the object to be read to be placed thereon in a stationary state. The table portion 3061 is attached to the upper end of the apparatus body 3010A such that the upper surface portion 3061a serves as the uppermost surface of the apparatus body 3010A. The object to be read may be any object that may be placed on the table portion 3061 to be read by the reading device portion 3065 from above the table portion 3061. Examples of the object to be read include three-dimensional objects such as books, magazines, food, and plants, besides sheet-like documents on which image information has been recorded.

The reading device portion 3065 is constituted from parts including a reading device 3065a (see FIG. 38) capable of optically reading an object to be read placed on the table portion 3061 and a member 3065b on which the reading device 3065a is supported and attached. In the reading device portion 3065 according to the first exemplary embodiment, the reading device 3065a is supported by the support portion 3065b, which extends upward from the rear end side of the table portion 3061 by a prescribed length, and attached in a posture that enables the reading device 3065a to read the table portion 3061. The reading device 3065a may be a camera constituted by combining an imaging element such as a CCD and an optical element such as a lens, for example. The camera that is used as the reading device 3065a is occasionally referred to as a "document camera". The reading device portion 3065 may include an illumination device that illuminates the object to be read placed on the table portion 3061 during reading.

As illustrated in FIG. 37 etc., the reading device portion 3065 is provided with an operation panel 3091 that is used to operate the image forming apparatus 3001A at a position on the root side and the front side of the member that supports the reading device 3065a. The operation panel 3091 is disposed so as to be present at a position above and away from the table portion 3061 from the viewpoint of improving operability etc. While the operation panel 3091 includes a display section such as a touch-type liquid crystal panel that enables display and an operation of an operation screen, the operation panel 3091 may include a mechanical operation section such as buttons.

The medium ejection portion 3040 is a portion to which recording media on which an image has been formed by the image forming section 3020 are ejected. The medium ejection portion 3040 is provided at a position above the image forming section 3020. The medium ejection portion 3040 is formed as an accommodation space 3043 that is present as displaced on the right side at the upper part on a front surface Ft of the apparatus body 3010A. The accommodation space 3043 is a space that is open to the outside through a front surface opening and a right side surface opening, which are continuous with each other, of the apparatus body 3010A. In the medium ejection portion 3040, the ejection port 3041 for recording media 3009 is provided in an inner wall surface on the left side of the accommodation space 3043, and a loading surface 3042 is provided on the bottom surface of the accommodation space 3043 to allow the recording media 3009 ejected from the ejection port 3041 to be loaded and accommodated on the loading surface 3042. The loading surface 3042 is formed as an upward inclined surface that is tilted upward toward the right away from the ejection port 3041, for example.

As illustrated in FIGS. 37, 38, etc., the front surface open/close cover 3011A of the image forming apparatus 3001A is constituted as an open/close cover capable of covering a portion of the front surface of the apparatus body 3010A excluding the medium ejection portion 3040 and the table portion 3061 of the external reading portion 3060, and covering all of both the image forming section 3020 and the medium accommodation portion 3030A. The front surface open/close cover 3011A is also an open/close cover that opens and closes the front surface of the apparatus body 3010A from end (left end 3010h) to end (right end 3010m) in the horizontal direction X. Covering the front surface of the apparatus body 3010A from end to end includes not only completely covering the front surface of the apparatus body 3010A from the boundary portion between the front surface and the left side surface to the boundary portion between the front surface and the right side surface, but also covering at least the medium accommodation portion 3030A in the horizontal direction X.

As illustrated in FIG. 37 etc., the front surface open/close cover 3011A is shaped such that the overall shape thereof has a notched portion 3011d that is notched in a shape that matches the shape of the front surface opening of the medium accommodation portion 3040, the notched portion 3011d occupying about half of the upper right part of a rectangle elongated in the vertical direction Z and corresponding to the lower portion of the front surface of the apparatus body 3010A excluding the table portion 3061.

As illustrated in FIG. 37 etc., the front surface open/close cover 3011A is attached at the left end of the front surface of the apparatus body 3010A so as to open and close in directions indicated by the arrows Do and Dc via a plurality of (three in the present exemplary embodiment) open/close support members 3016 such as hinges. This allows the entire front surface open/close cover 3011A to open laterally toward the left.

In the image forming apparatus 3001A, as illustrated in FIGS. 37, 38, etc., a handle guide dented portion 3014c is provided at the front end portion of a right side surface cover 3014. The handle guide dented portion 3014c is formed in a dented shape to guide fingers of the user so as to easily grip on a portion of the front surface open/close cover 3011A that serves as a grip when opening the front surface open/close cover 3011A.

Figure 39:
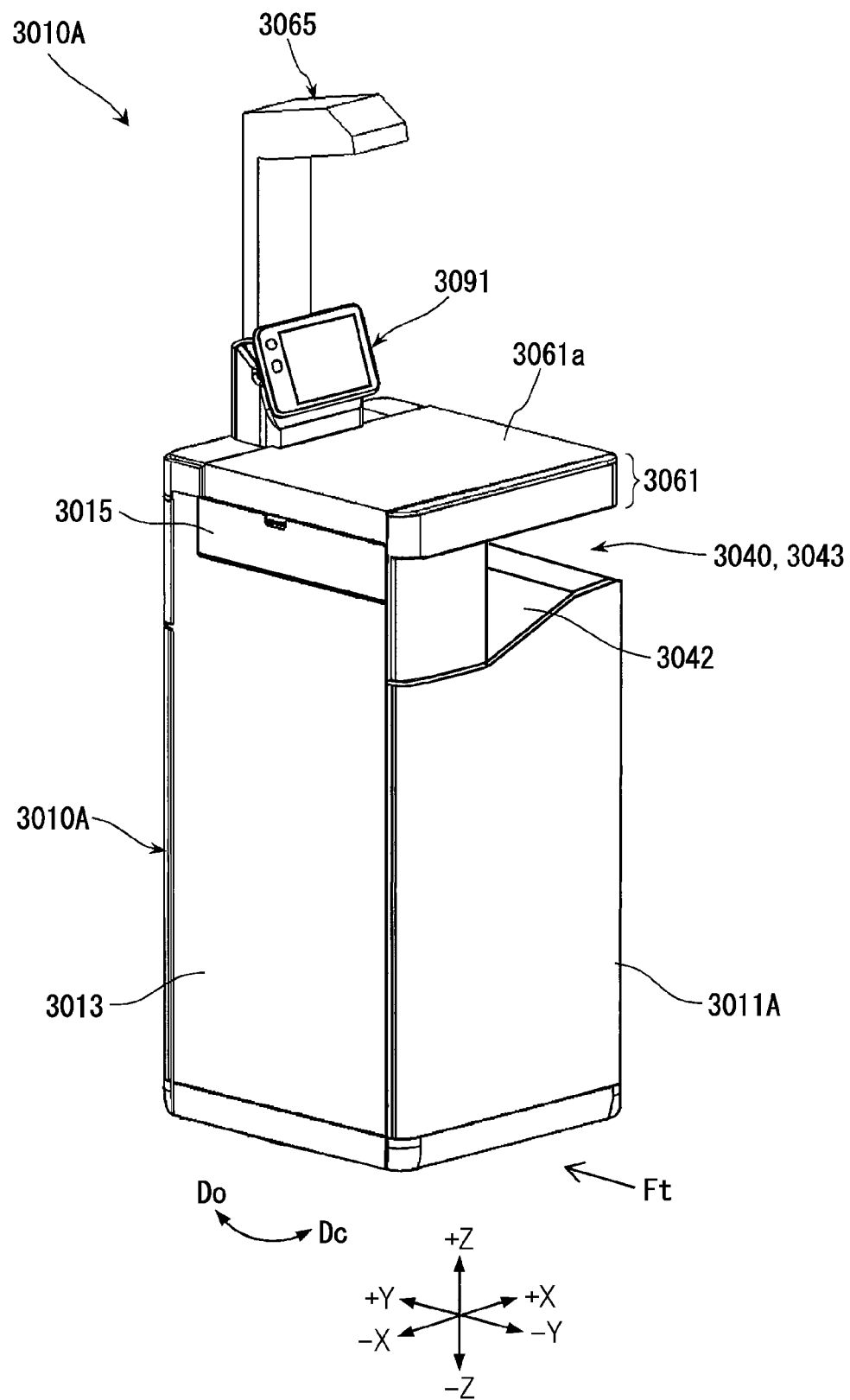
FIG. 39 is a perspective view illustrating the overall configuration of the image forming apparatus including the sheet accommodation device.
Figure 40:
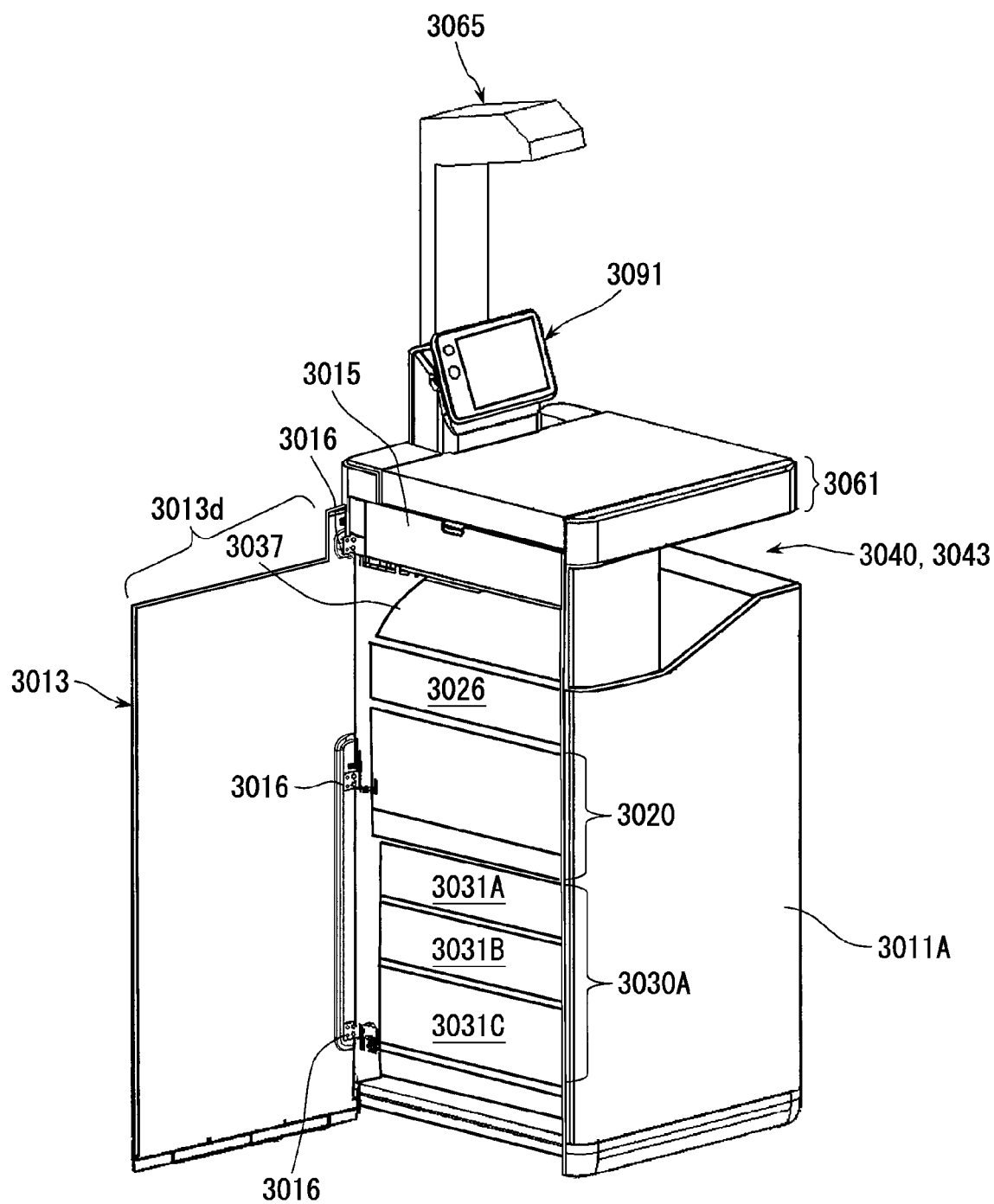
FIG. 40 is a perspective view illustrating the overall configuration of the image forming apparatus including the sheet accommodation device.

As illustrated in FIGS. 39 and 40, a left side surface open/close cover 3013 of the image forming apparatus 3001A is constituted as an open/close cover capable of covering a portion of the left side surface of the apparatus body 3010A excluding the table portion 3061 of the external reading portion 3060 and a part of the upper end portion (upper cover portion 3015), and covering all of both the image forming section 3020 and the medium accommodation portion 3030A. The left open/close cover 3013 is formed as an open/close cover that is heavier than the front surface open/close cover 3011A, because a part of the medium transport path 3037 or a member such as a heat insulation member is provided on the inner surface of the left open/close cover 3013 etc.

As illustrated in FIG. 40 etc., the left side surface open/close cover 3013 is shaped such that the overall shape thereof has a notched portion 3013d formed by notching a part of a rectangle that is elongated in the up-down direction, which is the lower portion of the left side surface of the apparatus body 3010A excluding the table portion 3061 and the upper cover portion 3015. The notched portion 3013d is shaped to correspond to the rectangular shape of the upper cover portion 3015 which is elongated in the front-rear direction, and provided at the front portion of the upper part of the rectangle. As illustrated in FIG. 40, the left side surface open/close cover 3013 is an open/close cover that covers and opens and closes a fixing portion 3026, which is a part of the image forming section 3020, and a part of the medium transport path 3037.

As illustrated in FIG. 39 etc., the left side surface open/close cover 3013 is attached at the rear end portion of the left side surface of the apparatus body 3010A so as to open and close in directions indicated by the arrows Do and Dc via a plurality of (three in the present exemplary embodiment) open/close support members 3016 such as hinges. The open/close support members 3016 are disposed at the rear end of the left side surface open/close cover 3013, among both ends in the right-left direction (front-rear direction when seen as the housing). This allows the entire left side surface open/close cover 3013 to open toward the rear.

Figure 41:
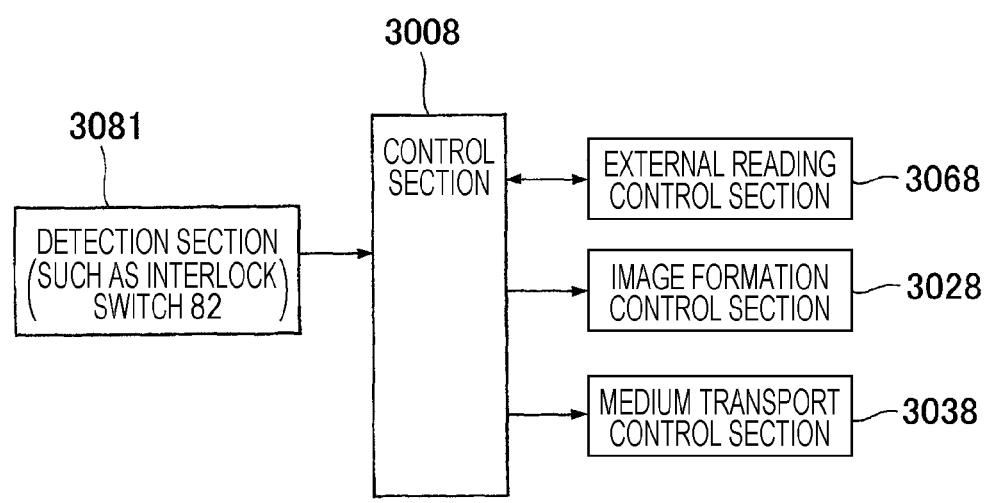
FIG. 41 is a block diagram illustrating a control section of the image forming apparatus including the sheet accommodation device.

As illustrated in FIG. 41, the image forming apparatus 3001A includes a control device 3008 that controls operation of the entire apparatus including the image forming section 3020, the external reading portion 3060, the medium transport path 3037, etc. In FIG. 41, the control device 3008 is indicated as a control section.

The control device 3008 is constituted from a computation processing device, a storage element, an input/output section, a storage device, a control device, etc. The control device 3008 transmits a necessary control instruction to a target to be controlled in accordance with a control program, reference data, detection data, etc. stored in the storage element or the storage device. Therefore, the control device 3008 is connected to an image formation control section 3028 that exclusively controls operation of the image forming section 3020, an external reading control section 3068 that exclusively controls operation of the external reading portion 3060, a medium transport control section 3038 that exclusively controls operation of the medium transport path 3037, etc. The control device 3008 is also connected to a detection section 3081 composed of various sensors etc. that detect information required for control.

In the image forming apparatus 3001A, an interlock switch 3082 which is also a safety mechanism for operation of the image forming apparatus 3001A is applied as an example of the detection section 3081. The interlock switch 3082 is constituted from a movable connection portion 3082a of the interlock switch 3082 provided on the front surface open/close cover 3011A, and a switch portion 3082b of the interlock switch 3082 provided on the apparatus body 3010A, for example.

The control device 3008 performs control so as to enable execution of operation of the image forming section 3020, the external reading portion 3060, the medium transport path 3037, etc. when the interlock switch 3082 is in the closed state. In the closed state, the movable connection portion 3082a is connected to the switch portion 3082b. Conversely, the control device 3008 performs control so as to disable operation of the image forming section 3020, the external reading portion 3060, the medium transport path 3037, etc. when the interlock switch 3082 is in the opened state. In the opened state, the movable connection portion 3082a is released from the switch portion 3082b to be disconnected. In the opened state, control is performed so as not to start execution of operation (not to receive an instruction for execution) when operation is not performed, and control is performed so as to forcibly stop operation when operation is performed.

As illustrated in FIG. 37, when the front surface open/close cover 3011A is closed in the image forming apparatus 3001A configured as described above, all of the image forming section 3020 (including the fixing section) and all of the medium accommodation portion 3030A are covered by the single front surface open/close cover 3011A on the exterior of the front surface of the apparatus body 3010A.

Figure 46:
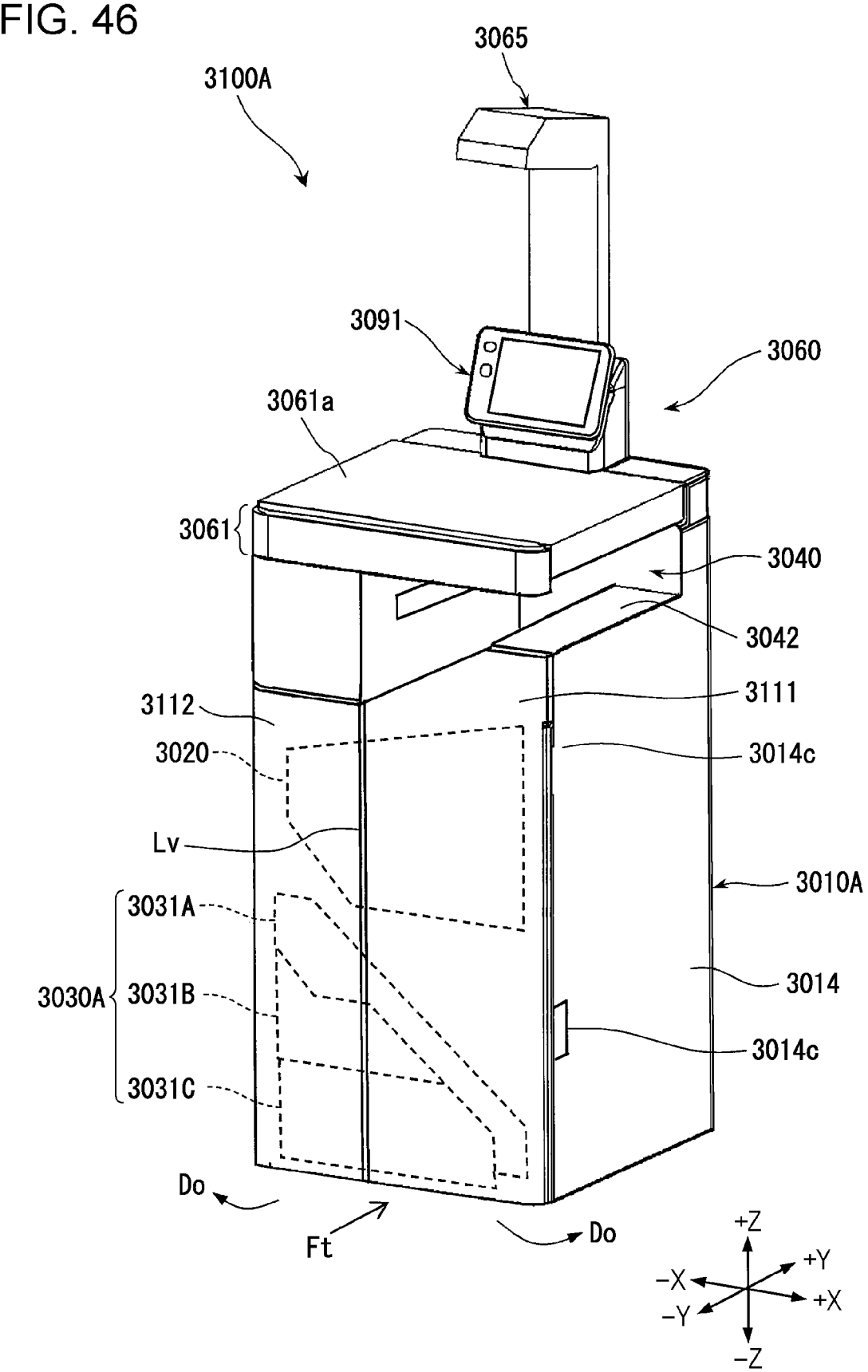
FIG. 46 is a perspective view illustrating the overall configuration of an image forming apparatus according to a different exemplary embodiment including a sheet accommodation device.

Thus, in the image forming apparatus 3001A, no vertical division line Lv that extends in the up-down direction to vertically separate the image forming section 3020 and the medium accommodation portion 3030A from each other as illustrated in FIG. 46 is present between the image forming section 3020 and the medium accommodation portion 3030A on the exterior (front surface open/close cover 3011A) of the front surface of the apparatus body 3010A, compared to the case where the apparatus body 3010A is covered from end to end in the right-left direction by a plurality of open/close covers.

In an image forming apparatus 3100A according to a first comparative example illustrated in FIG. 46, in this respect, all of the image forming section 3020 and all of the medium accommodation portion 3030A are covered by two open/close covers 3111 and 3112. In the image forming apparatus 3100A according to the first comparative example, the vertical division line Lv that also serves as the boundary line between the open/close cover 3111 and the open/close cover 3112 is present on the exterior of the front surface of the apparatus body 3010A. Therefore, in the case of the image forming apparatus 3100A according to the first comparative example, the quality of the appearance of the front surface of the apparatus body 3010A is impaired by the presence of the vertical division line Lv on the exterior of the front surface of the apparatus body 3010A.

The image forming apparatus 3001A is configured such that the front surface open/close cover 3011A covers all of the three accommodation portions 3031A, 3031B, and 3031C of the medium accommodation portion 3030A.

Therefore, in the image forming apparatus 3001A, no division line is present between the plurality of accommodation portions 3031A, 3031B, and 3031C of the medium accommodation portion 3030A on the exterior (front surface open/close cover 3011A) of the front surface of the apparatus body 3010A. In the image forming apparatus 3001A, moreover, the entire medium accommodation portion 3030A may be covered by the front surface open/close cover 3011A all at once.

Figure 45:
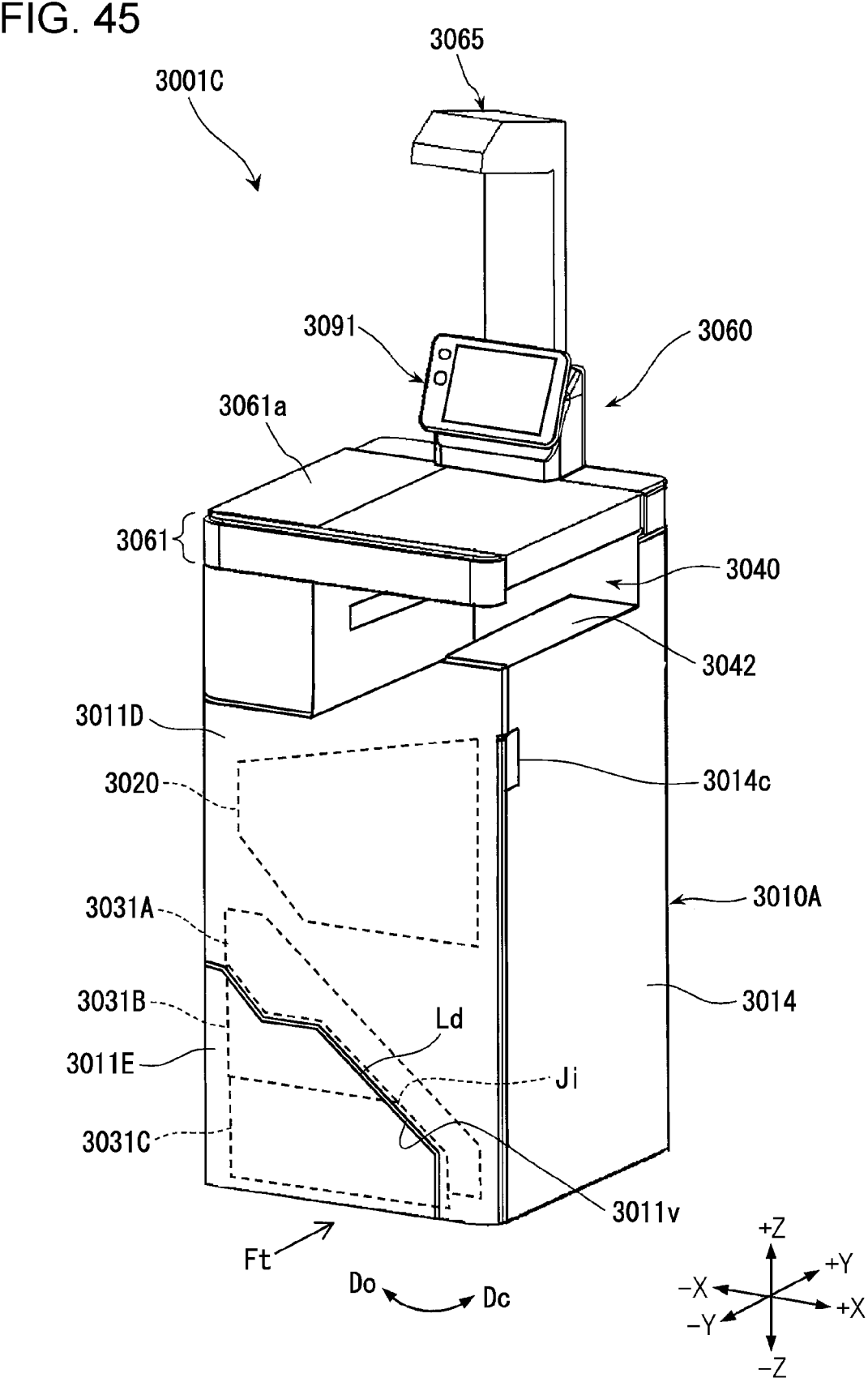
FIG. 45 is a perspective view illustrating the overall configuration of an image forming apparatus according to a different exemplary embodiment including a sheet accommodation device.

The front surface open/close cover 3011A of the image forming apparatus 3001A may be replaced with a front surface open/close cover 3011D illustrated in FIG. 45 to form an image forming apparatus 3001C. The front surface open/close cover 3011D is an open/close cover that covers and opens and closes, of the front surface of the apparatus body 3010A, all of the image forming section 3020 and an oblique accommodation portion 3031A, which is a part of the medium accommodation portion 3030A, the front surface open/close cover 3011D being shaped such that the lower end thereof extends substantially along an oblique contour line on the lower side of the oblique accommodation portion 3031A. The front surface open/close cover 3011D is also an open/close cover that covers the apparatus body 3010A from end to end in the right-left direction.

However, in the image forming apparatus 3001C as a reference example in which the front surface open/close cover 3011D is adopted, as illustrated in FIG. 45, it is necessary to provide a second front surface open/close cover 3011E that covers the remaining accommodation portions 3031B and 3031C of the medium accommodation portion 3030A. In the case of the image forming apparatus 3001C, moreover, a division line Ld that extends obliquely is present between the front surface open/close cover 3011D and the second front surface open/close cover 3011E, and the presence of the division line Ld makes it difficult to improve the quality of the appearance.

Figure 47:
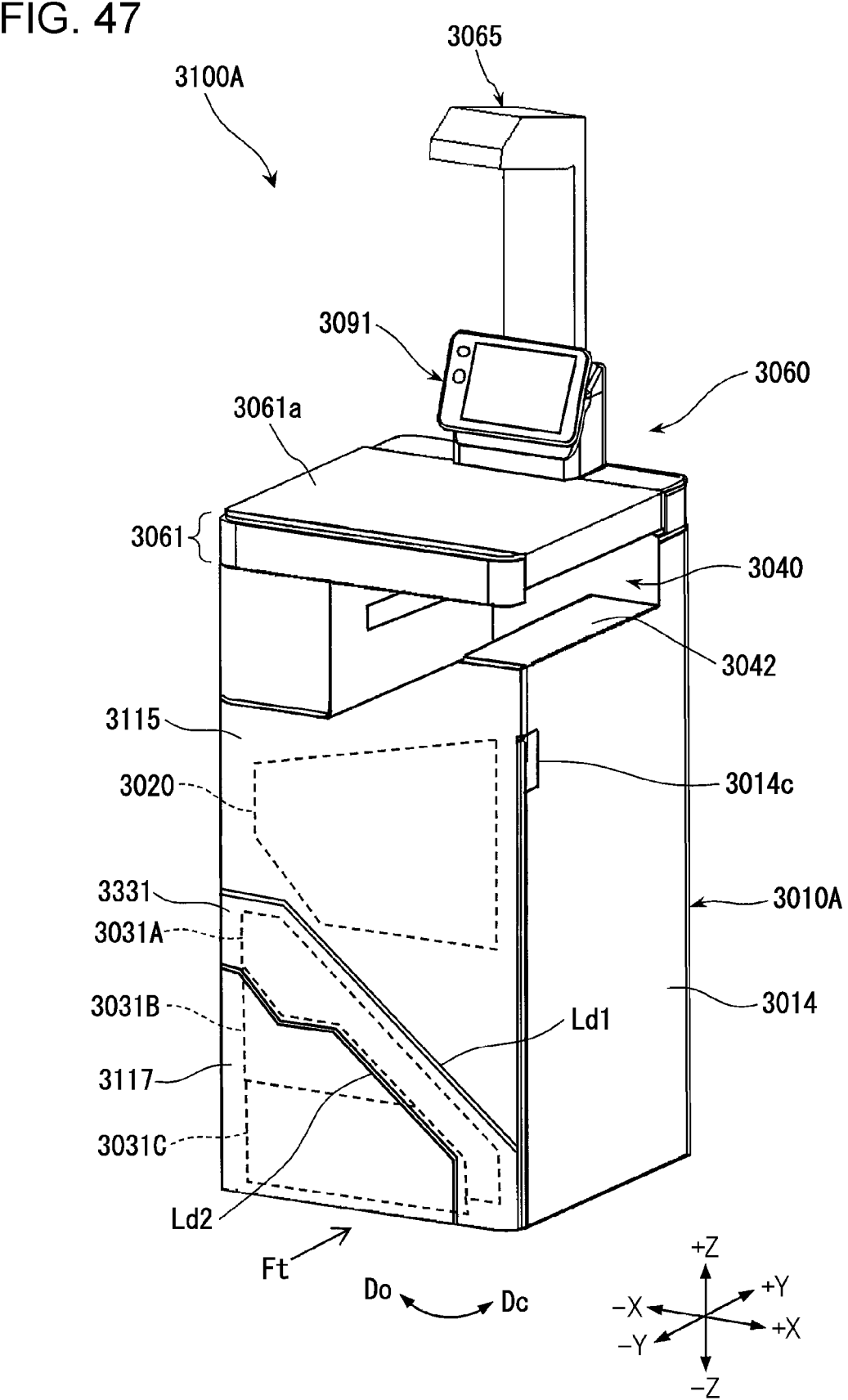
FIG. 47 is a perspective view illustrating the overall configuration of an image forming apparatus according to a different exemplary embodiment including a sheet accommodation device.

However, even the image forming apparatus 3001C which adopts the front surface open/close cover 3011D has the following advantages over an image forming apparatus 3100A according to a second comparative example illustrated in FIG. 47.

First, the image forming apparatus 3100A according to the second comparative example adopts, as a front surface open/close cover 3115, an open/close cover that covers all of an image forming section 3020 but that does not cover the medium accommodation portion 3030A at all. In addition, the image forming apparatus 3100A according to the second comparative example is provided with an exterior cover 3331 that covers the oblique accommodation portion 3031A of the medium accommodation portion 3030A, and a second open/close cover 3117 that covers the two accommodation portions 3031B and 3031C of the medium accommodation portion 3030A.

That is, when the image forming apparatus 3001C and the image forming apparatus 3100A according to the second comparative example are compared with each other, the front surface open/close cover 3115 does not cover the oblique accommodation portion 3031a, and therefore two oblique division lines Ld1 and Ld2 are present, in the image forming apparatus 3100A according to the second comparative example. In this respect, one oblique division line Ld is present in the image forming apparatus 3001C which adopts the front surface open/close cover 3011D.

In the image forming apparatus 3001A according to the first exemplary embodiment, on the contrary, an open/close cover shaped such that the lower end thereof extends substantially horizontally in the right-left direction without extending along the oblique contour line of the oblique accommodation portion 3031A is adopted as the front surface open/close cover 3011A. In the image forming apparatus 3001A, in which the medium accommodation portion 3030A includes the oblique accommodation portion 3031A and the accommodation portions 3031B and 3031C, it is not necessary to separately provide the second front surface open/close cover 3117 which covers the accommodation portions 3031B and 3031C, as in the image forming apparatus 3100A according to the second comparative example.

In the image forming apparatus 3001A, the left side surface open/close cover 3013 which is heavier than the front surface open/close cover 3011A is configured to open and close via the open/close support members 3016 provided at the left end in the right-left direction.

Besides, the image forming apparatus 3001A includes the left side surface open/close cover 3013 that covers and opens and closes a portion of the left side surface of the apparatus body 3010A that extends between the image forming section 3020 and the medium accommodation portion 3030A. Therefore, in the image forming apparatus 3001A, no vertical division line that vertically separates the image forming section 3020 and the medium accommodation portion 3030A from each other is present on the exterior of the left side surface of the apparatus body 3010A.

When the front surface open/close cover 3011A of the image forming apparatus 3001A is opened, the movable connection portion 3082a of the interlock switch 3082 located on the side of the front surface open/close cover 3011A is disengaged from the switch portion 3082b of the interlock switch 3082 located on the side of the apparatus body 3010A to establish a non-contact state. In the case where the front surface open/close cover 3011A is opened while the image forming apparatus 3001A is executing image forming operation, the control device 3008 performs control so as to forcibly stop operation of the image formation control section 3028, the external reading control section 3068, and the medium transport control section 3038 in accordance with detection information that the interlock switch 3082 has been brought into the non-contact state.

Therefore, in the image forming apparatus 3001A, operation (image forming operation) of the image forming section 3020 and the medium accommodation portion 3030A which are exposed to the front surface side of the apparatus body 3010A is stopped when the front surface open/close cover 3011A is opened. In the case where a recording medium is present in the middle of the medium transport path 3037 for image forming operation, the control device 3008 may perform control so as to stop operation of the medium transport path 3037 after the recording medium 3009 which is being transported is transported to the medium ejection portion 3040 and ejected when the front surface open/close cover 3011A is opened.

Figure 43:
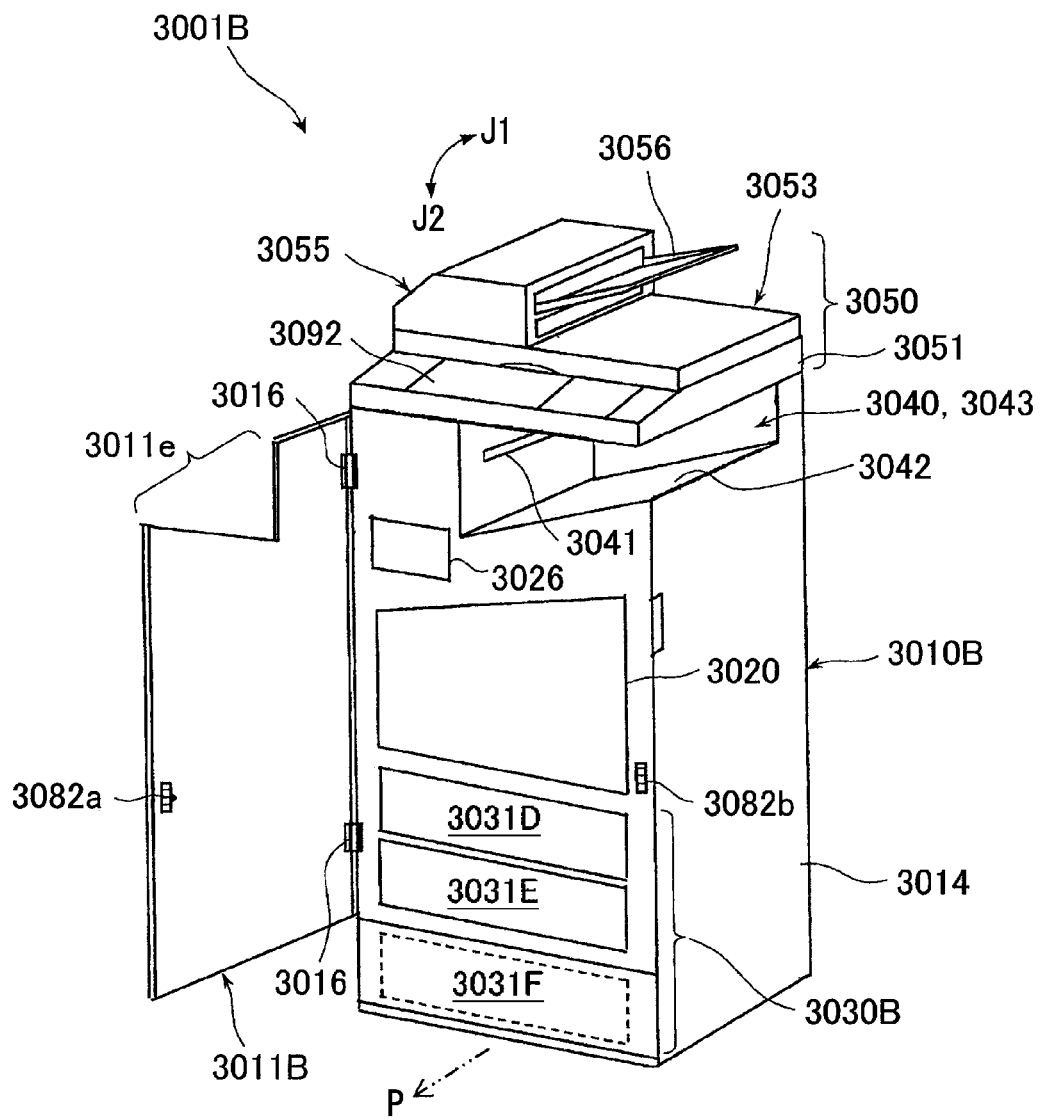
FIG. 43 is a perspective view illustrating the overall configuration of the image forming apparatus according to the different exemplary embodiment including the sheet accommodation device.
Figure 44:
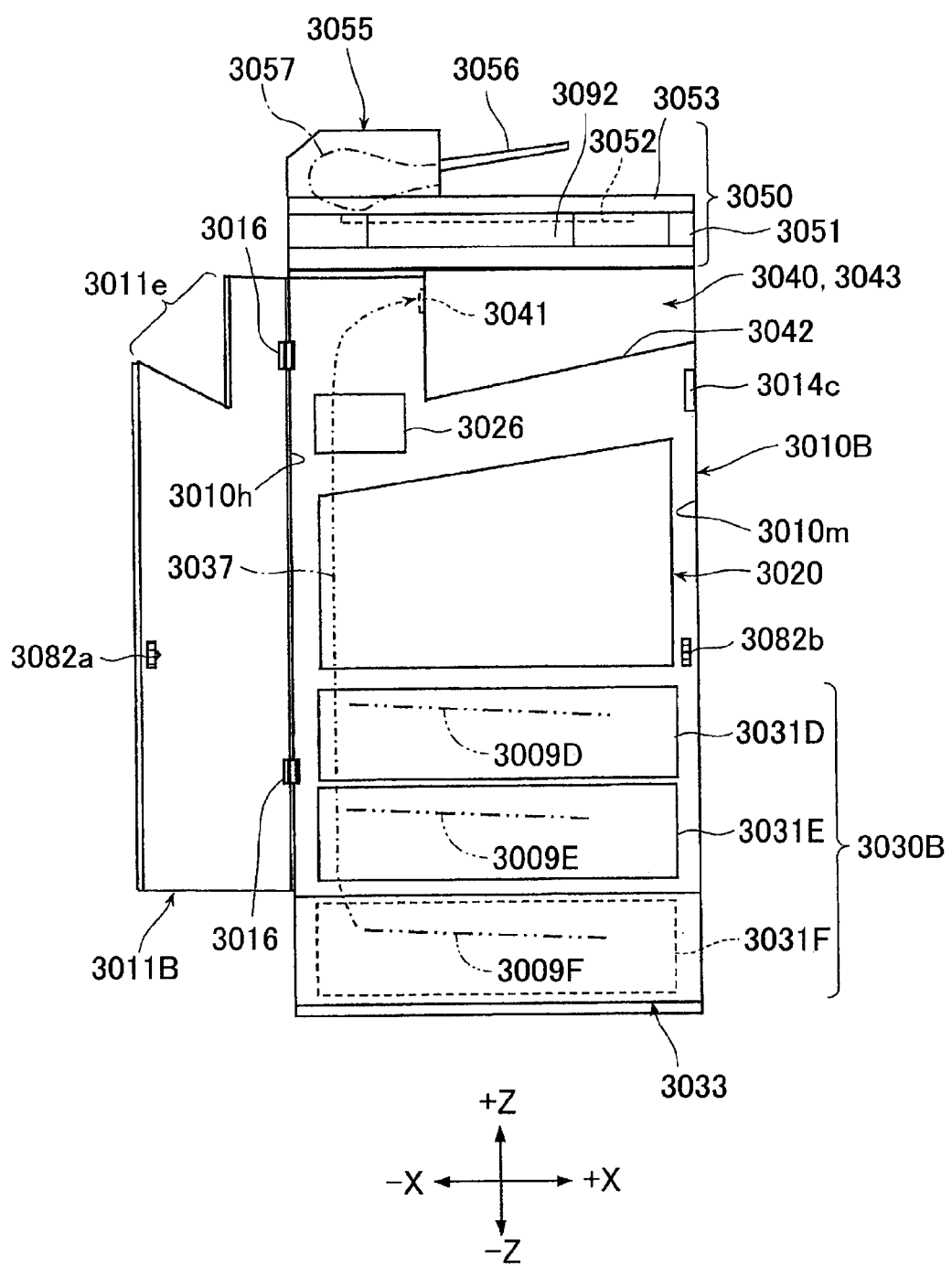
FIG. 44 is a front view illustrating the configuration of the image forming apparatus according to the different exemplary embodiment including the sheet accommodation device.

As illustrated in FIGS. 43 and 44, a medium accommodation portion 3030B of the sheet accommodation device according to a second exemplary embodiment includes three accommodation portions 3031D, 3031E, and 3031F disposed side by side in the up-down direction.

The three accommodation portions 3031D, 3031E, and 3031F are each constituted from an accommodation body such as a tray that accommodates recording media, a feed device that feeds the recording media from the accommodation body, etc. (not illustrated).

The three accommodation portions 3031D, 3031E, and 3031F are each constituted as a general accommodation portion in which the accommodation body is disposed substantially horizontally along the right-left direction. The recording media 3009D, 3009E, and 3009F accommodated in the accommodation portions 3031D, 3031E, and 3031E, respectively, may be of the same size as each other, or of different sizes from each other, or at least one of the recording media 3009D, 3009E, and 3009F may be of a different size from the others. The uppermost accommodation portion 3031D is also disposed at a position closest to the image forming section 3020.

Figure 42:
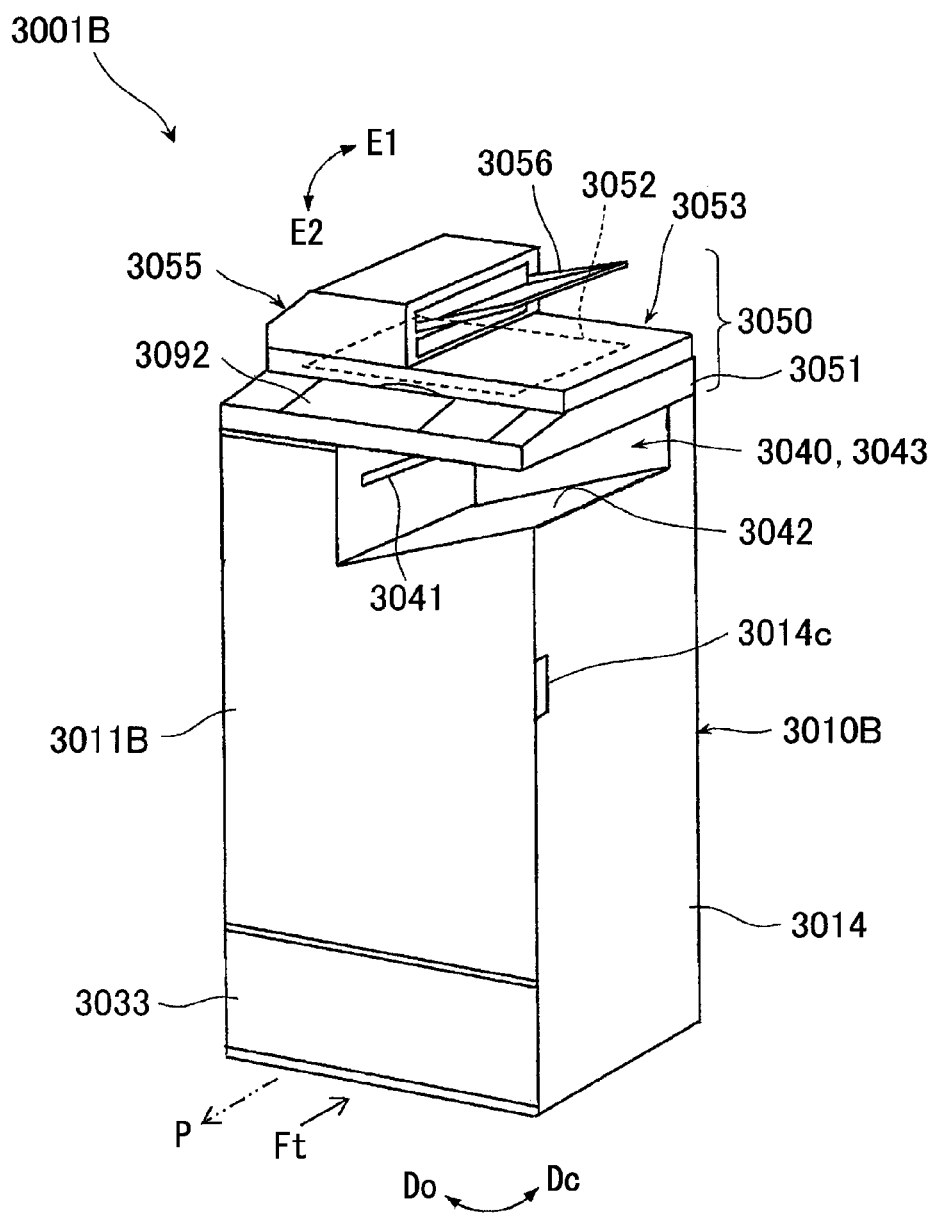
FIG. 42 is a perspective view illustrating the overall configuration of an image forming apparatus according to a different exemplary embodiment including a sheet accommodation device.

Next, as illustrated in FIGS. 42 to 44 etc., the front surface open/close cover 3011B is constituted as an open/close cover capable of covering all of the image forming section 3020 and a part of the medium accommodation portion 3030B (accommodation portions 3031D and 3031E) in the apparatus body 3010B. The front surface open/close cover 3011B is an open/close cover that opens and closes the front surface of the apparatus body 3010B from end (left end 3010h) to end (right end 3010m) in the right-left direction.

The front surface open/close cover 3011B is shaped such that the overall shape thereof includes a notched portion 3011e in the right half of the upper part of a rectangle elongated in the up-down direction and corresponding to a portion of the front surface of the apparatus body 3010B excluding the image reading section 3051, and covers a portion of the front surface of the apparatus body 3010B excluding the accommodation portion 3031F and lower. The notched portion 3011e is shaped so as to correspond to the front surface shape of the medium ejection portion 3040.

As illustrated in FIG. 43 etc., the front surface open/close cover 3011B is attached at the left end of the front surface of the apparatus body 3010B so as to open and close in directions indicated by the arrows Do and Dc via a plurality of (two in the present exemplary embodiment) open/close support members 3016 such as hinges. This allows the entire front surface open/close cover 3011B to open laterally toward the left (in the direction indicated by the arrow Do).

In the image forming apparatus 3001B, the front surface open/close cover 3011B is an open/close cover that does not cover the lowermost accommodation portion 3031F in the medium accommodation portion 3030B. Therefore, a front surface external cover 3033 is fixed and attached to the lowermost accommodation portion 3031F on the front surface side of the accommodation body, in place of the front surface open/close cover 3011B. On the other hand, the accommodation body in each of the accommodation portions 3031D and 3031E covered by the front surface open/close cover 3011B includes an internal cover provided on the front surface side and having a contour that matches the shape (horizontally long rectangle) of the accommodation portions 3031D and 3031E.

The accommodation body in each of the accommodation portions 3031D and 3031E is attached such that, when the front surface open/close cover 3011B is opened (see FIGS. 43 and 44), the accommodation body is drawable from the inner side toward the outer side (on the front side of the apparatus body 3010B) of the apparatus body 3010B as indicated by the arrow P in FIG. 43 to enable work such as accommodating the recording media 3009 etc. On the contrary, the lowermost accommodation portion 3031F is attached so as to allow the work of accommodating the recording media 3009 etc. to be performed by allowing the accommodation portion 3031F to be drawn from the inner side to the outer side of the apparatus body 3010B any time, irrespective of whether the front surface open/close cover 3011B is opened or closed.

As illustrated in FIG. 42, when the front surface open/close cover 3011B is opened in the image forming apparatus 3001B configured as described above, all of the image forming section 3020 (including the fixing section 3026) and the accommodation portions 3031D and 3031E, which are a part of the medium accommodation portion 3030B, are covered by the single front surface open/close cover 3011B on the exterior of the front surface of the apparatus body 3010B. Thus, in the image forming apparatus 3001B, no division line Ld (see FIG. 45) is present between the image forming section 3020 and the medium accommodation portion 3030B on the exterior (front surface open/close cover 3011B) of the front surface of the apparatus body 3010B, compared to the case where the image forming section 3020 and the medium accommodation portion 3030B are covered by individual open/close covers.

The image forming apparatus 3001B is configured such that the front surface open/close cover 3011B covers the two accommodation portions 3031D and 3031E of the medium accommodation portion 3030B. Therefore, in the image forming apparatus 3001B, no division line (Ld) is present between the accommodation portions 3031D and 3031E of the medium accommodation portion 3030B on the exterior (front surface open/close cover 3011B) of the front surface of the apparatus body 3010B.

In the image forming apparatus 3001B, on the other hand, the accommodation portion 3031F in the medium accommodation portion 3030B not covered by the front surface open/close cover 3011B enables the work of accommodating the recording media 3009 etc. to be performed by allowing the accommodation portion 3031F to be drawn from the inner side to the outer side of the apparatus body 3010B any time, irrespective of whether the front surface open/close cover 3011B is opened or closed. Therefore, an accommodation portion that accommodates the recording media 3009 that are consumed significantly and that need to be supplied frequently, for example, is preferably selected as the accommodation portion 3031F not covered by the front surface open/close cover 3011B.

When the front surface open/close cover 3011B of the image forming apparatus 3001B is opened, the interlock switch 3082 is brought into the non-contact state. Specifically, as illustrated in FIG. 43 etc., the movable connection portion 3082a of the interlock switch 3082 located on the side of the front surface open/close cover 3011B is disengaged from the switch portion 3082b of the interlock switch 3082 located on the side of the apparatus body 3010B. In the case where the front surface open/close cover 3011B is opened while the image forming apparatus 3001B is executing image forming operation, it is detected that the interlock switch 3082 has been brought into the non-contact state, and the control device (see FIG. 41) performs control so as to forcibly stop operation of the image formation control section 3028 and the medium transport control section 3038 in response to the detection information.

Therefore, in the image forming apparatus 3001B, operation (image forming operation) of the image forming section 3020 and the medium accommodation portion 3030B which are exposed to the front surface side of the apparatus body 3010B is stopped when the front surface open/close cover 3011B is opened. In the image forming apparatus 3001B, on the other hand, medium transport operation for the lowermost accommodation portion 3031F is not stopped even when the front surface open/close cover 3011B is opened during execution of image forming operation.

Sheet Accommodation Device 4110

Figure 48:
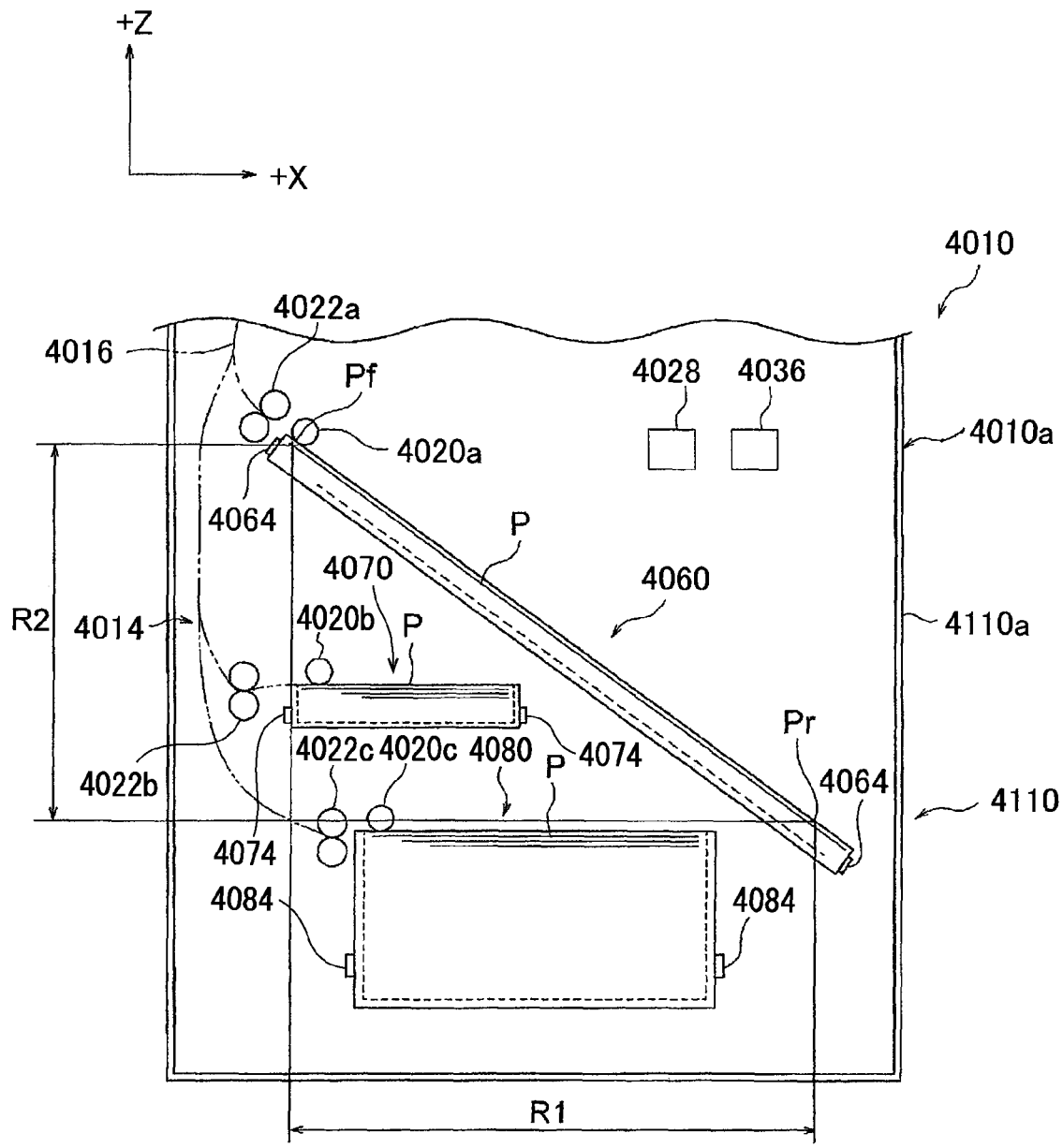
FIG. 48 illustrates the configuration of a portion of an image forming apparatus including a sheet accommodation device.

FIG. 48 illustrates the configuration of a sheet accommodation device 4110 according to a different aspect.

As illustrated in FIG. 48, the sheet accommodation device 4110 is disposed in the lower portion of an image forming apparatus 4010, and includes three accommodation portions 4060, 4070, and 4080 that accommodate the recording media P and a transport portion 4014 that transports the recording media P. The accommodation portion 4060 disposed uppermost is inclined with respect to the horizontal direction. The accommodation device 4110 will be discussed in detail later.

(Control Section 4028 and Principal Power Source 4036)

A control section 4028 and a principal power source 4036 are disposed in a triangular region formed between the accommodation portion 4060, which is inclined, and an image forming section 4012.

(Constitution of Principal Portion)

Next, the sheet accommodation device 4110 will be described.

Figure 49A:
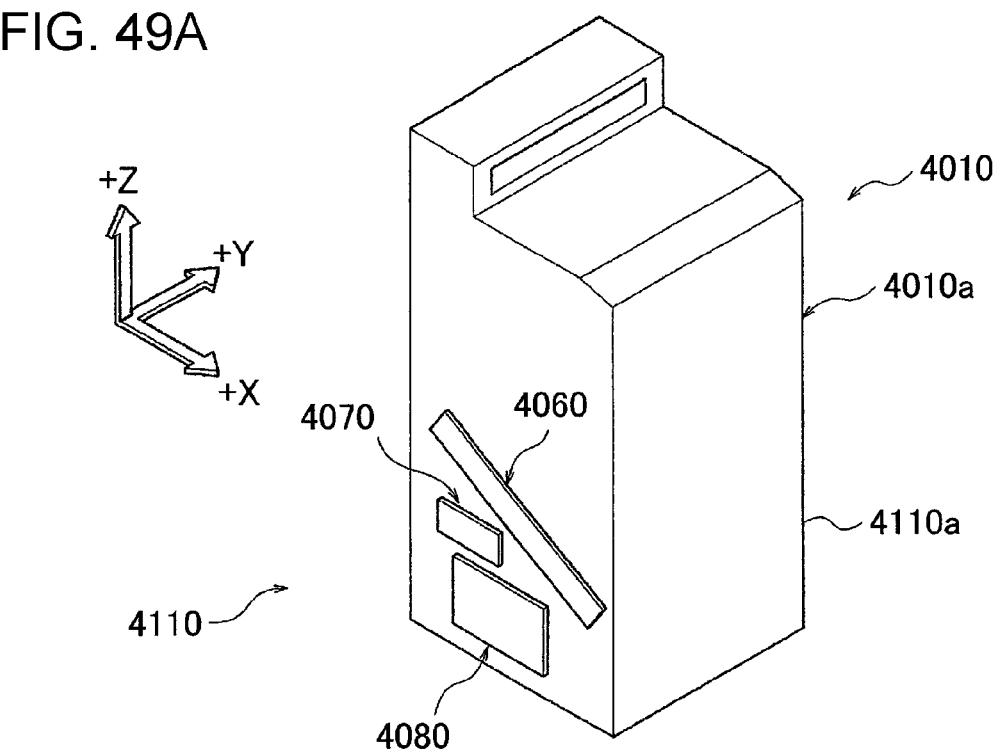
FIGS. 49A and 49B are each a perspective view illustrating the overall configuration of the image forming apparatus including the sheet accommodation device.

As illustrated in FIG. 48, the sheet accommodation device 4110 is disposed at the lower portion of the image forming apparatus 4010. As illustrated in FIG. 49A, the accommodation device 4110 includes an apparatus body 4110a, the accommodation portion 4060 which accommodates the recording media P, the accommodation portion 4070 that accommodates the recording medium P, and the accommodation portion 4080 that accommodates the recording media P. The accommodation device 4110 also includes slide rails 4064 that render the accommodation portion 4060 movable in the apparatus depth direction, slide rails 4074 that render the accommodation portion 4070 movable in the apparatus depth direction, and slide rails 4084 that render the accommodation portion 4080 movable in the apparatus depth direction. The accommodation device 4110 further includes the transport portion 4014 that transfers the recording medium P, and a cover 4130 (see FIGS. 50A and 50B) that covers the apparatus body 4110a from the apparatus width direction.

The accommodation portion 4060 is an example of a first accommodation portion. The accommodation portion 4070 is an example of a second accommodation portion. The accommodation portion 4080 is an example of a third accommodation portion. The apparatus depth direction is an example of the first direction. The apparatus width direction is an example of the lateral side. The apparatus body 4110a of the accommodation device 4110 is the lower portion of the apparatus body 4010a of the image forming apparatus 4010.

The accommodation portion 4060, the accommodation portion 4070, and the accommodation portion 4080 are arranged in this order from the upper side to the lower side. The maximum size of the recording media P that may be accommodated in the accommodation portion 4070 is smaller than the maximum size of the recording media P that may be accommodated in the accommodation portion 4060. The maximum size of the recording media P that may be accommodated in the accommodation portion 4080 is smaller than the maximum size of the recording media P that may be accommodated in the accommodation portion 4060, and larger than the maximum size of the recording media P that may be accommodated in the accommodation portion 4070.

The maximum size of the recording media P that may be accommodated in the accommodation portion 4060 is an example of a first size. The maximum size of the recording media P that may be accommodated in the accommodation portion 4070 is an example of a second size. The maximum size of the recording media P that may be accommodated in the accommodation portion 4080 is an example of a third size.

In the present exemplary embodiment, the accommodation portion 4060 principally accommodates the recording media P of A3 size, and the recording media P of A3 size are the recording media P of the maximum size that may be accommodated in the accommodation portion 4060. The accommodation portion 4070 principally accommodates the recording media P of postcard size, and the recording media P of postcard size are the recording media P of the maximum size that may be accommodated in the accommodation portion 4070. The accommodation portion 4080 principally accommodates the recording media P of A4 size, and the recording media P of A4 size are the recording media P of the maximum size that may be accommodated in the accommodation portion 4080.

Consequently, the recording media P to be accommodated in the accommodation portion 4060 is the longest in the front-rear direction, the recording media P to be accommodated in the accommodation portion 4080 is the second longest, and the recording media P to be accommodated in the accommodation portion 4070 is the third longest. The length of the recording media P in the front-rear direction is the length of the recording media P in the direction in which the recording media are fed to a transport path 4016.

The number of the recording media P that may be accommodated in the accommodation portion 4080 is larger than the number of the recording media P that may be accommodated in the accommodation portion 4060 and the number of the recording media P that may be accommodated in the accommodation portion 4070.

In the present exemplary embodiment, the accommodation portion 4060 may accommodate 200 recording media P, the accommodation portion 4070 may accommodate 100 recording media P, and the accommodation portion 4080 may accommodate 1000 recording media P.

Consequently, the total thickness in the thickness direction of the recording media P to be accommodated in the accommodation portion 4080 is the largest, the total thickness of the recording media P to be accommodated in the accommodation portion 4070 is the second largest, and the total thickness of the recording media P to be accommodated in the accommodation portion 4060 is the third largest. That is, the total thickness of the recording media P to be accommodated in the accommodation portion 4060 is the smallest.

The image forming apparatus 4010 consumes the largest number of recording media of A4 size. That is, the number of the recording media that may be accommodated in the accommodation portion 4080, which accommodates the recording media to be consumed in the largest number, is larger than the number of the recording media that may be accommodated in the accommodation portion 4060 and the number of the recording media that may be accommodated in the accommodation portion 4070.

(Transport Portion)

As illustrated in FIG. 48, the transport portion 4014 includes a feed roller 4020a that feeds the recording medium P accommodated in the accommodation portion 4060 to the transport path 4016, and prevention rollers 4022a that prevent a multiple feed of the recording medium P fed by the feed roller 4020a.

The transport portion 4014 also includes a feed roller 4020b that feeds the recording medium P accommodated in the accommodation portion 4070 to the transport path 4016, and prevention rollers 4022b that prevent a multiple feed of the recording medium P fed by the feed roller 4020b.

The transport portion 4014 further includes a feed roller 4020c that feeds the recording medium P accommodated in the accommodation portion 4080 to the transport path 4016, and prevention rollers 4022c that prevent a multiple feed of the recording medium P fed by the feed roller 4020c.

The transport portion 4014 also includes an adjustment roller 4024 disposed downstream of the prevention rollers 4022a, 4022b, and 4022c in the transport direction of the recording media P to adjust the timing to feed the recording media P to a transfer nip NT. The transport portion 4014 further includes ejection rollers 4026 that eject the recording media P, to which a toner image has been fixed by a fixing device 4043, to the outside of the apparatus body 4010a.

Accommodation Portion 4060 and Slide Rails 4064

As illustrated in FIG. 48, the accommodation portion 4060 is formed in the shape of a box that opens upward, and a pair of slide rails 4064 are attached to both ends of the accommodation portion 4060 in the horizontal direction X of the apparatus body 4010a.

The slide rails 4064 each include an outer member, an intermediate member, and an inner member. The outer member is attached to the apparatus body 4110a. The inner member is attached to the accommodation portion 4060. This allows the accommodation portion 4060 to be movable in the apparatus depth direction with respect to the apparatus body 4110a.

As illustrated in FIGS. 48 and 49A, when the accommodation portion 4060 is mounted to the apparatus body 4110a, the accommodation portion 4060 is inclined with respect to the horizontal direction such that one end (left end portion in the drawings) and the other end thereof are located at different positions in the up-down direction as seen in the apparatus depth direction. Specifically, the accommodation portion 4060 is inclined with respect to the horizontal direction such that one end thereof in the apparatus width direction is located above the other end thereof as seen in the apparatus depth direction. The one end and the other end are one and the other of two points on a part of the accommodation portion 4060 that are the farthest from each other in the apparatus width direction.

In other words, the one end of the accommodation portion 4060 is the downstream end portion of the accommodation portion 4060, and the other end of the accommodation portion 4060 is the upstream end portion of the accommodation portion 4060. The upstream end portion and the downstream end portion of the accommodation portion 4060 refer to points at which a plane in which the recording media P accommodated in the accommodation portion 4060 are disposed and the accommodation portion 4060 cross each other.

The recording media P accommodated in the accommodation portion 4060 are in such a posture that the medium surface of the recording media P extends along the bottom surface of the accommodation portion 4060.

In the present exemplary embodiment, the accommodation portion 4060 is inclined with respect to the horizontal direction such that a front edge Pf of the recording media accommodated in the accommodation portion 4060 is located above a rear edge Pr thereof. The front edge Pf of the recording media P is an edge of the recording media P on the side on which the recording media P are fed to the transport path 4016 (see FIG. 48). The rear edge Pr of the recording media P is an edge of the recording media P on the opposite side of the front edge Pf.

The recording media P accommodated in the accommodation portion 4060 may be transported by the transport portion 4014 with the accommodation portion 4060 mounted to the apparatus body 4110*a*. In other words, the accommodation portion 4060 mounted to the apparatus body 4110*a* is positioned at a first transport position at which the recording media P accommodated therein may be transported.

Figure 49B:
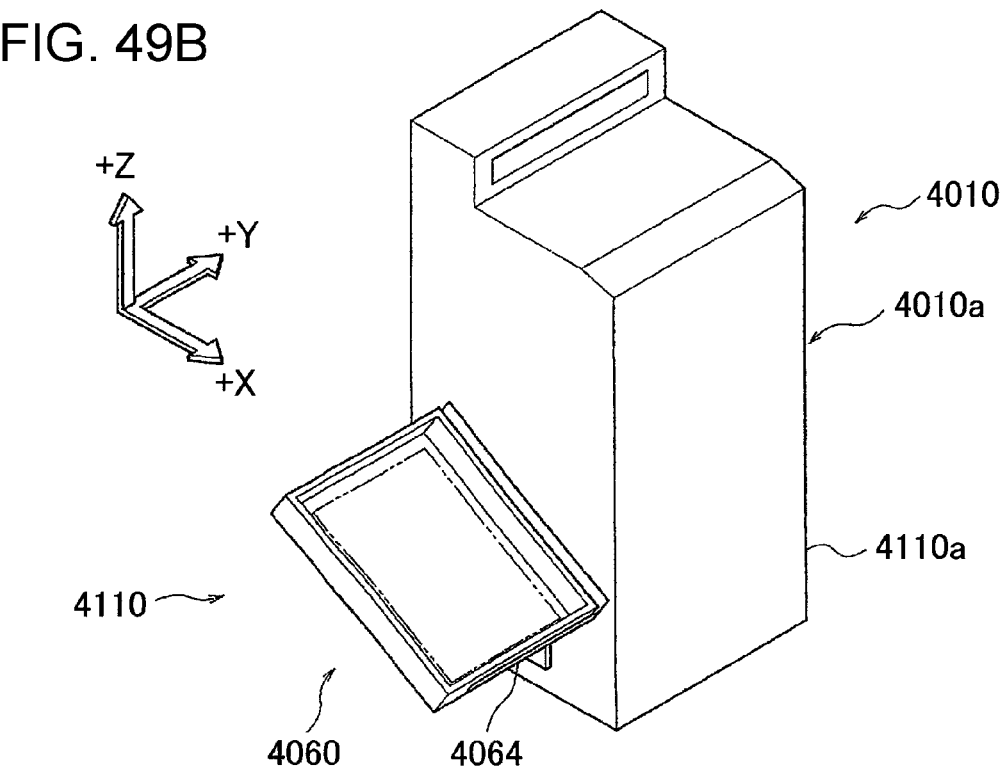

When the user draws the accommodation portion 4060, which has been mounted to the apparatus body 4110*a*, to the front side in the apparatus depth direction, on the other hand, the accommodation portion 4060 is guided by the slide rails 4064, stopped in contact with a stopper (not illustrated), and dismounted from the apparatus body 4110*a* as illustrated in FIG. 49B. When the user pushes the accommodation portion 4060, which has been dismounted from the apparatus body 4110*a*, to the back side in the apparatus depth direction, meanwhile, the accommodation portion 4060 is guided by the slide rails 4064 and mounted to the apparatus body 4110*a*. When the accommodation portion 4060 is dismounted, the recording media P may be accommodated in the accommodation portion 4060. In the present exemplary embodiment, the state in which the accommodation portion 4060 is dismounted from the apparatus body 4110*a* corresponds to a state in which the accommodation portion 4060 is supported by the apparatus body 4110*a* without being detached from the apparatus body 4110*a* and the recording media P may be accommodated in the accommodation portion 4060.

When the accommodation portion 4060 is dismounted from the apparatus body 4110*a*, the accommodation portion 4060 is inclined with respect to the horizontal direction such that one end and the other end thereof in the apparatus depth direction are at different positions in the up-down direction as seen in the apparatus depth direction. Specifically, the accommodation portion 4060 which has been dismounted from the apparatus body 4110 is disposed within the apparatus depth of the apparatus body 4110*a* as seen in the apparatus depth direction.

When the accommodation portion 4060 is dismounted from the apparatus body 4110*a*, the accommodation portion 4060 opens upward, and the recording media P may be supplied to the accommodation portion 4060. In other words, the accommodation portion 4060 which has been dismounted from the apparatus body 4110*a* is positioned at a first supply position at which the recording media P may be supplied to the accommodation portion 4060.

Accommodation Portion 4070 and Slide Rails 4074

As illustrated in FIG. 48, the accommodation portion 4070 is formed in the shape of a box that opens upward, and a pair of slide rails 4074 are attached to both ends of the accommodation portion 4070 in the apparatus width direction.

The slide rails 4074 each include an outer member, an intermediate member, and an inner member. The outer member is attached to the apparatus body 4110*a*. The inner member is attached to the accommodation portion 4070.

Consequently, when the user draws the accommodation portion 4070, which has been mounted to the apparatus body 4110*a*, to the front side in the apparatus depth direction, the accommodation portion 4070 is guided by the slide rails 4074 and dismounted from the apparatus body 4110*a*. When the user pushes the accommodation portion 4070, which has been dismounted from the apparatus body 4110*a*, to the back side in the apparatus depth direction, meanwhile, the accommodation portion 4070 is guided by the slide rails 4074 and mounted to the apparatus body 4110*a*.

As illustrated in FIG. 48, the accommodation portion 4070 is disposed horizontally as seen in the apparatus depth direction when the accommodation portion 4070 is mounted to the apparatus body 4010*a* and when the accommodation portion 4070 is dismounted from the apparatus body 4010*a*. When the accommodation portion 4070 is disposed horizontally in the present exemplary embodiment, it is only necessary that the accommodation portion 4070 should be disposed along the horizontal direction, and the accommodation portion 4070 may be inclined to such a degree that does not allow the recording media P accommodated in the accommodation portion 4070 to be moved because of the inclination, for example.

The accommodation portion 4070 mounted to the apparatus body 4110*a* is positioned at a second transport position at which the recording media P accommodated therein may be transported. The accommodation portion 4070 dismounted from the apparatus body 4110*a* is positioned at a second supply position at which the recording media P may be supplied to the accommodation portion 4070.

The accommodation portion 4070 mounted to the apparatus body 4110*a* is drawable from the apparatus body 4110*a* to the front side in the apparatus depth direction, irrespective of the position of the accommodation portion 4060.

The recording media P of the maximum size accommodated in the accommodation portion 4070 are disposed in the range (R1 in the drawing) in which the recording media P of the maximum size accommodated in the accommodation portion 4060 are disposed in the apparatus width direction as seen in the apparatus depth direction. The recording media P of the maximum size accommodated in the accommodation portion 4070 are disposed in the range (R2 in the drawing) in which the recording media P of the maximum size accommodated in the accommodation portion 4060 are disposed in the apparatus up-down direction as seen in the apparatus depth direction.

Accommodation Portion 4080 and Slide Rails 4084

As illustrated in FIG. 48, the accommodation portion 4080 is formed in the shape of a box that opens upward, and a pair of slide rails 4084 are attached to both ends of the accommodation portion 4080 in the apparatus width direction.

The slide rails 4084 each include an outer member, an intermediate member, and an inner member. The outer member is attached to the apparatus body 4110*a*. The inner member is attached to the accommodation portion 4080.

Consequently, when the user draws the accommodation portion 4080, which has been mounted to the apparatus body 4110*a*, to the front side in the apparatus depth direction, the accommodation portion 4080 is guided by the slide rails 4084 and dismounted from the apparatus body 4110*a*. When the user pushes the accommodation portion 4080, which has been dismounted from the apparatus body 4110*a*, to the back side in the apparatus depth direction, meanwhile, the accommodation portion 4080 is guided by the slide rails 4084 and mounted to the apparatus body 4110*a*.

As illustrated in FIG. 48, the accommodation portion 4080 is disposed horizontally as seen in the apparatus depth direction when the accommodation portion 4080 is mounted to the apparatus body 4110*a* and when the accommodation portion 4080 is dismounted from the apparatus body 4110*a*. When the accommodation portion 4080 is disposed horizontally in the present exemplary embodiment, it is only necessary that the accommodation portion 4080 should be disposed along the horizontal direction, and the accommodation portion 4080 may be inclined to such a degree that does not allow the recording media P accommodated in the accommodation portion 4080 to be moved because of the inclination, for example.

The accommodation portion 4080 mounted to the apparatus body 4110*a* is positioned at a third transport position at which the recording media P accommodated therein may be transported. The accommodation portion 4080 dismounted from the apparatus body 4110*a* is positioned at a second supply position at which the recording media P may be supplied to the accommodation portion 4080.

The accommodation portion 4080 mounted to the apparatus body 4110*a* is drawable from the apparatus body 4110*a* to the front side in the apparatus depth direction, irrespective of the position of the accommodation portion 4080.

The recording media P of the maximum size accommodated in the accommodation portion 4080 are disposed in the range R1 in which the recording media P of the maximum size accommodated in the accommodation portion 4060 are disposed in the apparatus width direction as seen in the apparatus depth direction.

While an accommodation portion is provided obliquely with respect to the horizontal direction in the first exemplary embodiment described above, it is only necessary that the positions of one end and the other end of an accommodation portion should be different from each other. For example, in the case where an accommodation portion is provided in parallel with the vertical direction Z, the range in which the accommodation portion is disposed in the horizontal direction X (width direction) may be reduced compared to the case where the accommodation portion is provided horizontally.

Cover 4130

Figure 50A:
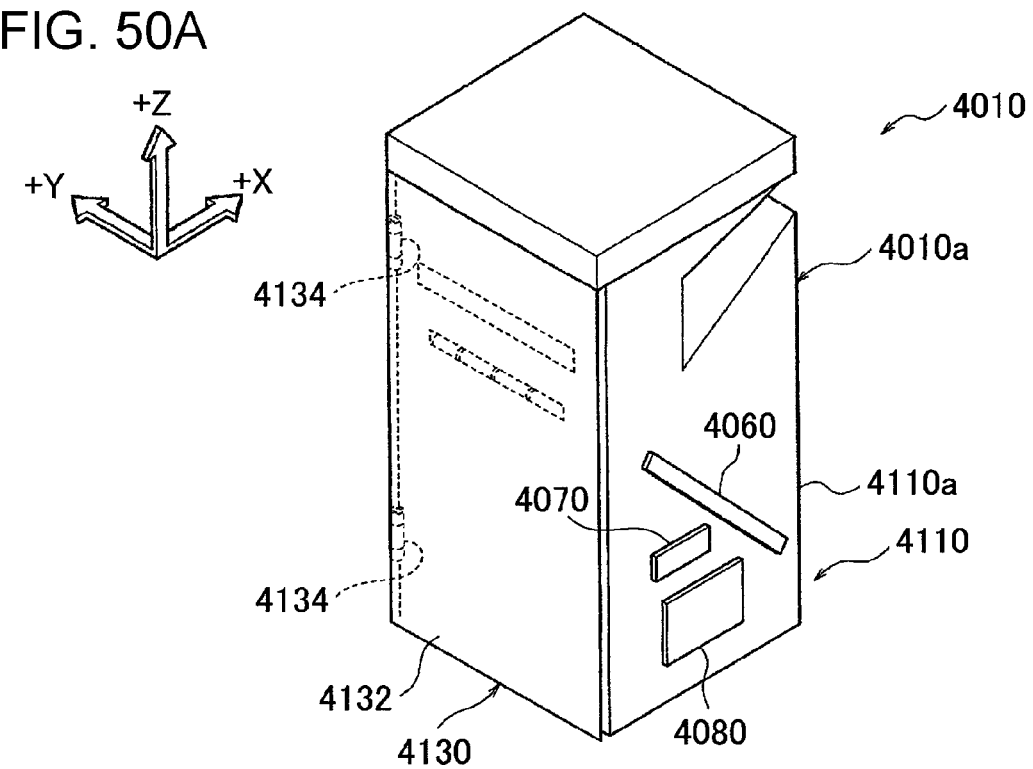
FIGS. 50A and 50B are each a perspective view illustrating the overall configuration of an image forming apparatus according to a different exemplary embodiment including a sheet accommodation device.
Figure 50B:
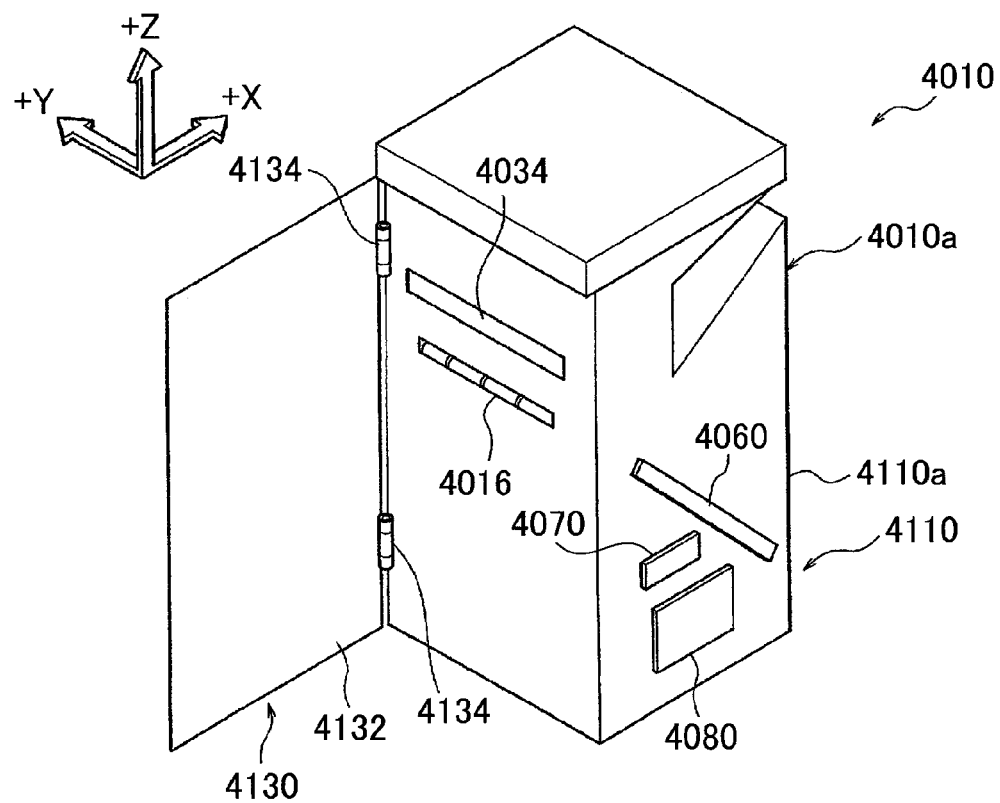

As illustrated in FIGS. 50A and 50B, the cover 4130 is attached to the apparatus body 4010*a*, and movable between a cover position at which the cover 4130 covers one side surface of the apparatus body 4010*a* from the apparatus width direction and an open position at which the cover 4130 opens the one side surface of the apparatus body 4010*a*.

The cover 4130 which is positioned at the cover position covers at least a part of the transport path 4016, along which the recording media P are transported by the transport portion 4014, from the apparatus width direction. Therefore, the cover 4130 which is positioned at the open position opens at least a part of the transport path 4016, along which the recording media P are transported by the transport portion 4014, to the apparatus width direction.

In the present exemplary embodiment, the cover 4130 has a function of covering the apparatus body 4010*a* of the image forming apparatus 4010 from one side surface. That is, the cover 4130 is movable between a cover position at which the cover 4130 covers the fixing device 4034 mounted to the apparatus body 4010*a* from the apparatus width direction and an open position at which the cover 4130 opens the fixing device 4034 to the apparatus width direction.

As illustrated in FIG. 50A, the cover 4130 which is positioned at the cover position includes a body portion 4132 formed in the shape of a rectangle that extends in the apparatus up-down direction as seen in the apparatus width direction, and support portions 4134 that rotatably support the body portion 4132.

As illustrated in FIGS. 50A and 50B, a pair of support portions 4134 are attached to the back side portion of the apparatus body 4010*a* in the apparatus depth direction, and spaced from each other in the apparatus up-down direction.

In this configuration, the cover 4130 is movable between a cover position at which the cover 4130 covers the apparatus body 4010*a* of the accommodation device 4110 from the apparatus width direction and an open position at which the cover 4130 opens the apparatus body 4010*a* to the apparatus width direction. Specifically, the cover 4130 is stopped at the cover position in contact with a stopper (not illustrated). When the cover 4130 which is stationary at the cover position is rotationally moved, the cover 4130 is stopped at the open position in contact with a stopper (not illustrated).

Figure 52A:
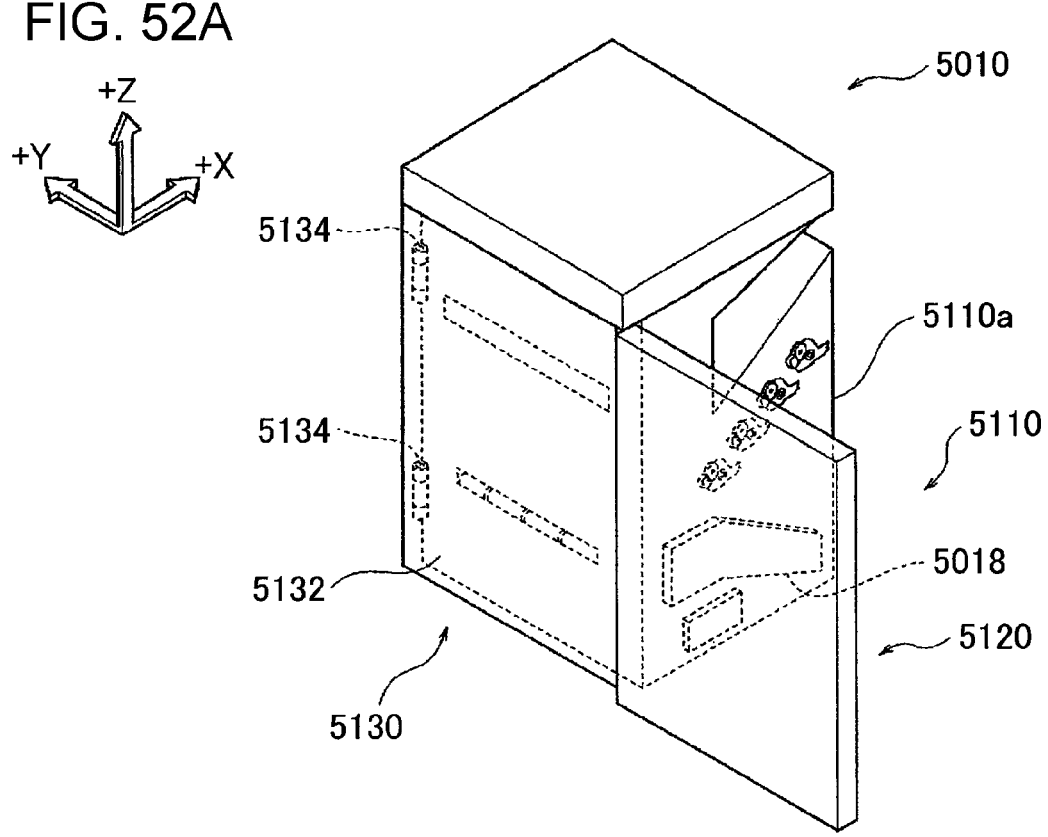
FIGS. 52A and 52B are each a perspective view illustrating the overall configuration of an image forming apparatus according to a different exemplary embodiment to which a sheet accommodation device is applied.

As described above, in the sheet accommodation device, when the cover is positioned at the cover position, the cover covers the entire accommodation portions mounted to the apparatus body as seen in the apparatus depth direction Y as illustrated in FIG. 52A.

Figure 52B:
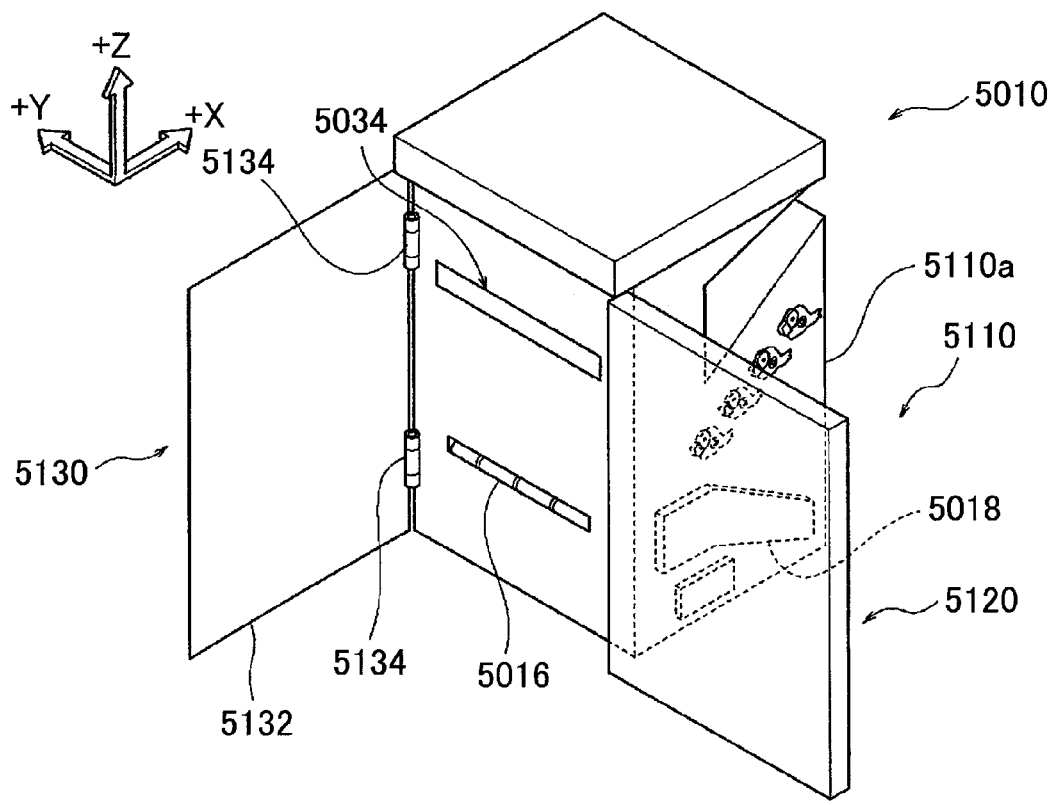

In the sheet accommodation device, when the cover is positioned at the open position, the cover is disposed at a position closer to the upper end of the accommodation portions than to the lower end thereof as seen in the apparatus depth direction Y as illustrated in FIG. 52B.

In the sheet accommodation device, when the accommodation portion is dismounted from the apparatus body with the cover positioned at the open position, the bottom plate of the dismounted accommodation portion is open in the direction of the thickness of the bottom plate.

In the sheet accommodation device 5110, a cover 5120 positioned at the cover position restricts the work of dismounting an accommodation portion 5018 mounted to an apparatus body 5110*a*, and the cover 5120 positioned at the open position does not restrict the work of dismounting the accommodation portion 5018 mounted to the apparatus body 5110*a*. In other words, the work of dismounting the accommodation portion 5018 mounted to the apparatus body 5110*a* is allowed. Consequently, dismounting of the accommodation portion 5018 from the apparatus body 5110*a* is restricted when the cover 5120 is positioned at the cover position.

In the sheet accommodation device, the lower end of the accommodation portion 5018 is closer to the lower end side of the accommodation portion 5018 than to the upper end side thereof as seen in the apparatus depth direction Y.

In the sheet accommodation device 5110, the locus of movement of the cover 5120 and the locus of movement of a cover 5130 are away from each other. This renders the cover 5130 movable irrespective of the position of movement of the cover 5120. When the locus of movement of the cover 5120 and the locus of movement of the cover 5130 are away from each other, the two loci of movement do not overlap each other three-dimensionally.

In an image forming apparatus 5010, an image forming section 5030 may be maintained with the cover 5120 positioned at the open position.

In the image forming apparatus 5010, an image forming section 5034 may be maintained with the cover 5130 positioned at the open position.

While a specific exemplary embodiment of the present disclosure has been described above, the present disclosure is not limited to such an exemplary embodiment. It is apparent to a person skilled in the art that a variety of other exemplary embodiments of the present disclosure may fall within the scope of the present disclosure. For example, while the sheet accommodation device 5110 is used in the image forming apparatus 5010 of an electrophotography type in the exemplary embodiment described above, the sheet accommodation device 5110 may be used in an image forming apparatus of an inkjet type etc., for example.

While the cover 5120 at the cover position covers the entire accommodation portion 5018 mounted to the apparatus body 5110a as seen in the apparatus depth direction Y in the exemplary embodiment described above, the cover 5120 at the cover position may cover only a part of the accommodation portion 5018. Consequently, the number of inclined division lines exposed in the apparatus depth direction is reduced. The state of being exposed corresponds to appearing on a surface without being covered by a different member. When the number of division lines is reduced, the length of exposed straight portions of the division lines may be reduced.

While the cover 5120 at the cover position covers the entire accommodation portion 5060 mounted to the apparatus body 5110a as seen in the apparatus depth direction Y in the exemplary embodiment described above, the cover 5120 at the cover position may cover only a part of the accommodation portion 5060. Consequently, the number of division lines exposed in the apparatus depth direction Y is reduced.

While the cover 5120 positioned at the open position is disposed at a position closer to the upper end of the accommodation portion 5018 than to the lower end thereof as seen in the apparatus depth direction Y in the exemplary embodiment described above, the cover may be disposed at a position closer to the lower end of the accommodation portion 5018 than to the upper end thereof.

While the lower end of the accommodation portion 5018 is closer to the lower end side of the accommodation portion 5018 than to the upper end side thereof as seen in the apparatus depth direction Y in the exemplary embodiment described above, the lower end of the accommodation portion 5018 may be closer to the upper end side of the accommodation portion 5018 than to the lower end side thereof. In this case, the function achieved when the lower end of the accommodation portion 5018 is closer to the lower end side of the accommodation portion 5018 than to the upper end side thereof is not achieved.

In the exemplary embodiment described above, although not specifically described, the mass of the cover 5120 is smaller than the mass of the accommodation portion 5018, and the cover 5120 positioned at the open position may not be moved to the cover position when the accommodation portion 5018 is dismounted from the apparatus body 5110a. Consequently, when the cover 5120 at the open position is moved toward the cover position with the accommodation portion 5018 dismounted from the apparatus body 5110a, movement of the cover 5120 is stopped with the cover 5120 brought into contact with the accommodation portion 5018.

In the exemplary embodiment described above, although not specifically described, a body portion of the cover 5120 is opened and closed about support portions 5134 disposed on the −X side of the accommodation portion 5018, and the accommodation portion 5018 is moved forward in the apparatus depth direction Y in the case where the cover 5120 is moved to the open position. Consequently, the body portion of the cover 5120 is disposed on the +X side of the accommodation portion 5018 in the case where the body portion is moved to the open position.

While the support portions 5134 are disposed on the −X side of the accommodation portion 5018 in the exemplary embodiment described above, the support portions 5134 may be disposed on the +X side of the accommodation portion 5018, and the body portion may be opened and closed about the support portions. In this case, the body portion is not disposed on the −X side of the accommodation portion 5018 in the case where the body portion is moved to the open position.

In the exemplary embodiment described above, although not specifically described, the accommodation portion 5018 and the accommodation portion 5060 are covered by the cover 5120, which is constituted as a single cover, in the apparatus depth direction Y in the case where the cover 5120 is moved to the cover position. Consequently, there is less division line formed by the cover than the case where the cover is constituted as two sheets.

CONCLUSION

Next, the function of the accommodation device 4110 will be described in comparison with an accommodation device 4310 of an image forming apparatus 4210 according to a first comparative form and an accommodation device 4110 of an image forming apparatus 4210 according to a second comparative form. First, differences of the configuration of the accommodation device 4310 and the configuration of the accommodation device 4110 from the configuration of the accommodation device 4110 will be principally described.

Configuration of Accommodation Device 4310

Figure 51A:
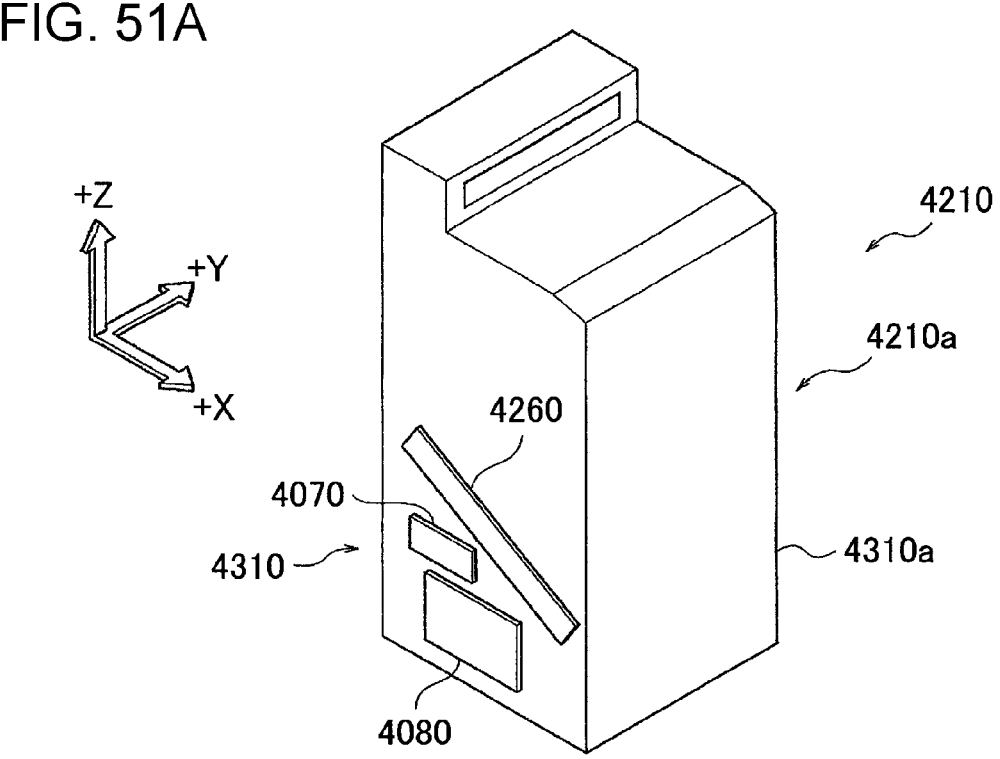
FIGS. 51A and 51B are each a perspective view illustrating the overall configuration of an image forming apparatus according to a different exemplary embodiment to which a sheet accommodation device is applied.
Figure 51B:
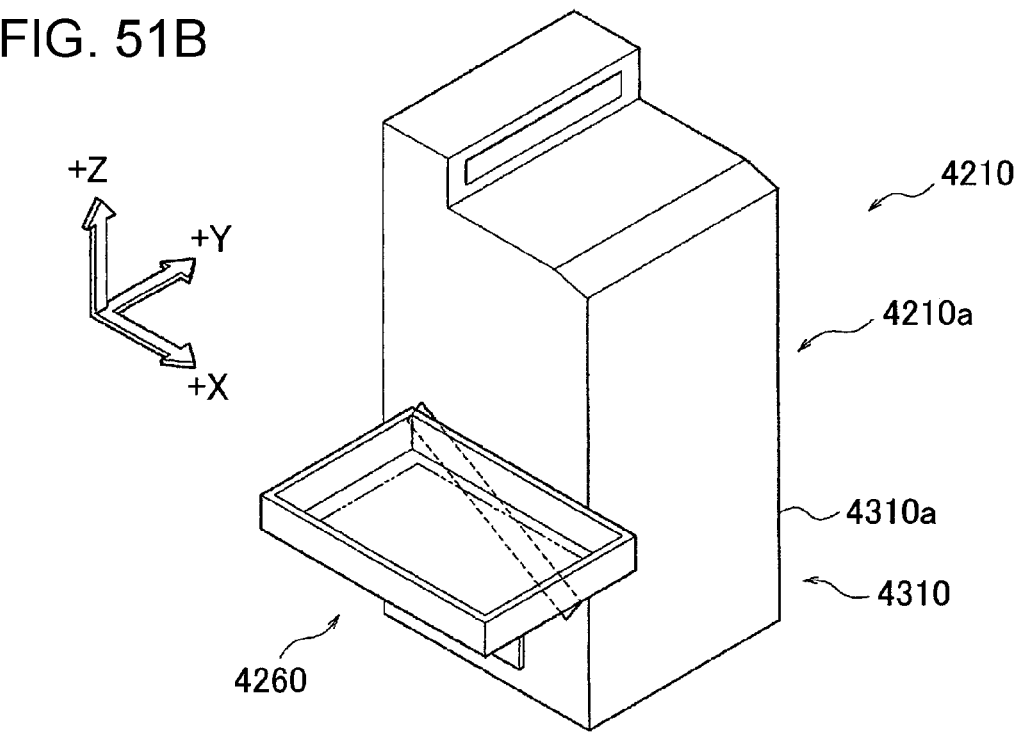

As illustrated in FIGS. 51A and 51B, the accommodation device 4310 includes three accommodation portions 4260, 4070, and 4080 that accommodate the recording media P. As illustrated in FIG. 51A, the accommodation portion 4260 is inclined with respect to the horizontal direction, as with the accommodation portion 4060, when the accommodation portion 4260 is mounted to the apparatus body 4310a.

On the other hand, as illustrated in FIG. 51B, the accommodation portion 4260 is disposed horizontally as guided by a slide and link mechanism (not illustrated) when the accommodation portion 4260 is dismounted from the apparatus body 4310a. The accommodation portion 4260 projects from the apparatus body 4310a in the apparatus width direction as seen in the apparatus depth direction.

Configuration of Accommodation Device 4010

As illustrated in FIGS. 49A and 49B, the accommodation device 4010 includes an accommodation portion 4060, an accommodation portion 4070, and an accommodation portion 4080, which are arranged in this order from the upper side toward the lower side in the apparatus up-down direction.

The maximum size of the recording media P that may be accommodated in the accommodation portion 4080 is smaller than the maximum size of the recording media P that may be accommodated in the accommodation portion 4060. The maximum size of the recording media P that may be accommodated in the accommodation portion 4070 is smaller than the maximum size of the recording media P that may be accommodated in the accommodation portion 4080. The number of the recording media P that may be accommodated in the accommodation portion 4060, the number of the recording media P that may be accommodated in the accommodation portion 4070, and the number of the recording media P that may be accommodated in the accommodation portion 4080 are similar to each other. Consequently, the total thicknesses in the thickness direction of the recording media P to be accommodated in the accommodation portion 4060, the accommodation portion 4070, and the accommodation portion 4080 are similar to each other.

<Overall Configuration of Image Forming Apparatus>

Next, the configuration of the image forming apparatus including the driving device according to the first exemplary embodiment will be described.

Figure 1:
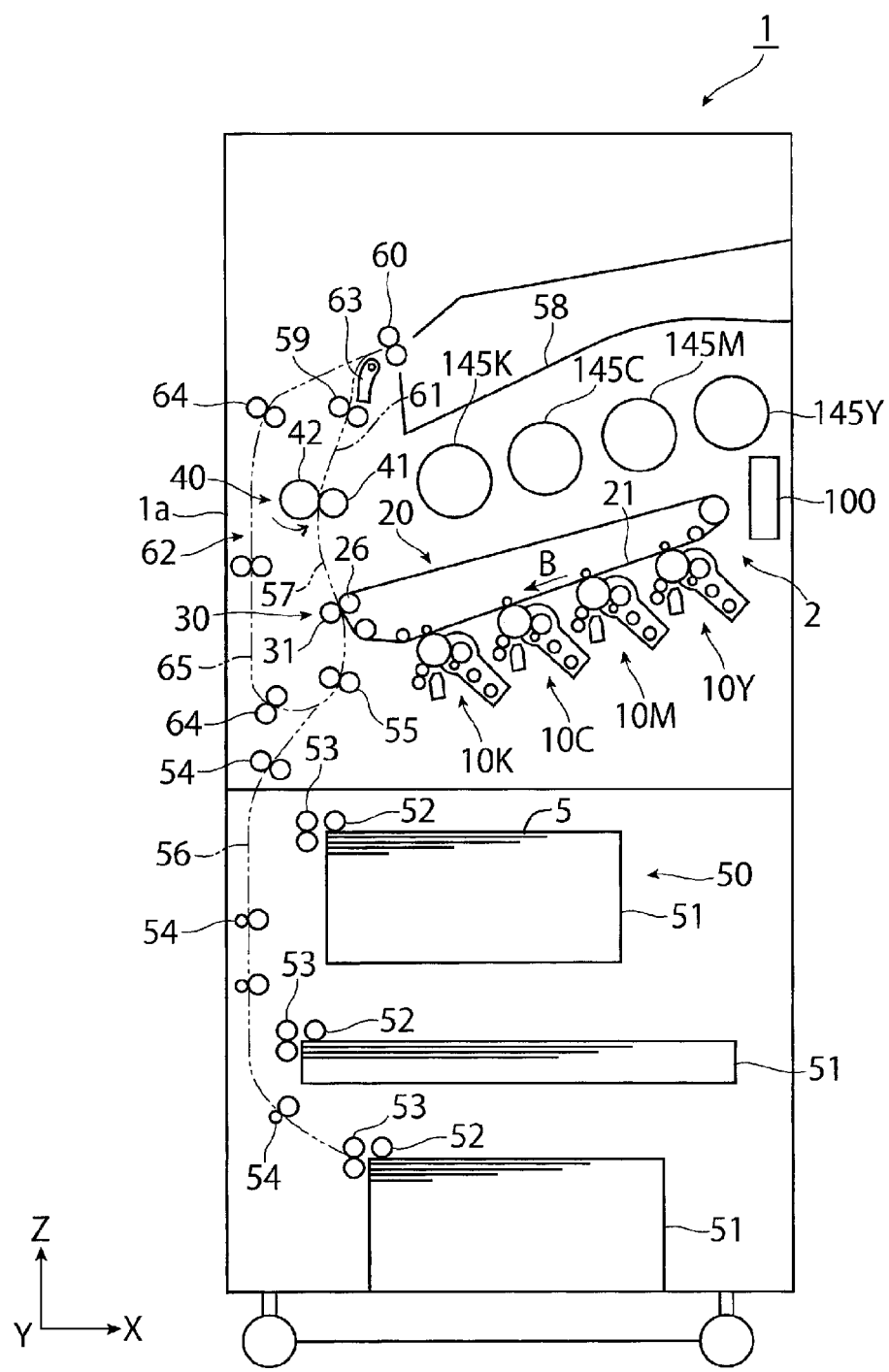
FIG. 1 illustrates the overall configuration of an image forming apparatus including a driving device according to a first exemplary embodiment of the present disclosure.

The image forming apparatus 1 according to the first exemplary embodiment is configured as a color printer, for example. The image forming apparatus is an example of an accommodation device. As illustrated in FIG. 1, the image forming apparatus 1 includes plural image preparing devices 10, an intermediate transfer device 20, a paper feed device 50, a fixing device 40, etc. The image preparing devices 10 form a toner image to be developed using a toner that constitutes a developer. The intermediate transfer device 20 holds the toner images formed by the image preparing devices 10 to transport the toner images finally to a second transfer position at which the toner images are transferred to recording paper 5 as an example of a recording medium through a second transfer. The paper feed device 50 accommodates and transports the prescribed recording paper 5 to be supplied to the second transfer position of the intermediate transfer device 20. The fixing device 40 fixes the toner images on the recording paper 5 which have been subjected to the second transfer performed by the intermediate transfer device 20. Reference numeral 1a in the drawing denotes an apparatus body of the image forming apparatus 1. The apparatus body 1a is constituted by a support structure member, an exterior cover, etc. The double-dashed lines in the drawing indicate principal transport paths along which the recording paper 5 is transported in the apparatus body 1a.

The image preparing devices 10 are composed of four image preparing devices 10Y, 10M, 10C, and 10K that exclusively form toner images in four colors, namely yellow (Y), magenta (M), cyan (C), and black (K), respectively. The four image preparing devices 10 (Y, M, C, K) are disposed in the internal space of the apparatus body 1a as arranged in one line inclined such that the image preparing device 10Y for yellow (Y) is provided at a higher position along the Z direction and the image preparing device 10K for black (K) is provided at a lower position along the Z direction.

The four image preparing devices 10 are composed of image preparing devices 10 (Y, M, C) for colors including yellow (Y), magenta (M), and cyan (C), and an image preparing device 10K for black (K). The image preparing device 10K for black is disposed on the most downstream side along a moving direction B of an intermediate transfer belt 21 of the intermediate transfer device 20. The image forming apparatus 1 includes, as image forming modes, a full-color mode in which the image preparing devices 10 (Y, M, C) for colors and the image preparing device 10K for black (K) are caused to operate to form a full-color image, and a black-and-white mode in which only the image preparing device 10K for black (K) is caused to operate to form a black-and-white (monochrome) image.

Figure 2:
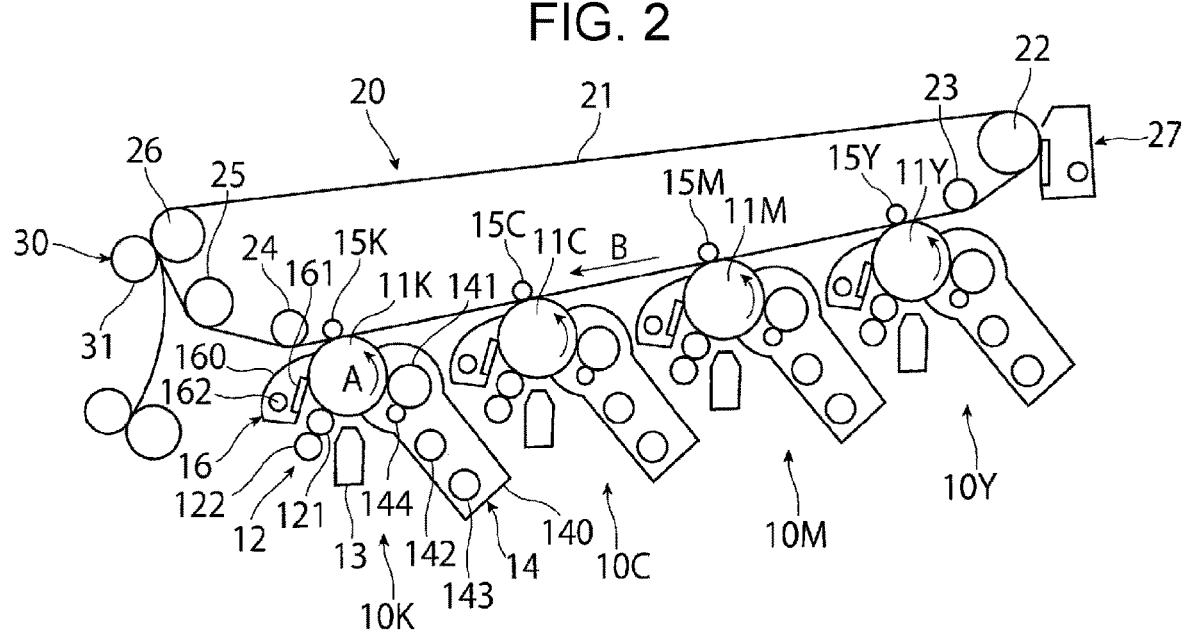
FIG. 2 illustrates the configuration of the image preparing devices of the image forming apparatus according to the first exemplary embodiment of the present disclosure.

As illustrated in FIG. 2, the image preparing devices 10 (Y, M, C, K) each include a photosensitive drum 11 that is rotatable as an example of an image forming unit (image holding member). A charging device 12, an exposure device 13, a developing device 14 (Y, M, C, K), a first transfer device 15 (Y, M, C, K), a drum cleaning device 16 (Y, M, C, K), etc. are provided around the photosensitive drum 11. The charging device 12 charges a peripheral surface (image holding surface) of the photosensitive drum 11, on which an image may be formed, with a prescribed potential. The exposure device 13 radiates light based on information (signal) on an image to the charged peripheral surface of the photosensitive drum 11 to form an electrostatic latent image (in each color) with a potential difference. The developing device 14 (Y, M, C, K) is an example of an image forming unit (developing unit) that develops the electrostatic latent image using a toner of the developer for the corresponding color (Y, M, C, K) to form a toner image. The first transfer device 15 (Y, M, C, K) transfers the toner image to the intermediate transfer device 20. The drum cleaning device 16 (Y, M, C, K) cleans the photosensitive drum 11 by removing attached matter such as a toner remaining on and adhering to the image holding surface of the photosensitive drum 11 after being subjected to the first transfer.

The photosensitive drum 11 has an image holding surface formed by providing a photoconductive layer (photosensitive layer) made of a photosensitive material on the peripheral surface of a grounded cylindrical or columnar base material. The photosensitive drum 11 is supported so as to receive a driving force transferred from a driving unit according to the first exemplary embodiment to be rotated in the direction indicated by the arrow A, as discussed later.

The charging device 12 is constituted of a contact charging roller 121 disposed in contact with the photosensitive drum 11. A cleaning roller 122 is disposed in contact with the back surface of the charging roller 121 to clean the surface of the charging roller 121. A charging voltage is supplied to the charging device 12. In the case where the developing device 14 performs reversal development, a voltage or a current having the same polarity as the polarity for charging the toner supplied from the developing device 14 is supplied as the charging voltage. The charging roller 121 and the charging roller 121 receive a driving force transferred from the photosensitive drum 11 to be rotated in a following manner.

The exposure device 13 is constituted of a light emitting diode (LED) print head that radiates light according to image information to the photosensitive drum 11 using plural LEDs as light emitting elements arranged along the axial direction of the photosensitive drum 11 to form an electrostatic latent image. In the exposure device 13, deflection scanning may be performed along the axial direction of the photosensitive drum 11 using laser light configured in accordance with the image information.

The developing devices 14 (Y, M, C, K) each include a housing 140, a developing roller 141, an agitation/supply member 142, an agitation/transport member 143, a layer thickness restricting member 144, etc. The housing 140 includes an opening portion and an accommodation chamber for the developer, and houses the other components. The developing roller 141 holds the developer, and transports the developer to a development region facing the photosensitive drum 11. The agitation/supply member 142, which may include a screw auger, supplies the developer so as to pass through the developing roller 141 while agitating the developer. The agitation/transport member 143, which may include a screw auger, transports the developer to the agitation/supply member 142 while agitating the developer. The layer thickness restricting member 144 restricts the amount (layer thickness) of the developer held by the developing roller 141. A development voltage supplied from a power source device (not illustrated) is applied between the developing roller 141 of the developing device 14 and the photosensitive drum 11. The developing roller 141 receives a driving force transferred from a driving unit according to the first exemplary embodiment to be rotated in a prescribed direction, as discussed later. The agitation/supply member 142 and the agitation/transport member 143 receive a driving force transferred from the developing roller 141 to be rotated in a following manner. A two-part developer containing a non-magnetic toner and a magnetic carrier is used as the developers for the four colors.

The first transfer device 15 (Y, M, C, K) is a contact transfer device that includes a first transfer roller that rotates in contact with the periphery of the photosensitive drum 11 via the intermediate transfer belt 21 and that is supplied with a first transfer voltage. A DC voltage having a polarity opposite to the polarity for charging the toner is supplied from a power source device (not illustrated) as the first transfer voltage.

The drum cleaning device 16 includes a body 160, a cleaning plate 161, a feeding member 162, etc. The body 160 is in the shape of a partially open container. The cleaning plate 161 is disposed so as to contact the peripheral surface of the photosensitive drum 11, after being subjected to the first transfer, with a prescribed pressure to clean the photosensitive drum 11 by removing attached matter such as a residual toner. The feeding member 162, which may be a screw auger, recovers attached matter, such as a toner, removed by the cleaning plate 161 to feed the attached matter to a recovery system (not illustrated). A plate-like member (e.g. a blade) made of a material such as rubber is used as the cleaning plate 161. The feeding member 162 of the drum cleaning device 16 receives a driving force transferred from the photosensitive drum 11 to be rotated in a following manner.

As illustrated in FIG. 1, the intermediate transfer device 20 is disposed at a position above the image preparing devices 10 (Y, M, C, K) along the Z direction. As illustrated in FIG. 2, the intermediate transfer device 20 is principally composed of the intermediate transfer belt 21, plural belt support rollers 22 to 26, a second transfer device 30 as an example of a second transfer unit, and a belt cleaning device 27. The intermediate transfer belt 21 is rotated in the direction indicated by the arrow B while passing through first transfer positions between the photosensitive drums 11 and the first transfer devices 15 (first transfer rollers). The plural belt support rollers 22 to 26 rotatably support the intermediate transfer belt 21 by holding the intermediate transfer belt 21 in a desired state from the inner side. The second transfer device 30 is disposed on the side of a portion of the outer peripheral surface (image holding surface) of the intermediate transfer belt 21 supported by the belt support roller 26 to transfer the toner image on the intermediate transfer belt 21 to the recording paper 5 through a second transfer. The belt cleaning device 27 cleans the intermediate transfer belt 21 by removing attached matter such as a toner and paper powder remaining on and adhering to the outer peripheral surface of the intermediate transfer belt 21 after passing through the second transfer device 30.

An endless belt fabricated from a material obtained by dispersing a resistance adjusting agent such as carbon black etc. in a synthetic resin such as a polyimide resin or a polyamide resin, for example, is used as the intermediate transfer belt 21. The belt support roller 22 is configured as a driving roller rotationally driven by a drive device 70 according to the first exemplary embodiment, to be discussed later, and also serves as a counter roller for the belt cleaning device 27. The belt support rollers 23 and 24 are configured as surface forming rollers that form an image forming surface of the intermediate transfer belt 21. The belt support roller 25 is configured as a tension applying roller that applies tension to the intermediate transfer belt 21. The belt support roller 26 is configured as a counter roller that faces the second transfer device 30.

Figure 4:
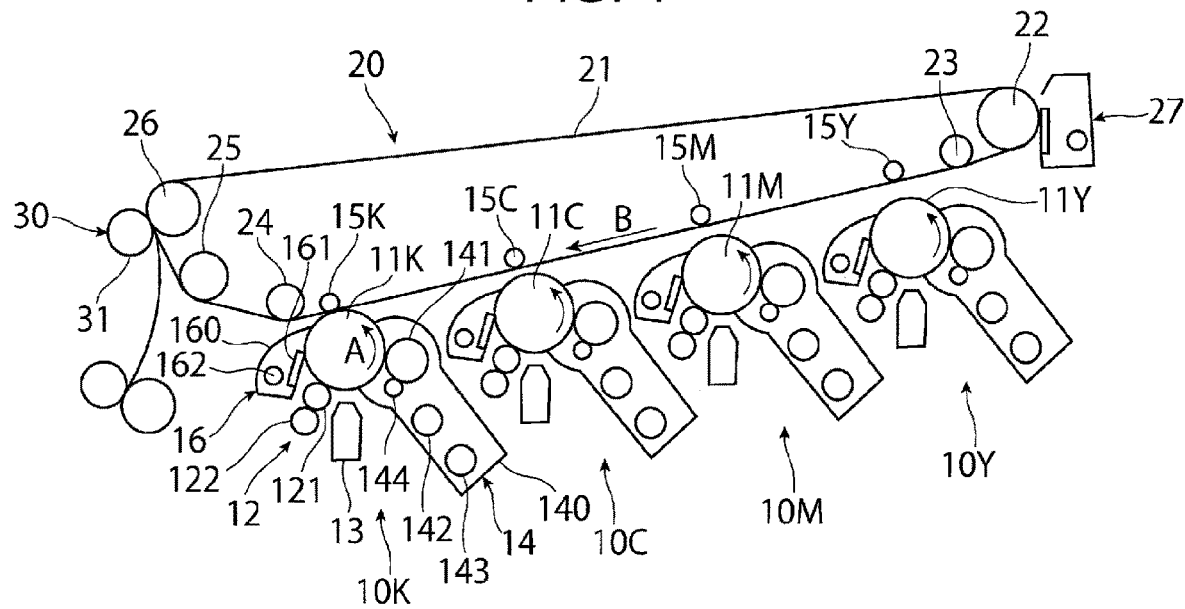
FIG. 4 illustrates the configuration of the image preparing devices of the image forming apparatus according to the first exemplary embodiment of the present disclosure.

The intermediate transfer device 20 is configured such that the belt support rollers 23 and 24 are movable inward and outward of the intermediate transfer belt 21 together with the first transfer devices 15 (Y, M, C, K). In the full-color mode, as illustrated in FIG. 2, the belt support rollers 23 and 24 are disposed at positions at which the first transfer devices 15 (Y, M, C, K) contact the surfaces of the photosensitive drums 11 (Y, M, C, K) via the intermediate transfer belt 21. Meanwhile, in the black-and-white mode, as illustrated in FIG. 4, the belt support roller 23 is moved to a position at which only the first transfer device 15K for black (K) contacts the surface of the photosensitive drum 11K for black (K) via the intermediate transfer belt 21 and the first transfer devices 15 (Y, M, C) for colors are away from the surfaces of the photosensitive drums 11 (Y, M, C) together with the intermediate transfer belt 21.

Figure 5:
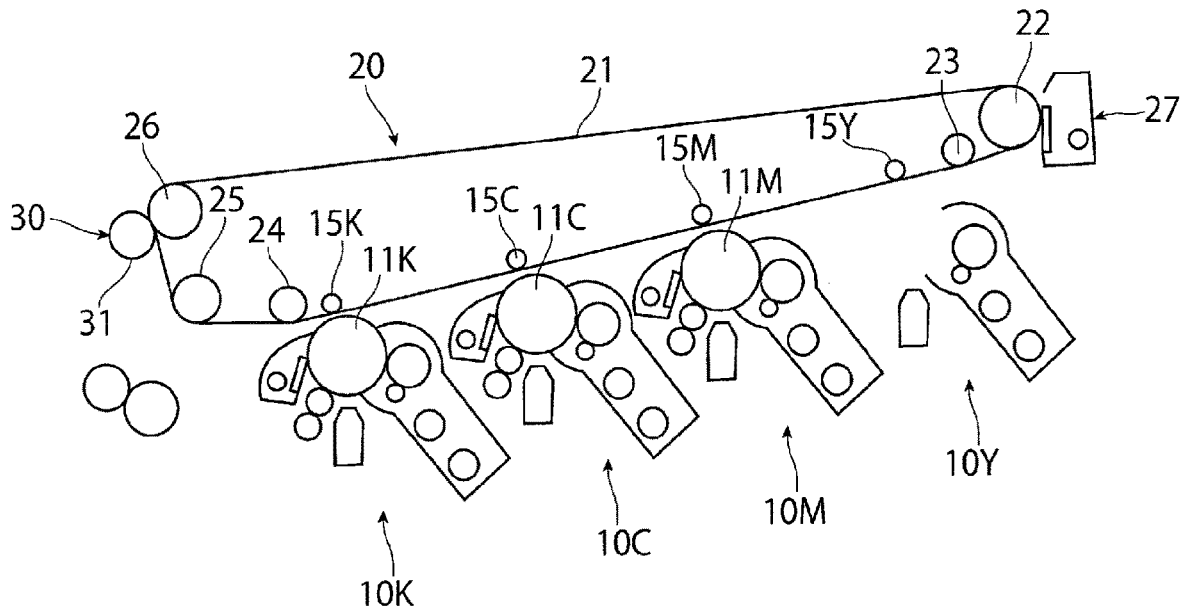
FIG. 5 illustrates the configuration of the image preparing devices of the image forming apparatus according to the first exemplary embodiment of the present disclosure.

Further, during maintenance, as illustrated in FIG. 5, the belt support rollers 23 and 24 are moved to positions at which the first transfer devices 15 (Y, M, C) for colors and the first transfer device 15K for black (K) are away from the surfaces of the photosensitive drums 11 (Y, M, C, K) together with the intermediate transfer belt 21. For convenience, FIG. 5 illustrates a state in which a photosensitive drum unit 200Y for yellow (Y) has been detached.

As illustrated in FIG. 1, the second transfer device 30 is a contact transfer device including a second transfer roller 31 provided at the second transfer position, which is a portion of the outer peripheral surface of the intermediate transfer belt 21 supported by the belt support roller 26 in the intermediate transfer device 20. The second transfer roller 31 rotates in contact with the peripheral surface of the intermediate transfer belt 21, and is supplied with a second transfer voltage. A DC voltage having a polarity opposite to or the same as the polarity for charging the toner is supplied as the second transfer voltage from a power source device (not illustrated) to the second transfer roller 31 or the belt support roller 26 of the intermediate transfer device 20.

The fixing device 40 is composed of a heating rotary member 41 in the form of a roller or a belt, a pressurizing rotary member 42 in the form of a belt or a roller, etc. disposed inside a housing (not illustrated) formed with an introduction port and an ejection port for the recording paper 5. The heating rotary member 41 is rotated in the direction indicated by the arrow, and heated by a heating unit such that the surface temperature is kept at a predetermined temperature. The pressurizing rotary member 42 contacts the heating rotary member 41 at a predetermined pressure substantially along the axial direction of the heating rotary member 41 to be rotated in a following manner. In the fixing device 40, a contact portion at which the heating rotary member 41 and the pressurizing rotary member 42 contact each other serves as a fixation processing part at which a prescribed fixation process (heating and pressurization) is performed.

The paper feed device 50 is disposed so as to be present at a position below the image preparing devices 10 (Y, M, C, K). The paper feed device 50 is principally composed of one or more paper accommodation members 51 and feeding devices 52 and 53. The paper accommodation members 51 accommodate a stack of sheets of the recording paper 5 of desired size, type, etc. The feeding devices 52 and 53 feed the recording paper 5, one sheet at a time, from the paper accommodation members 51. The paper accommodation members 51 are attached so as to be drawn out toward the front surface (a side surface that the user faces during operation) of the apparatus body 1*a*, for example.

Examples of the recording paper 5 include regular paper for use for electrophotographic copiers, printers, etc., thin paper such as tracing paper, and overhead projector (OHP) sheets. In order to further improve the smoothness of the surface of an image after the fixation, the surface of the recording paper 5 is preferably as smooth as possible. For example, coated paper prepared by coating the surface of regular paper with a resin or the like, so-called cardboard with a relatively large basis weight such as art paper for printing, etc. may also be suitably used.

A paper feed/transport path 56 is provided between the paper feed device 50 and the second transfer device 30. The paper feed/transport path 56 is composed of one or more pairs of paper transport rollers 54 and 55 and a transport guide (not illustrated). The paper transport rollers 54 and 55 transport the recording paper 5 fed from the paper feed device 50 to the second transfer position. The pair of paper transport rollers 55 disposed at a position immediately before the second transfer position in the paper feed/transport path 56 are configured as rollers (resist rollers) that adjust the transport timing for the recording paper 5, for example. A paper transport path 57 is provided between the second transfer device 30 and the fixing device 40. The paper transport path 57 is used to transport the recording paper 5 after being subjected to the second transfer fed from the second transfer device 30 to the fixing device 40. Further, an ejection/transport path 61 is provided near a paper ejection port of the apparatus body 1*a* of the image forming apparatus 1. The ejection/transport path 61 includes a pair of paper ejection rollers 59 and 60 that eject the recording paper 5 after being fixed fed from the fixing device 40 to a paper ejection portion 58 provided at the upper portion of the apparatus body 1*a*.

The image forming apparatus 1 further includes a double-sided processing unit 62 for forming an image on both surfaces of the recording paper 5. When the recording paper 5, on one surface of which an image has been formed, is transported to the paper transport path 57 by the ejection roller 59, the double-sided processing unit 62 introduces the recording paper 5 via a switching gate 63 by rotating the paper ejection roller pair 60 in reverse while the paper ejection roller pair 60 is holding the rear end of the recording paper 5. The double-sided processing unit 62 includes a double-sided processing transport path 65 composed of plural transport rollers 64 and a transport guide (not illustrated) that transport the introduced recording paper 5 with the front and back sides of the recording paper 5 reversed.

In FIG. 1, reference numeral 145 (Y, M, C, K) denotes a toner cartridge as an example of a developer accommodation container that accommodates a developer containing at least a toner to be supplied to the corresponding developing device 14. In the exemplary embodiment, only a toner is accommodated inside the toner cartridge 145 (Y, M, C, K).

In FIG. 1, reference numeral 100 denotes a control device that comprehensively controls operation of the image forming apparatus 1. The control device 100 includes a central processing unit (CPU), a read only memory (ROM), a random access memory (RAM), a bus that connects between the CPU, the ROM, etc., a communication interface, etc. (not illustrated).

<Operation of Image Forming Apparatus>

Basic image forming operation performed by the image forming apparatus 1 will be described below.

Operation in the full-color mode for forming a full-color image by combining toner images in four colors (Y, M, C, K) using the four image preparing devices 10 (Y, M, C, K) will be described.

When the image forming apparatus 1 receives image information and command information requesting full-color image forming operation (printing) from a personal computer, an image reading device, etc. (not illustrated), the control device 100 starts the four image preparing devices 10 (Y, M, C, K), the intermediate transfer device 20, the second transfer device 30, the fixing device 40, etc.

Then, in each of the image preparing devices 10 (Y, M, C, K), first, as illustrated in FIGS. 1 and 2, the photosensitive drum 11 is rotated in the direction indicated by the arrow A, and the charging device 12 charges the surface of the photosensitive drum 11 with a prescribed polarity (negative polarity in the first exemplary embodiment) and a prescribed potential. Subsequently, the exposure device 13 irradiates the surface of the photosensitive drum 11 after being charged with light emitted on the basis of a signal for an image converted into each color component (Y, M, C, K), to form an electrostatic latent image for each color component with a prescribed potential difference on the surface of the photosensitive drum 11.

Subsequently, the image preparing device 10 (Y, M, C, K) develops the electrostatic latent image for each color component formed on the photosensitive drum 11 by supplying a toner for the corresponding color (Y, M, C, K) charged with a prescribed polarity (negative polarity) from the developing roller 141 for electrostatic adhesion. As a result of the development, the electrostatic latent images for the various color components formed on the photosensitive drums 11 are rendered manifest as toner images in the four colors (Y, M, C, and K) developed using toners for the corresponding colors.

Subsequently, when the toner image in each color formed on the photosensitive drum 11 of the image preparing device 10 (Y, M, C, K) is transported to the first transfer position, the first transfer device 15 (Y, M, C, K) performs a first transfer on the toner image in each color such that the toner images in the various colors are sequentially superposed on the intermediate transfer belt 21 of the intermediate transfer device 20 which is rotated in the direction indicated by the arrow B.

In the image preparing devices 10 (Y, M, C, K) which have finished the first transfer, the drum cleaning device 16 removes, or scrapes off, attached matter to clean the surface of the photosensitive drum 11. This allows the image preparing devices 10 (Y, M, C, K) to be ready for the next image preparing operation.

Subsequently, the intermediate transfer device 20 transports the toner images which have been subjected to the first transfer to the second transfer position through rotation of the intermediate transfer belt 21. Meanwhile, the paper feed device 50 feeds the prescribed recording paper 5 to the paper feed/transport path 56 in accordance with the image preparing operation. In the paper feed/transport path 56, the pair of paper transport rollers 55 as resist rollers feed the recording paper 5 to the second transfer position in accordance with the transfer timing to supply the recording paper 5.

At the second transfer position, the second transfer device 30 collectively performs a second transfer of the toner images on the intermediate transfer belt 21 onto the recording paper 5. In the intermediate transfer device 20 which has finished the second transfer, the belt cleaning device 27 removes attached matter such as a toner remaining on the surface of the intermediate transfer belt 21 after the second transfer.

Subsequently, the recording paper 5, onto which the toner images have been transferred through the second transfer, is peeled from the intermediate transfer belt 21, and thereafter transported to the fixing device 40 via the paper transport path 57. In the fixing device 40, the recording paper 5 after being subjected to the second transfer is introduced to the contact portion between the heating rotary member 41 and the pressurizing rotary member 42 which are rotating to pass through the contact portion to perform a necessary fixation process (heating and pressurization) to fix unfixed toner images to the recording paper 5. Finally, the recording paper 5 after being subjected to the fixation is ejected to the paper ejection portion 58 provided at the upper portion of the apparatus body 1a, for example, by the pair of paper ejection rollers 60.

As a result of the operation described above, the recording paper 5 is output with a full-color image formed thereon by combining the toner images in the four colors.

When the image forming apparatus 1 receives image information and command information requesting black-and-white (monochrome) image forming operation (printing) from a personal computer, an image reading device, etc. (not illustrated), the control device 100 starts only the image preparing device 10K for black (K), of the four image preparing devices 10 (Y, M, C, K), the intermediate transfer device 20, the second transfer device 30, the fixing device 40, etc.

In the black-and-white mode, as illustrated in FIG. 4, the belt support roller 23 is moved to a position at which only the first transfer device 15K for black (K) contacts the surface of the photosensitive drum 11K for black (K) via the intermediate transfer belt 21 and the first transfer devices 15 (Y, M, C) for colors are away from the surfaces of the photosensitive drums 11 (Y, M, C) together with the intermediate transfer belt 21.

Then, a toner image for black (K) is formed by the image preparing device 10K for black (K) to form a black-and-white (monochrome) image on the recording paper 5.

<Image Forming Unit>

In the image forming apparatus 1, it is necessary to replace the photosensitive drum 11 with a new one in the case where the life of the photosensitive drum 11 has expired with a photosensitive layer etc. of the photosensitive drum 11 worn along with image forming operation, for example. In the image forming apparatus 1, in addition, the developing device 14 is replaced with a new one in the case where the life of the developing device 14 has expired with the developer in the developing device 14 degraded, for example.

Figure 3:
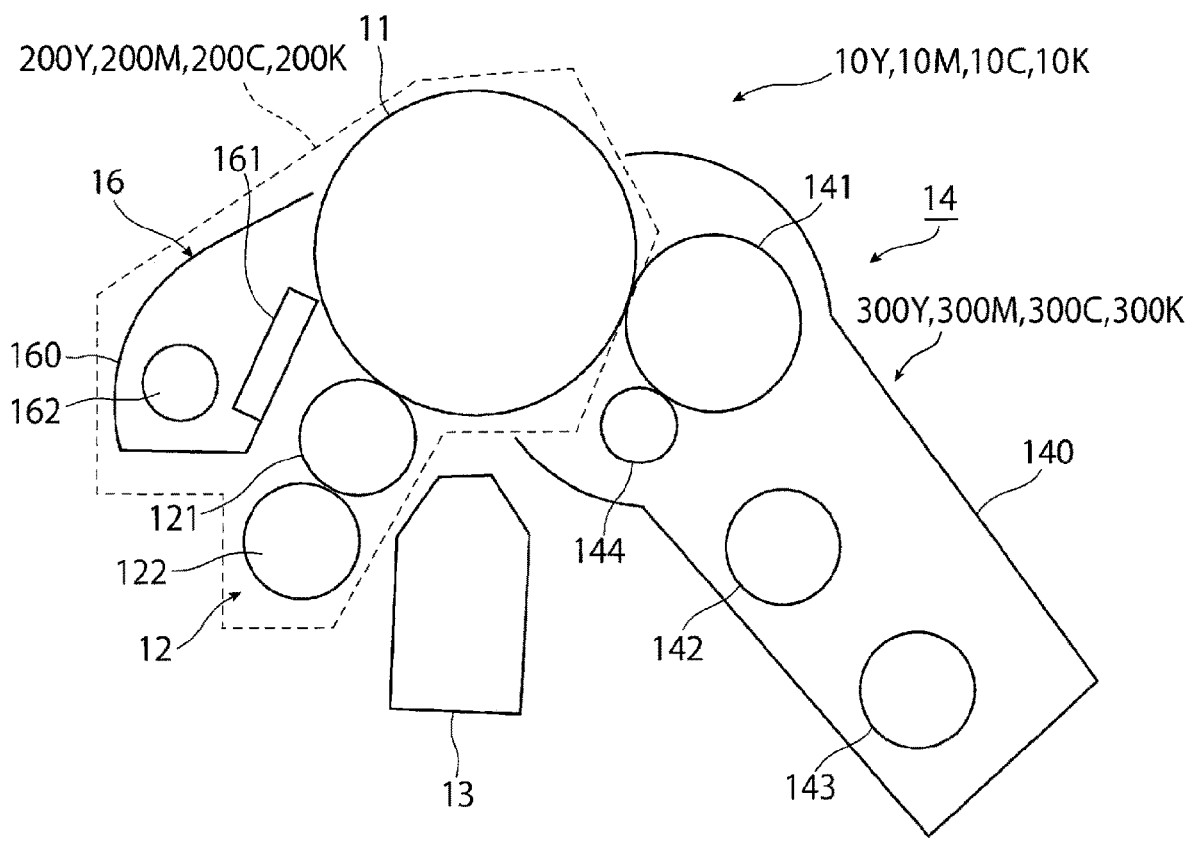
FIG. 3 illustrates the configuration of an image forming unit of the image forming apparatus according to the first exemplary embodiment of the present disclosure.

Therefore, the image preparing devices 10 (Y, M, C, K) for yellow (Y), magenta (M), cyan (C), and black (K) are unitized in the image forming apparatus 1. As illustrated in FIG. 3, the image preparing devices 10 (Y, M, C, K) each include a photosensitive drum unit 200 as an example of a customer replacement unit (CRU) that integrally includes the photosensitive drum 11, the charging device 12, and the drum cleaning device 16, and a developing unit 300 constituted of the developing device 14 alone. The exposure device 13 is mounted to the apparatus body 1a of the image forming apparatus 1.

Each of the photosensitive drum units 200 (Y, M, C, K) and the developing units 300 (Y, M, C, K) for yellow (Y), magenta (M), cyan (C), and black (K) is configured to be independently removable from the apparatus body 1a.

Figure 6:
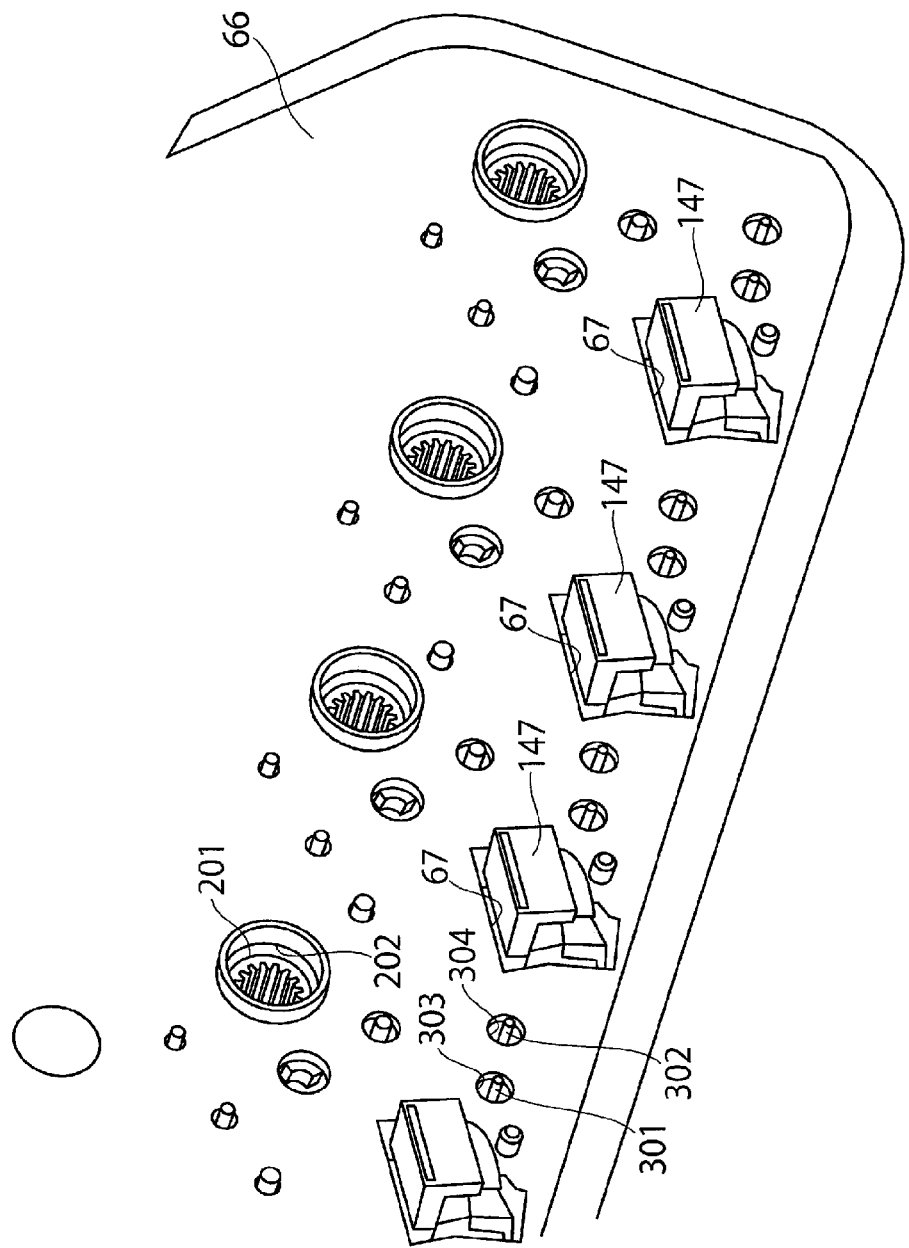
FIG. 6 is a perspective view illustrating the configuration of an inner frame of the image forming apparatus according to the first exemplary embodiment of the present disclosure.

The photosensitive drum units 200 (Y, M, C, K) and the developing units 300 (Y, M, C, K) are positioned and fixed at an operating position determined in advance by being pushed in along the Y direction from the front (front surface) side toward the rear (back surface) side of the apparatus body 1a using a guide rail as an example of a guiding unit (not illustrated) provided inside the apparatus body 1a. As illustrated in FIG. 6, a positioning member 201 and plural positioning pins 301 and 302 are provided on the back surface side of the photosensitive drum 200 and the developing unit 300 so as to project toward the back surface. Positioning holes 202, 303, and 304 into which the positioning member 201 and the positioning pins 301 and 302 of the photosensitive drum unit 200 and the developing unit 300 are to be inserted open in an inner frame 66 at positions corresponding to the photosensitive drum unit 200 and the developing unit 300. The photosensitive drum unit 200 and the developing unit 300 are fixed at the operating position by a fixing unit (not illustrated) after being positioned at the operating position.

Figure 7:
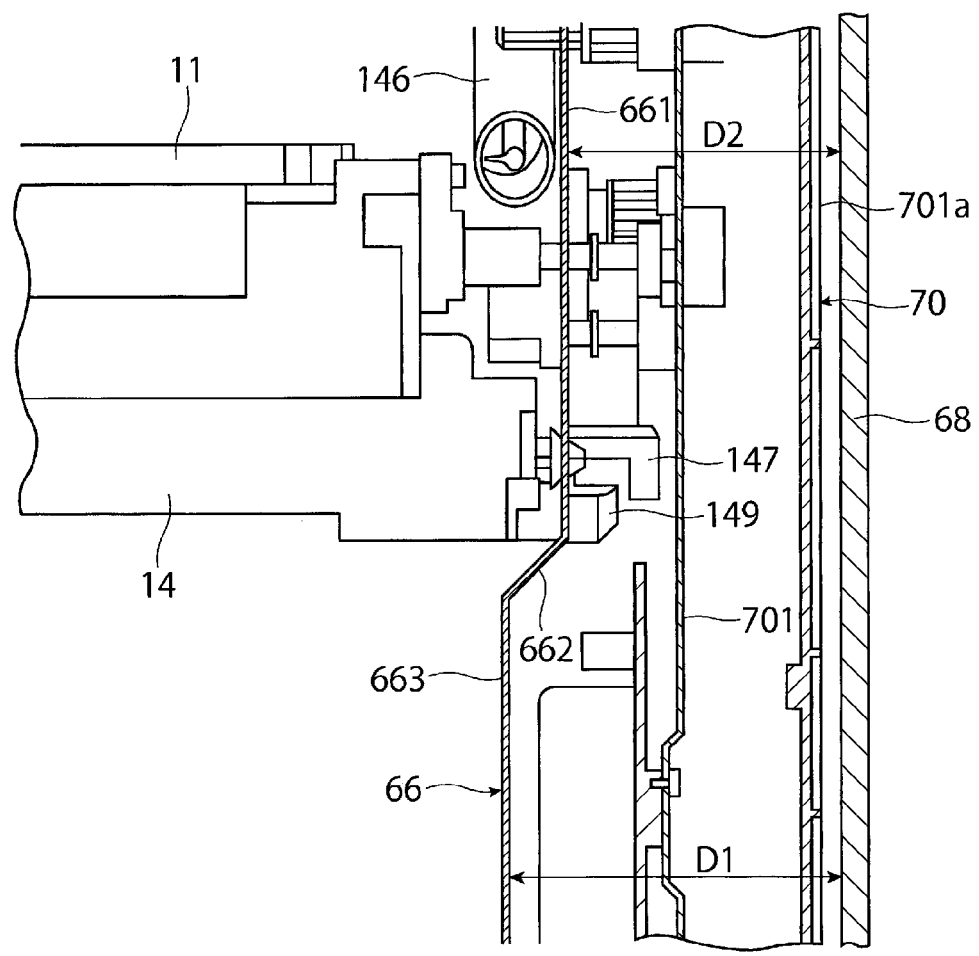
FIG. 7 is a sectional view illustrating the configuration of the driving device according to the first exemplary embodiment of the present disclosure.

Toners for the corresponding colors are supplied from the toner cartridges 145 (Y, M, C, K), which are disposed above the intermediate transfer device 20 as illustrated in FIG. 1, to the developing devices 14 (Y, M, C, K) of the developing units 300 at a prescribed timing. Toners for the various colors accommodated in the toner cartridges 145 (Y, M, C, K) are transported along the Y direction toward the back surface side of the apparatus body 1a. As illustrated in FIG. 7, a supply pipe 146 disposed to extend downward along the Z direction is connected to an end portion of the toner cartridge 145 (Y, M, C, K) along the back surface. As illustrated in FIGS. 6 and 7, a coupling portion 147 as an example of a protruding portion coupled to the developing device 14 (Y, M, C, K) to supply a toner is provided at the lower end portion of the supply pipe 146. A first shutter member (not illustrated) that normally keeps a supply port (not illustrated) that opens at the lower end portion of the supply pipe 146 closed is attached to the coupling portion 147 in an openable manner. As illustrated in FIG. 7, the coupling portion 147 is disposed to project from an opening portion 67 formed in the inner frame 66 of the apparatus body 1a toward the back surface side of the apparatus body 1a.

On the other hand, the developing device 14 (Y, M, C, K) includes a supply portion 149 as an example of a protruding portion coupled to the coupling portion 147 to supply a toner into the housing 140, the supply portion 149 being provided at an end portion of the agitation/transport member 143 on the back surface side to extend (project) toward the back surface of the apparatus body 1a. A replenishment port (not illustrated) opens at the upper end portion of the supply portion 149 of the developing device 14 (Y, M, C, K). A second shutter member (not illustrated) that is normally biased in the closing direction is mounted to the replenishment port of the supply portion 149 in an openable manner.

When the developing device 14 (Y, M, C, K) is mounted to the apparatus body 1a, an end portion of the developing device 14 (Y, M, C, K) on the back surface side of the housing 140 pushes the first shutter member to open the supply port, and an end portion of the coupling portion 147 on the inner side of the apparatus body 1a pushes the second shutter member to open the replenishment port. This enables the toner to be supplied into the developing device 14 through the supply pipe 146.

<Configuration of Driving Device>

Figure 8:
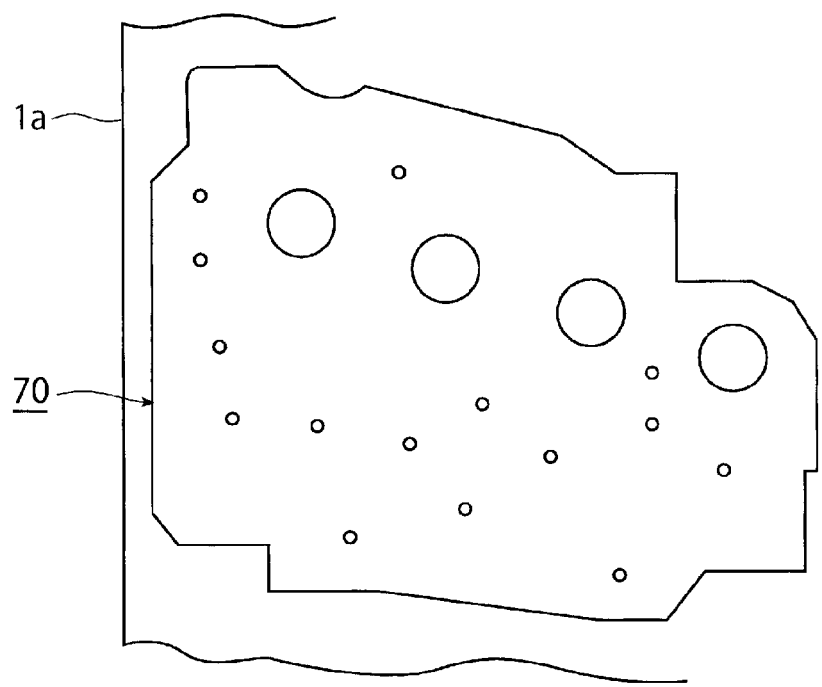
FIG. 8 is a back view illustrating the configuration of the driving device according to the first exemplary embodiment of the present disclosure.

FIG. 8 illustrates the configuration of the driving device of the image forming apparatus according to the first exemplary embodiment. FIG. 8 is a back view illustrating a state in which an exterior cover 68, which is an example of an outer wall positioned on the back surface of the image forming apparatus 1, has been detached. The exterior cover is disposed on the outer side of the apparatus body 1a with respect to the inner frame and the driving motors, and covers at least the inner frame and the driving motors.

As illustrated in FIG. 8, a driving device 70 that drives the image preparing devices 10 (Y, M, C, K) for yellow (Y), magenta (M), cyan (C), and black (K) and the intermediate transfer device 20 is mounted to the back surface of the apparatus body 1a corresponding to the back surface side of the image preparing devices 10 (Y, M, C, K) and the intermediate transfer device 20.

Figure 9:
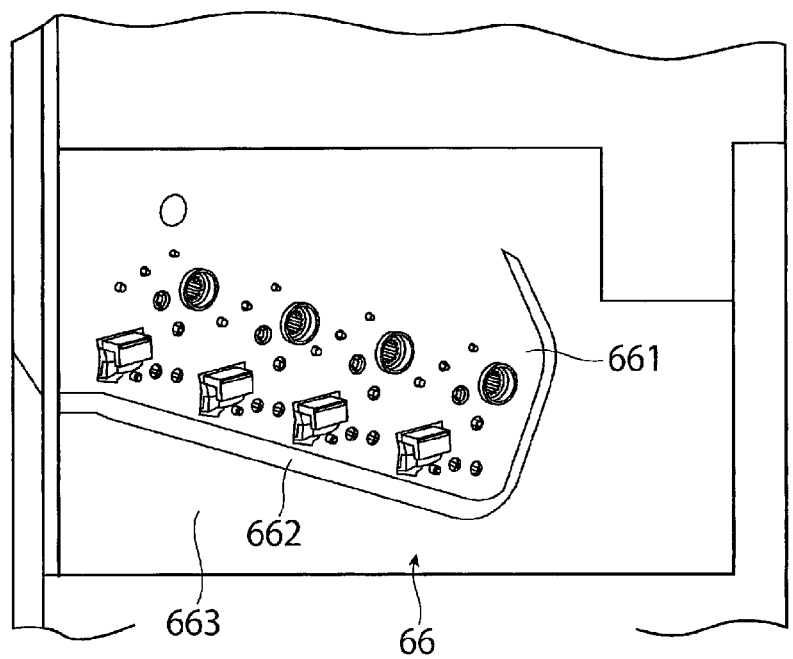
FIG. 9 is a back perspective view illustrating a state in which an exterior cover and the driving device of the image forming apparatus according to the first exemplary embodiment of the present disclosure have been detached.

As illustrated in FIG. 9, the apparatus body 1a includes the inner frame 66 which is provided inside the back surface thereof. The inner frame 66 is formed by performing pressing (drawing) on a metal sheet, and includes a first portion 661 in a flat plate shape disposed in proximity to and in parallel with the exterior cover 68 (see FIG. 7) as an example of the outer wall of the apparatus body 1a, and a second portion 663 in a flat plate shape disposed to be recessed toward the inner side of the apparatus body 1a via a drawn portion 662 inclined with respect to the first portion 661. The first portion 661 of the inner frame 66 is provided at a position corresponding to the back surface side of the image preparing devices 10 (Y, M, C, K) for yellow (Y), magenta (M), cyan (C), and black (K) and the intermediate transfer device 20. The second portion 663 of the inner frame 66 is provided at a position corresponding to the lower and lateral sides of the image preparing devices 10 (Y, M, C, K) for yellow (Y), magenta (M), cyan (C), and black (K) and the intermediate transfer device 20. The first portion 661 and the second portion 663 of the inner frame 66 are disposed in parallel with the exterior cover 68. A clearance D1 between the second portion 663 of the inner frame 66 and the exterior cover 68 is set to be larger than a clearance D2 between the first portion 661 and the exterior cover 68 (D1>D2). The lower end portion of the drawn portion 662 of the inner frame 66 has an inclination angle that is approximate to the tilt of the image preparing devices 10 (Y, M, C, K) for yellow (Y), magenta (M), cyan (C), and black (K).

The first portion 661 and the second portion 663 of the inner frame 66 are not limited to those in a flat plate shape, and may include a wide variety such as portions having undulations and portions disposed as inclined. It is not necessary that the first portion 661 and the second portion 663 of the inner frame 66 should be disposed in parallel with the exterior cover 68, and the first portion 661 and the second portion 663 may be disposed as inclined at an angle with respect to the exterior cover 68.

It is not necessary that the first portion 661 and the second portion 663 of the inner frame 66 should be formed integrally with each other, and the first portion 661 and the second portion 663 may be formed from different metal sheets etc. and integrally coupled to each other, or may be constituted as separate bodies.

As illustrated in FIG. 8, the driving device 70 is formed in the shape of a flat box having a generally rectangular shape in plan, the length (thickness) of the box along the Y direction (depth direction) being relatively short (thin). In the driving device 70, as illustrated in FIG. 7, a device substrate 701 is disposed to extend in an upright state along the Z direction on one side surface of the apparatus body 1a, and an end surface of the apparatus body 1a on the back surface side is covered by a cover 701a.

Figure 10:
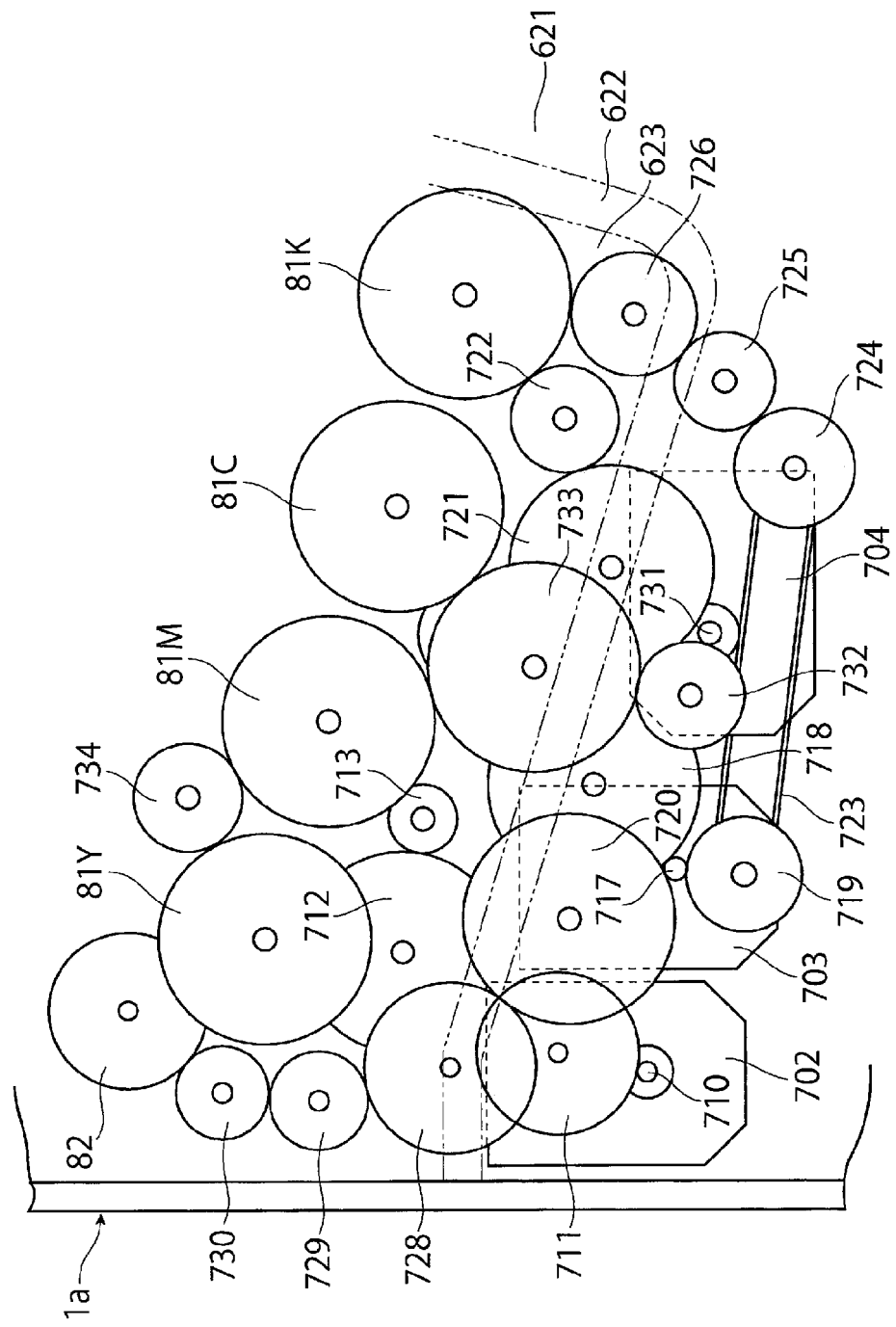
FIG. 10 illustrates the configuration of the driving device according to the first exemplary embodiment of the present disclosure.

As illustrated in FIG. 10, the driving device 70 includes a first driving motor 702, a second driving motor 703, and a third driving motor 704. The first driving motor 702 is an example of a driving unit (driving source) that drives the developing devices 14 (Y, M, C) for colors including yellow (Y), magenta (M), and cyan (C). The second driving motor 703 is an example of a driving unit (driving source) that drives the intermediate transfer belt 21, the photosensitive drum 11K for black (K), and the developing device 14K for black (K). The third driving motor 704 is an example of a driving unit (driving source) that drives the photosensitive drums 10 (Y, M, C) for colors including yellow (Y), magenta (M), and cyan (C). The first to third driving motors 702 to 704 are attached to the device substrate 701 in the first exemplary embodiment.

Figure 11:
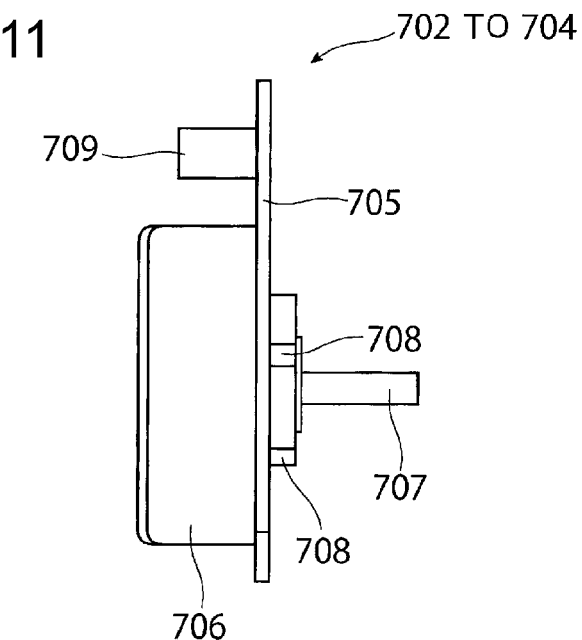
FIG. 11 is a side view illustrating the configuration of a driving motor.

The first to third driving motors 702 to 704 are configured similarly to each other. As illustrated in FIG. 11, the first to third driving motors 702 to 704 each include a substrate 705 in a generally rectangular shape in plan. A motor body 706 as an example of a driving portion body including a motor with a built-in speed reduction mechanism is provided on the back surface of the substrate 705 to project in the shape of a short circular column. A driving shaft 707 is disposed on the front surface of the substrate 705 to project in one direction from the motor body 706. An attachment female thread portion 708 for attachment of the first to third driving motors 702 to 704 is provided at the outer periphery of the driving shaft 707 at three locations along the circumferential direction. In FIG. 11, reference numeral 709 denotes a boss that positions the first to third driving motors 702 to 704.

The first to third driving motors 702 to 704 rotationally drive a rotary shaft of a built-in motor (not illustrated) to rotationally drive the driving shaft 707 at a rotational speed determined in advance with the speed of rotation of the rotary shaft reduced using a built-in speed reduction mechanism. As a matter of course, the first to third driving motors 702 to 704 may not include a built-in speed reduction mechanism.

As illustrated in FIGS. 9 and 10, the first to third driving motors 702 to 704 are disposed on the second portion 663 of the inner frame 66. The first driving motor 702 is disposed at the upper portion at the left end, as seen from the back surface, of the second portion 663 of the inner frame 66 to be directed downward. The second driving motor 703 is disposed at a position adjacent to the first driving motor 702 and slightly below the first driving motor 702 to be directed downward. The third driving motor 704 is disposed at a position slightly away from the second driving motor 703 to the middle part and below the second driving motor 703 to be directed horizontally toward the second driving motor 703.

As illustrated in FIG. 7, the first to third driving motors 702 to 704 are disposed with the driving shaft 707 projecting in the direction closer to the exterior cover 68 from the motor body 706.

The first to third driving motors 702 to 704 are configured such that the length of a mountable portion of the driving shaft 707 along the axial direction is larger than the clearance D2 between the first portion 661 of the inner frame 66 and the external cover 68.

Figure 12:
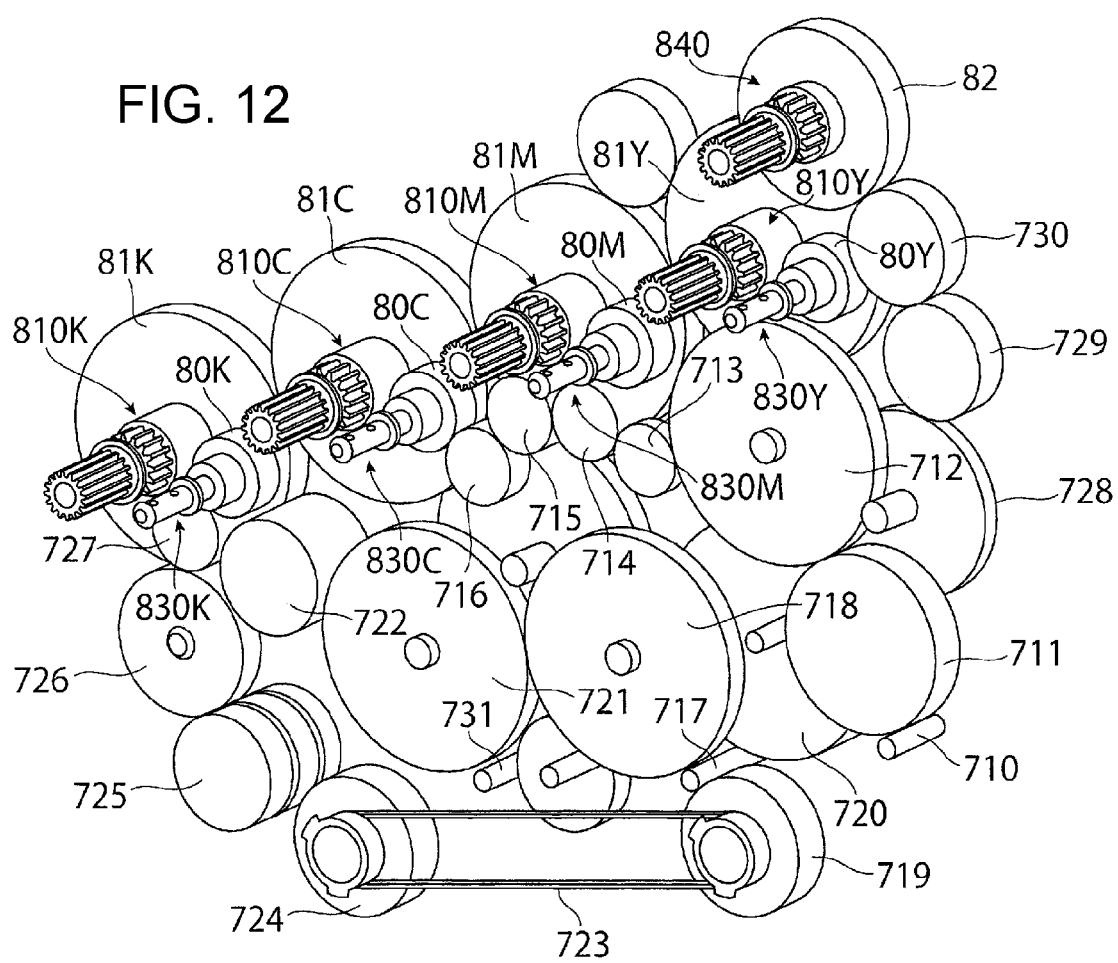
FIG. 12 is a perspective view illustrating the configuration of the driving device according to the first exemplary embodiment of the present disclosure.

As illustrated in FIG. 10, the driving shaft 707 of the first driving motor 702 is constituted as a driving gear 710 formed from a helical gear, a spur gear, etc. The driving gear 710 of the first driving motor 702 is meshed with a first transfer gear 711 that transfers a rotational driving force to the developing devices 14 (Y, M, C) for colors including yellow (Y), magenta (M), and cyan (C). As illustrated in FIG. 12, the first transfer gear 711 is meshed with a second transfer gear 712 disposed inside the apparatus body 1a and having a relatively large outside diameter. The second transfer gear 712 is meshed with a developing device driving gear 80Y disposed at a position corresponding to an end portion, along the axial direction, of the developing device 14Y for yellow (Y). The second transfer gear 712 is also meshed with a developing device driving gear 80M disposed at a position corresponding to an end portion, along the axial direction, of the developing device 14M for magenta (M) via third and fourth transfer gears 713 and 714 with relatively small outside diameters. The fourth transfer gear 714 is further meshed with a developing device driving gear 80C disposed at a position corresponding to an end portion, along the axial direction, of the developing device 14C for cyan (C) via fifth and sixth transfer gears 715 and 716 with relatively small outside diameters.

Thus, in the driving device 70, the developing device driving gears 80 (Y, M, C) which are disposed at positions corresponding to the end portions, along the axial direction, of the developing devices 14 (Y, M, C) for colors including yellow (Y), magenta (M), and cyan (C) are rotationally driven by rotationally driving the first driving motor 702.

As illustrated in FIG. 10, meanwhile, the driving shaft 707 of the second driving motor 703 is constituted as a driving gear 717 formed from a helical gear, a spur gear, etc. The driving gear 717 of the second driving motor 703 is meshed with each of a seventh transfer gear 718, a first transfer pulley 719, and an eighth transfer gear 720. The seventh transfer gear 718 transfers a rotational driving force to the photosensitive drum unit 200K for black (K). The first transfer pulley 719 transfers a rotational driving force to the developing device 14K for black (K). The eighth transfer gear 720 transfers a rotational driving force to the belt rotation roller 22 of the intermediate transfer device 20.

The seventh transfer gear 718 is meshed with a ninth transfer gear 721 with a relatively large outside diameter and a tenth transfer gear 722 with a relatively small outside diameter. The tenth transfer gear 722 is meshed with a photosensitive element driving gear 81K disposed at a position corresponding to an end portion, along the axial direction, of the photosensitive drum 11K for black (K). The rotational driving force of the first transfer pulley 719 is transferred to a second transfer pulley 724 via a timing belt 723. The first and second transfer pulleys 719 and 724 are each a toothed pulley meshed with the timing belt 723. The second transfer pulley 724 is meshed with a developing device driving gear 80K disposed at a position corresponding to an end portion, along the axial direction, of the developing device 14K for black (K) via eleventh to thirteenth transfer gears 725 to 727. The eleventh transfer gear 725 integrally includes plural transfer gears provided along the axial direction, and is configured to be able to transfer a driving force also along the axial direction.

The eighth transfer gear 720 is meshed with an intermediate transfer element driving gear 82 disposed at a position corresponding to an end portion, along the axial direction, of the belt support roller 22 of the intermediate transfer device 20 via a fourteenth transfer gear 728 with a relatively small outside diameter and fifteenth and sixteenth transfer gears 729 and 730 with still smaller outside diameters.

Thus, in the driving device 70, each of the developing device driving gear 80K, which is disposed at a position corresponding to an end portion, along the axial direction, of the developing device 14K for black (K), the photosensitive drum driving gear 81K, which is disposed at a position corresponding to an end portion, along the axial direction, of the photosensitive drum 11K for black (K), and the intermediate transfer element driving gear 82, which is disposed at a position corresponding to an end portion, along the axial direction, of the belt support roller 22 of the intermediate transfer device 20, is rotationally driven by rotationally driving the second driving motor 703.

As illustrated in FIG. 10, the driving shaft 707 of the third driving motor 704 is constituted as a driving gear 731 formed from a helical gear, a spur gear, etc. The driving gear 731 of the third driving motor 704 is meshed with a seventeenth transfer gear 732 that transfers a rotational driving force to the photosensitive drums 11 (Y, M, C) for colors including yellow (Y), magenta (M), and cyan (C). The seventeenth transfer gear 732 is meshed with each of photosensitive element driving gears 81 (M, C) disposed at a position corresponding to an end portion, along the axial direction, of the photosensitive drums 11 (M, C) for magenta (M) and cyan (C). The photosensitive element driving gear 81M of the photosensitive drum 11M for magenta (M) is meshed with a photosensitive element driving gear 81Y disposed at a position corresponding to an end portion, along the axial direction, of the photosensitive drum 11Y for yellow (Y) via an eighteenth transfer gear 734 with a relatively small outside diameter.

Thus, in the driving device 70, the developing device driving gears 80 (Y, M, C) which are disposed at positions corresponding to the end portions, along the axial direction, of the developing devices 14 (Y, M, C) for colors including yellow (Y), magenta (M), and cyan (C) are rotationally driven by rotationally driving the third driving motor 704.

As illustrated in FIG. 12, the driving device 70 also includes photosensitive element principal couplings 810 (Y, M, C, K) and developing device principal couplings 800 (Y, M, C, K) as an example of first and second coupling/transfer units disposed so as to be movable along the axial direction of the photosensitive element driving gears 81 (Y, M, C, K) and the developing device driving gears 80 (Y, M, C, K), respectively. The driving device 70 also includes an intermediate transfer device principal coupling 820 as an example of a third coupling/transfer unit disposed so as to be movable along the axial direction of the belt support roller 22 of the intermediate transfer device 20.

Figure 13:
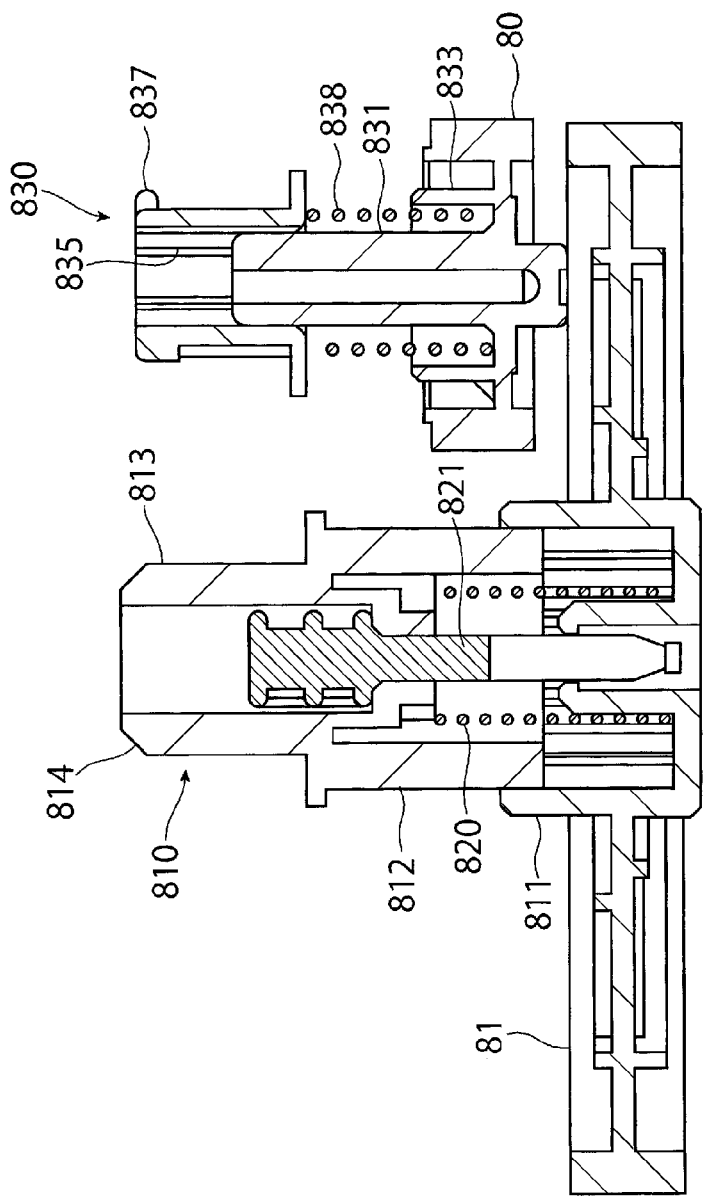
FIG. 13 is a sectional view illustrating the configuration of couplings.
Figure 14:
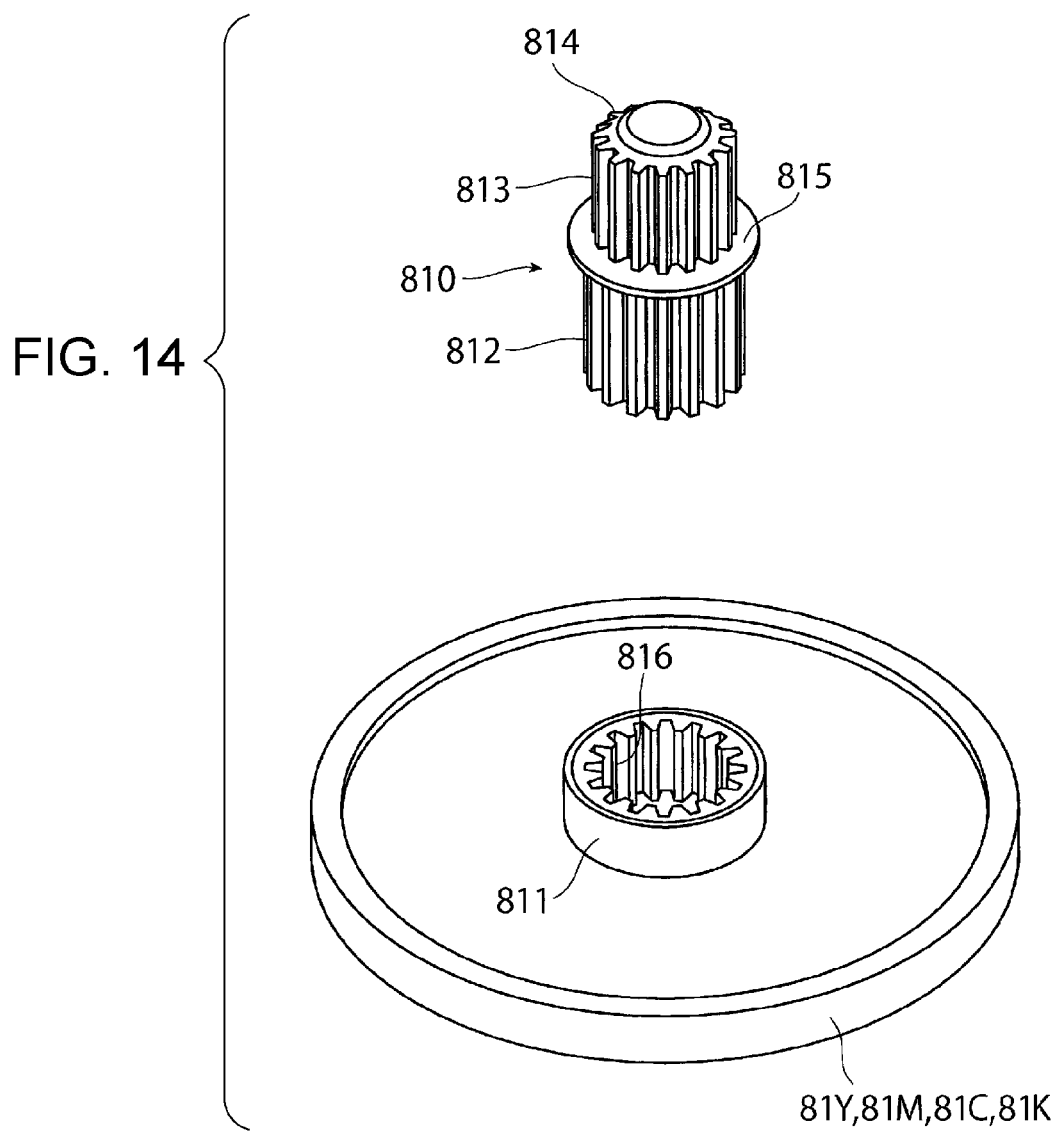
FIG. 14 is an exploded perspective view illustrating a coupling.

As illustrated in FIG. 13, the photosensitive element driving gear 81 (Y, M, C, K) integrally includes an axial core portion 811 provided at the center thereof and formed in a cylindrical shape to project toward one side. The photosensitive element principal coupling 810 is mounted to the axial core portion 811 in the state of being biased in the direction of projecting along the rotational axis direction on one side surface of the photosensitive element driving gear 81. The photosensitive element principal coupling 810 integrally includes a first gear portion 812 in a cylindrical shape, at the outer periphery of which a spur gear as an involute gear is formed, and a second gear portion 813 in a cylindrical shape which is provided at the distal end of the first gear portion 812 and with an outside diameter that is smaller than that of the first gear portion 812, and at the outer periphery of which a spur gear as an involute gear is formed. A tapered portion 814 in a tapered shape is provided at the distal end of the second gear portion 813. The photosensitive element principal coupling 810 includes a first abutment portion 815 provided between the first gear portion 812 and the second gear portion 813 to project annularly toward the outer side in the radial direction.

Figure 15:
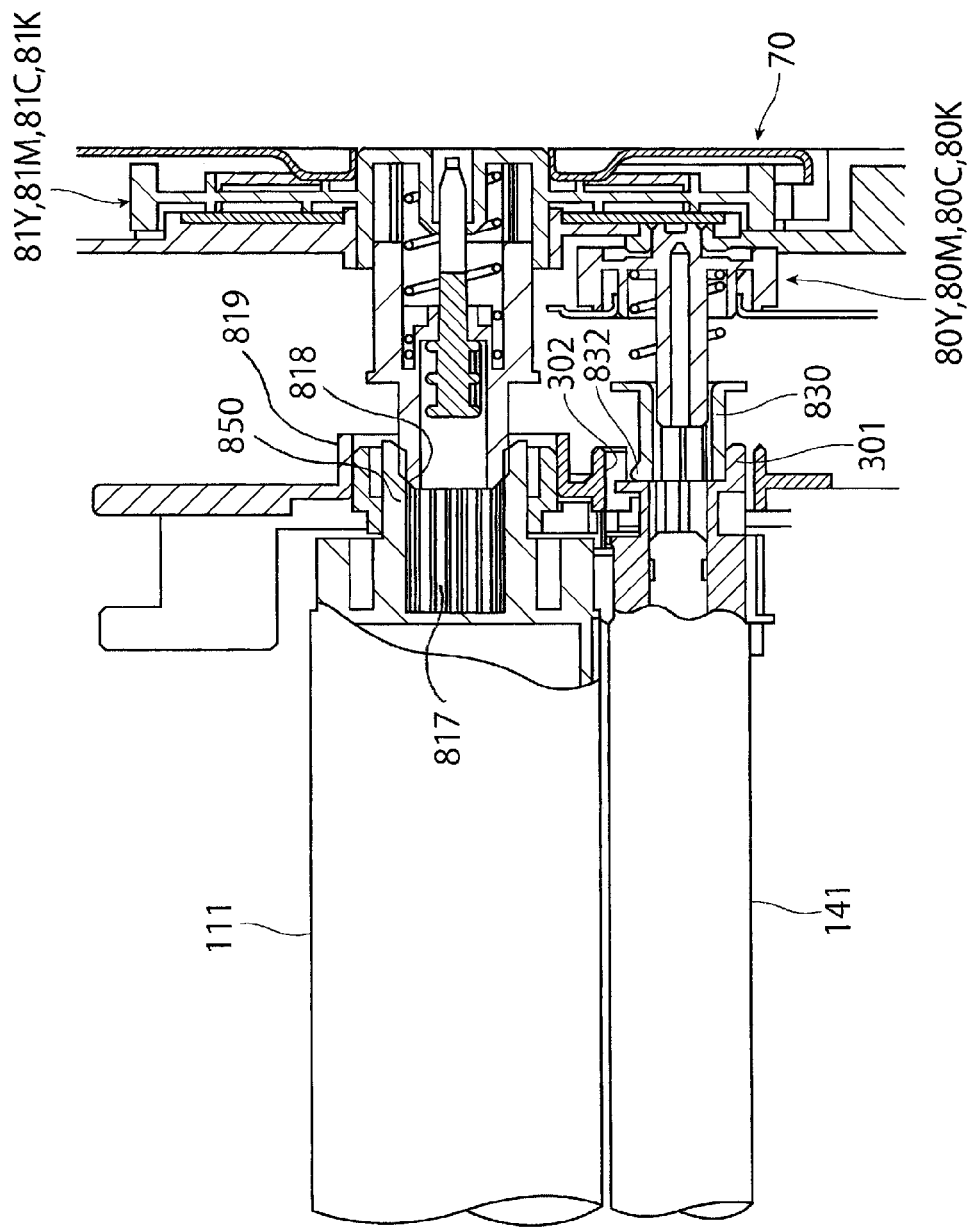
FIG. 15 is a sectional view illustrating the configuration of the driving device according to the first exemplary embodiment of the present disclosure.

The axial core portion 811 of the photosensitive element driving gear 81 includes an inner gear 816 formed as a spur gear as an involute gear to be meshed with the first gear portion 812 of the photosensitive element principal coupling 810. The photosensitive element principal coupling 810 is configured to be movable along the axial direction with the first gear portion 812 meshed with the inner gear 816 of the photosensitive element driving gear 81 to receive a rotational driving force transferred thereto. As illustrated in FIG. 15, the second gear portion 813 of the photosensitive element principal coupling 71 is configured to be meshed with (coupled to) and separated from a photosensitive element sub coupling 816 as an example of a second coupling/transfer unit provided at one end portion, along the axial direction, of the photosensitive drum 11 of the photosensitive drum unit 200. The photosensitive element sub coupling 816 is formed in a cylindrical shape including an inner gear 817 formed on the inner peripheral surface thereof as a spur gear as an involute gear to be meshed with the second gear portion 813 of the photosensitive element principal coupling 810. A tapered portion 818 is provided at an opening end of the inner gear 817 to be increased in diameter toward the end portion. The photosensitive element sub coupling 816 is mounted as fixed to one end portion, along the axial direction, of the photosensitive drum 11. A protection member 819 is provided on a side surface of the photosensitive drum unit 200 so as to project toward a side, the protection member 819 being formed in a cylindrical shape at the outer periphery of the photosensitive element sub coupling 816 to protect the photosensitive element sub coupling 816.

While the photosensitive element principal coupling 810 is not limited to one including the first and second gear portions 812 and 813 each formed from an involute gear, it is desirable that the photosensitive element principal coupling 810 should have little speed fluctuations etc. and high rotation accuracy, since the photosensitive drum 11 which is rotationally driven via the photosensitive element principal coupling 810 directly affects the image quality. The photosensitive element principal coupling 810 including the first and second gear portions 812 and 813 each formed from an involute gear is able to transfer a rotational driving force to the photosensitive drum 11 with relatively high rotation accuracy, and therefore is preferably used.

As illustrated in FIG. 13, the photosensitive element principal coupling 810 is biased in the projecting direction by a first coil spring 820 as an example of a first biasing unit interposed between the inner end surface of the axial core portion 811 of the photosensitive element driving gear 81 and the inner end surface of the first gear portion 812. The amount of projection of the photosensitive element principal coupling 810 along the axial direction of the photosensitive element driving gear 81 is restricted by a fixed shaft 821 mounted to the axial core portion 811 of the photosensitive element driving gear 81.

Figure 16:
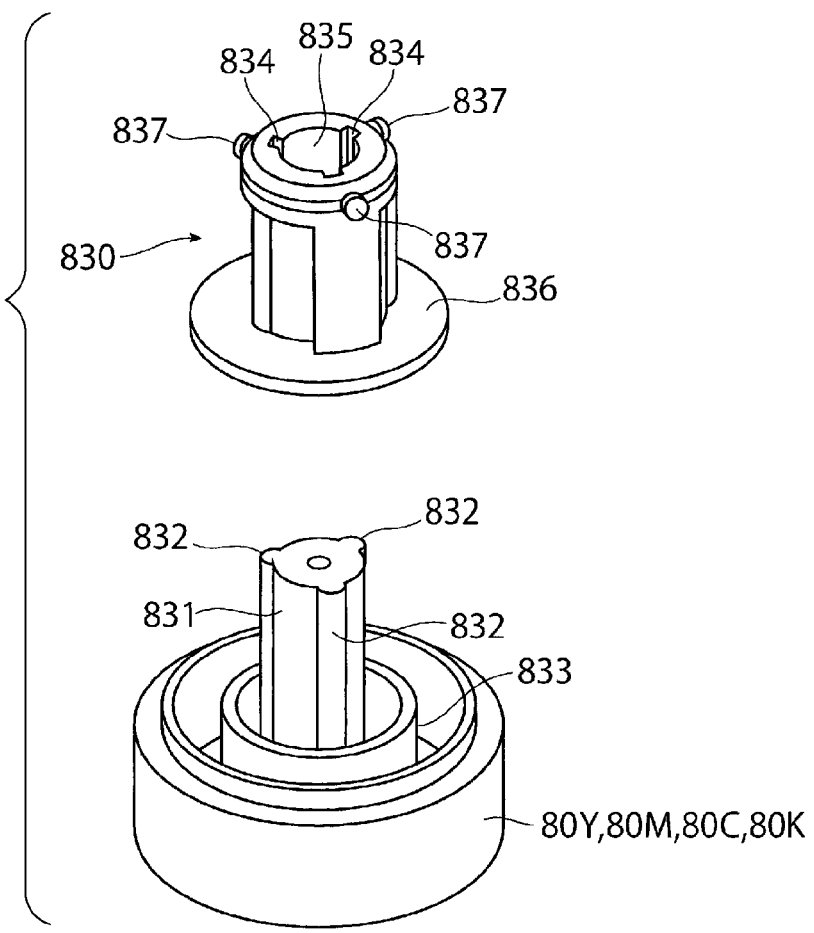
FIG. 16 is an exploded perspective view illustrating a coupling.

As illustrated in FIG. 16, the developing device principal coupling 830 is mounted to the developing device driving gear 80 (Y, M, C, K) to be displaceable with the amount of projection along the axial direction of the rotational axis C2 restricted. The developing device driving gear 80 integrally includes a driving transfer shaft 831 in a generally circular column or cylindrical shape provided on one side surface thereof so as to project along the axial direction. Plural (three in the illustrated example) first projecting portions 832 with a generally semicircular cross-sectional shape are integrally provided at the outer periphery of the driving transfer shaft 831 along the circumferential direction. The three first projecting portions 832 are disposed at the outer periphery of the driving transfer shaft 831 at positions 120 degrees away from each other. The first projecting portions 832 are each formed over the overall length of the driving transfer shaft 831 along the axial direction. The developing device driving gear 80 is provided with a first shaft support portion 833 formed in a cylindrical shape at the outer periphery of the driving transfer shaft 831.

The developing device principal coupling 830 is formed in a generally cylindrical shape. The developing device principal coupling 830 includes a mounting hole 835, in the inner peripheral surface of which plural first recessed portions 834 are formed to be engaged with the plural first projecting portions 832 of the driving transfer shaft 831. The developing device principal coupling 830 integrally includes a second abutment portion 836 provided at the base end portion thereof to project annularly toward the outer side in the radial direction. Plural (three in the illustrated example) second projecting portions 837 in a generally hemispherical shape are integrally provided at the distal end of the developing device principal coupling 830 so as to project laterally. The second projecting portions 837 are disposed at the same position as the first projecting portions 832 of the developing device driving gear 80 along the circumferential direction of the developing device principal coupling 830.

As illustrated in FIG. 15, the plural second projecting portions 837 of the developing device principal coupling 830 are configured to be meshed with (coupled to) and separated from a developing device sub coupling 301 as an example of a second driving/transfer unit provided at an end portion, along the axial direction, of the developing roller 141 of the developing unit 300. The developing device sub coupling 301 includes plural second recessed portions 302 provided in the inner peripheral surface thereof to be engaged with the plural second projecting portions 832 of the developing device coupling 830. As illustrated in FIG. 16, the developing device principal coupling 830 is biased in the projecting direction by a second coil spring 838 as an example of a second biasing unit interposed between an end surface of the developing device driving gear 80 and the lower end surface of the second projecting portion 836. As illustrated in FIG. 15, the developing device principal coupling 830 is rotatably attached in contact with the developing device sub coupling 302 of the developing roller 141 with the projecting position of the developing device principal coupling 830 restricted. The projecting position of the developing device principal coupling 830 is restricted by a restricting member (not illustrated).

As illustrated in FIG. 12, an intermediate transfer device principal coupling 840 as an example of a first coupling/transfer unit is mounted to the intermediate transfer element driving gear 82 so as to be displaceable along the axial direction. The intermediate transfer device principal coupling 840 is configured similarly to the photosensitive drum principal coupling 810.

<Operation of Driving Device>

In the driving device 70, which is applied to the image forming apparatus 1 according to the first exemplary embodiment and in which a driving unit is disposed between an inner frame, which supports the photosensitive drum 11 and the developing device 14 as an example of a driven unit, and an outer wall, it is possible to reduce the distance between the inner frame and the outer wall compared to the case where the driving unit is disposed between a portion of the inner frame that is the closest to the outer wall and the outer wall.

That is, as illustrated in FIG. 7, the driving device 70 according to the first exemplary embodiment is disposed at an end portion on the back surface side inside the apparatus body 1*a*. The inner frame 66 is present at an end portion of the apparatus body 1*a* on the back surface side.

The first portion 661 of the inner frame 66 is provided with the supply portions 149 of the developing devices 14 (Y, M, C, K) for yellow (Y), magenta (M), cyan (C), and black (k) in the state of projecting toward the back surface with respect to the first portion 661.

Figure 17:
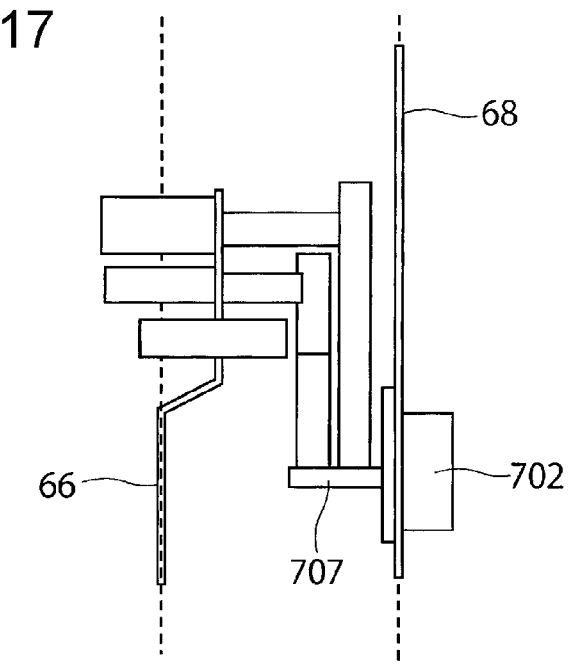
FIG. 17 is a schematic view illustrating a driving device according to the related art.

Therefore, in the driving device 70 according to the related art which drives the developing devices 14 (Y, M, C, K) and the photosensitive drums 11 (Y, M, C, K) for yellow (Y), magenta (M), cyan (C), and black (k), as illustrated in FIG. 17, it is necessary that transfer gears that transfer driving forces of the first to third driving motors 702 to 704 to the developing devices 14 (Y, M, C, K) and the photosensitive drums 11 (Y, M, C, K) should be disposed so as to avoid the supply portions 149 of the developing devices 14 (Y, M, C, K).

As a result, in the driving device according to the related art, it is necessary to dispose the first to third driving motors 702 to 704 further on the back surface side of the apparatus body 1*a*, which increases the distance between the first portion 661 of the inner frame 66 and the exterior cover 68 and increases the size of the apparatus body 1*a*.

On the contrary, as illustrated in FIG. 7, the driving device 70 according to the first exemplary embodiment is configured such that the first to third driving motors 702 to 704 are not disposed between the first portion 661, which is a part of the inner frame 66 that is the closest to the exterior cover 68, and the exterior cover 68, but the first to third driving motors 702 to 704 are disposed at the second portion 663, the clearance D1 at which is larger than the first portion 661.

Therefore, in the driving device 70 which drives the developing devices 14 (Y, M, C, K) and the photosensitive drums 11 (Y, M, C, K) for yellow (Y), magenta (M), cyan (C), and black (k), as illustrated in FIG. 7, it is possible to dispose the first to third driving motors 702 to 704 at the second portion 663, the clearance D1 at which is larger than the first portion 661, which is a part of the inner frame 66 that is the closest to the exterior cover 68, and with the driving shaft 707 projecting in the direction closer to the exterior cover 68 from the motor body 706.

Hence, in the driving device 70 which drives the developing devices 14 (Y, M, C, K) and the photosensitive drums 11 (Y, M, C, K) for yellow (Y), magenta (M), cyan (C), and black (k), it is necessary that only transfer gears that transfer driving forces of the first to third driving motors 702 to 704 to the developing devices 14 (Y, M, C, K) and the photosensitive drums 11 (Y, M, C, K) should be disposed so as to avoid the supply portions 149 of the developing devices 14 (Y, M, C, K), and then the first to third driving motors 702 to 704 do not project toward the back surface side with respect to the transfer gears.

In this manner, in the driving device 70 applied to the image forming apparatus 1 according to the first exemplary embodiment, in which the first to third driving motors 702 to 704 are disposed between the inner frame 66 which supports the developing devices 14 (Y, M, C, K) and the photosensitive drums 11 (Y, M, C, K) and the exterior cover 68, it is possible to reduce the distance between the inner frame 66 and the exterior cover 68 compared to the case where the first to third driving motors 702 to 704 are disposed between the first portion 661, which is a part of the inner frame 66 that is the closest to the outer wall, and the exterior cover 68.

As has been described so far, the driving device 70 according to the aspects of the present disclosure includes not only one constituted separately from the other constituent portions of the image forming apparatus 1, but also one constituted as a part of the image forming apparatus 1. Similarly, the frame according to the aspects of the present disclosure includes not only a frame of the driving device 70 constituted separately from the inner frame 66 of the image forming apparatus 1, but also a frame of the driving device 70 that is common to the inner frame 66 of the image forming apparatus 1.

While the driving device 70 is applied to a full-color image forming apparatus in the exemplary embodiment described above, it is a matter of course that the driving device 70 is also applicable to a monochrome image forming apparatus.

Regarding All Exemplary Embodiments

While specific exemplary embodiments of the present disclosure have been described above, the present disclosure is not limited to such exemplary embodiments. It is apparent to those skilled in the art that a variety of other exemplary embodiments may fall within the scope of the present disclosure. The exemplary embodiments may be subjected to modifications, deletions, additions, and combinations without departing from the technical concept of the present disclosure. For example, some or all of plural exemplary embodiments may be combined with each other as appropriate.

Although not specifically described in relation to the above exemplary embodiments, (1) different expressions may have the same meaning in the exemplary embodiments, and (2) the same expression may have different meanings in the exemplary embodiments. For either of (1) and (2), the constituent parts specified in the claims should be construed on the basis of the technical significance or the definition of the constituent parts in the exemplary embodiments in relation to which the constituent parts are described. In the case of (2), the constituent portions should be basically construed so as to include any of the meanings on the basis of the technical significance of the constituent portions. However, this does not apply in the case where the related art is included as a result of constructing the constituent portions so as to include any of the meanings. The term "same" as used in the present paragraph should be construed to include not only perfectly the same objects, but also substantially the same objects.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A driving device, configured to drive a driven unit and be accommodated in an accommodation device, the driving device comprising:
   a frame disposed in the driving device to support the driven unit, the frame being formed of a metal sheet and including a first portion having a first distance from an outer wall of the accommodation device, and a second portion having a second distance from the outer wall, the second distance being longer than the first distance, and the first portion and the second portion being disposed in parallel with the outer wall;
   a device substrate disposed between the frame and the outer wall and extending in a same direction as the outer wall; and
   at least one driving unit disposed between the second portion and the outer wall and arranged on the device substrate at a side away from the outer wall, at least a part of the at least one driving unit being away from the outer wall by the first distance or more.

2. The driving device according to claim 1,
   wherein the at least one driving unit includes a driving shaft and a driving portion body, and the driving shaft projects from the driving portion body in a direction closer to the outer wall.

3. The driving device according to claim 2, further comprising:
   a driving force transfer unit that transfers a driving force from the at least one driving unit to the driven unit.

4. The driving device according to claim 3,
   wherein the first portion is located at a position corresponding to a back surface side of the driven unit.

5. The driving device according to claim 2,
   wherein the first portion is located at a position corresponding to a back surface side of the driven unit.

6. The driving device according to claim 1, further comprising:
   a driving force transfer unit that transfers a driving force from the at least one driving unit to the driven unit.

7. The driving device according to claim 6,
   wherein the first portion is located at a position corresponding to a back surface side of the driven unit.

8. The driving device according to claim 6,
   wherein a plurality of driven units are provided, and
   the at least one driving unit transfers a driving force to each of a plurality of driving force transfer units provided in correspondence with the plurality of driven units.

9. The driving device according to claim 1,
   wherein the first portion is located at a position corresponding to a back surface side of the driven unit.

10. The driving device according to claim 1,
    wherein the driven unit includes a protruding portion that projects further toward the outer wall than the first portion of the frame.

11. An image forming apparatus comprising:
    a plurality of image forming units configured to be driven to form an image; and
    a driving device configured to drive the plurality of image forming units,
    wherein the driving device is the driving device according to claim 1, and the driven device comprises the plurality of image forming units.

12. The image forming apparatus according to claim 11,
    wherein the image forming apparatus is the accommodating device having the outer wall,
    the plurality of image forming units each includes an image holding member that holds an image and a developing unit that develops the image held by the image holding member, and
    each of the developing units includes a protruding portion that projects further toward the outer wall than the first portion of the frame.

13. A driving device, configured to drive a driven unit, the driving device comprising:
    a frame disposed in the driving device to support the driven unit, the frame being formed of a metal sheet and including a first portion and a second portion, the second portion being located at a position further away from an outer wall of the driving device than the first portion, and the first portion and the second portion being disposed in parallel with the outer wall;
    a device substrate disposed between the frame and the outer wall and extending in a same direction as the outer wall; and
    at least one driving unit that drives the driven unit, the at least one driving unit being disposed at a position on an outer side of the frame and arranged on the device substrate at a side away from the outer wall, a front side of the at least one driving unit facing towards the second portion, and at least a part of the at least one driving unit having a distance from the outer wall by a magnitude greater than or equal to a distance between the first portion and the outer wall of the driving unit.

14. The driving device according to claim 13,
    wherein the at least one driving unit includes a driving shaft and a driving portion body, and the driving shaft projects from the driving portion body toward the outer wall of the driving device.

15. The driving device according to claim 14, further comprising:
    a driving force transfer unit that transfers a driving force from the at least one driving unit to the driven unit.

16. The driving device according to claim 14,
    wherein the first portion is located at a position corresponding to a back surface side of the driven unit.

17. The driving device according to claim 13, further comprising:
    a driving force transfer unit that transfers a driving force from the at least one driving unit to the driven unit.

18. The driving device according to claim 17,
    wherein the first portion is located at a position corresponding to a back surface side of the driven unit.

19. The driving device according to claim 13,
    wherein the first portion is located at a position corresponding to a back surface side of the driven unit.

* * * * *